(12) United States Patent
Tsai et al.

(10) Patent No.: US 11,885,931 B2
(45) Date of Patent: Jan. 30, 2024

(54) IMAGE CAPTURING OPTICAL LENS ASSEMBLY

(71) Applicant: LARGAN PRECISION CO., LTD., Taichung (TW)

(72) Inventors: Tsung-Han Tsai, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 522 days.

(21) Appl. No.: 17/016,413

(22) Filed: Sep. 10, 2020

(65) Prior Publication Data
US 2020/0409114 A1   Dec. 31, 2020

Related U.S. Application Data

(60) Division of application No. 16/003,129, filed on Jun. 8, 2018, now Pat. No. 10,809,496, which is a
(Continued)

(30) Foreign Application Priority Data

Nov. 30, 2012   (TW) .................................. 101145094

(51) Int. Cl.
*G02B 3/02* (2006.01)
*G02B 13/18* (2006.01)
(Continued)

(52) U.S. Cl.
CPC .......... *G02B 13/0045* (2013.01); *G02B 5/005* (2013.01); *G02B 5/208* (2013.01);
(Continued)

(58) Field of Classification Search
CPC .......... G02B 5/005; G02B 5/208; G02B 9/62; G02B 13/0045; G02B 13/18; G02B 27/0025
(Continued)

(56) References Cited

U.S. PATENT DOCUMENTS 5,148,320 A      9/1992  Toide
5,257,135 A  *  10/1993  Kohno ........... G02B 15/143105
                                                  359/713
(Continued)

FOREIGN PATENT DOCUMENTS

CN     101365975 A     2/2009
CN     101490593 A     7/2009
(Continued)

*Primary Examiner* — Mahidere S Sahle
(74) *Attorney, Agent, or Firm* — CKC & Partners Co., LLC

(57) ABSTRACT

An image capturing optical lens assembly includes, in order from an object side to an image side, a first lens element, a second lens element, a third lens element, a fourth lens element, a fifth lens element, and a sixth lens element. The first lens element with positive refractive power has a convex object-side surface. The second lens element with negative refractive power has a concave object-side surface. The third lens element has negative refractive power. The fourth lens element has refractive power. The fifth lens element with positive refractive power has a convex image-side surface. The sixth lens element with refractive power has a concave image-side surface, wherein an object-side surface and the image-side surface of the sixth lens element are aspheric, and the sixth lens element has at least one inflection point on the image-side surface thereof.

14 Claims, 27 Drawing Sheets

Related U.S. Application Data continuation of application No. 15/978,194, filed on May 14, 2018, now Pat. No. 10,809,495, which is a continuation of application No. 15/264,616, filed on Sep. 14, 2016, now Pat. No. 9,995,912, which is a continuation of application No. 14/993,060, filed on Jan. 11, 2016, now Pat. No. 9,470,877, which is a continuation of application No. 14/497,287, filed on Sep. 25, 2014, now Pat. No. 9,268,116, which is a continuation of application No. 13/747,484, filed on Jan. 23, 2013, now Pat. No. 8,879,166.

(51) Int. Cl.
  G02B 13/00  (2006.01)
  G02B 9/62  (2006.01)
  G02B 5/00  (2006.01)
  G02B 5/20  (2006.01)
  G02B 27/00  (2006.01)

(52) U.S. Cl.
  CPC ............. *G02B 9/62* (2013.01); *G02B 13/18* (2013.01); *G02B 27/0025* (2013.01)

(58) Field of Classification Search
  USPC .................................................. 359/642–830
  See application file for complete search history.

(56) References Cited

U.S. PATENT DOCUMENTS

| | | |
|---|---|---|
| 5,475,536 A | 12/1995 | Kikutani |
| 6,028,717 A | 2/2000 | Kohno et al. |
| 7,869,142 B2 | 1/2011 | Chen et al. |
| 8,000,031 B1 | 8/2011 | Tsai |
| 8,310,767 B2 | 11/2012 | Huang et al. |
| 8,385,006 B2 | 2/2013 | Tsai et al. |
| 8,390,940 B2 | 3/2013 | Tsai et al. |
| 8,477,431 B2 | 7/2013 | Huang |
| 8,724,237 B2 | 5/2014 | Hsu et al. |
| 8,879,166 B2 | 11/2014 | Tsai et al. |
| 9,268,116 B2 | 2/2016 | Tsai et al. |
| 9,470,877 B2 | 10/2016 | Tsai et al. |
| 2013/0016278 A1 | 1/2013 | Matsusaka et al. |
| 2013/0070346 A1 | 3/2013 | Hsu et al. |
| 2013/0279021 A1 | 10/2013 | Chen et al. |
| 2013/0335833 A1 | 12/2013 | Liao et al. |
| 2013/0335834 A1 | 12/2013 | Tsai et al. |
| 2014/0111873 A1 | 4/2014 | Huang |
| 2015/0124332 A1 | 5/2015 | Noda et al. |

FOREIGN PATENT DOCUMENTS

| | | |
|---|---|---|
| CN | 101553748 A | 10/2009 |
| CN | 202067015 U | 12/2011 |
| CN | 202217102 U | 5/2012 |
| CN | 202522758 U | 11/2012 |
| JP | H112762 A | 1/1999 |
| JP | 2009204997 A | 9/2009 |
| JP | 2011085733 A | 4/2011 |
| JP | 2011-123210 A | 6/2011 |
| KR | 100835108 B1 | 6/2008 |
| WO | 2011118554 A1 | 9/2011 |

\* cited by examiner

IMAGE CAPTURING OPTICAL LENS ASSEMBLY

RELATED APPLICATIONS

This application is a division of U.S. application Ser. No. 16/003,129, filed on Jun. 8, 2018, which is a continuation of U.S. application Ser. No. 15/978,194, filed on May 14, 2018, which is a continuation of U.S. application Ser. No. 15/264,616, filed on Sep. 14, 2016, U.S. Pat. No. 9,995,912 issued on Jun. 12, 2018, which is a continuation of U.S. application Ser. No. 14/993,060, filed on Jan. 11, 2016, U.S. Pat. No. 9,470,877 issued on Oct. 18, 2016, which is a continuation of U.S. application Ser. No. 14/497,287, filed on Sep. 25, 2014, U.S. Pat. No. 9,268,116 issued on Feb. 23, 2016, which is a continuation of U.S. application Ser. No. 13/747,484, filed on Jan. 23, 2013, U.S. Pat. No. 8,879,166 issued on Nov. 4, 2014, and claims priority to Taiwan application serial number 101145094, filed on Nov. 30, 2012, the entire contents of which are hereby incorporated herein by reference.

BACKGROUND

Technical Field

The present disclosure relates to an image capturing optical lens assembly. More particularly, the present disclosure relates to a compact image capturing optical lens assembly applicable to electronic products.

Description of Related Art

In recent years, with the popularity of mobile products with camera functionalities, the demand of optical lens systems is increasing. The sensor of a conventional optical lens system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a four-element lens structure or a five-element lens structure such as the one disclosed in U.S. Pat. No. 7,869,142 and the one disclosed in U.S. Pat. No. 8,000,031. Due to the popularity of mobile products with high-end specifications, such as smart phones and PDAs (Personal Digital Assistants), the pixel and image-quality requirements of the compact optical lens system have increased rapidly. However, the conventional four-element lens structure or five-element lens structure cannot satisfy the requirements of the compact optical lens system.

Although there are other conventional optical lens systems with six-element lens structure, such as the one disclosed in U.S. Pat. No. 8,310,767. However, the distribution of the refractive power and the design of the lens curvature of the optical lens system are improper, so that the ability for correcting the chromatic aberration and the Petzval sum of the optical lens system are limited, and the astigmatism and the coma thereof also cannot be corrected effectively. Therefore, the image quality and the resolving power of the optical lens system cannot be enhanced effectively, and the optical lens system is hard to apply to portable electronics featuring high image quality.

SUMMARY

According to one aspect of the present disclosure, an image capturing optical lens assembly includes, in order from an object side to an image side, a first lens element, a second lens element, a third lens element, a fourth lens element, a fifth lens element, and a sixth lens element. The first lens element with positive refractive power has a convex object-side surface. The second lens element with negative refractive power has a concave object-side surface. The third lens element has negative refractive power. The fourth lens element has refractive power. The fifth lens element with positive refractive power has a convex image-side surface. The sixth lens element with refractive power has a concave image-side surface, wherein an object-side surface and the image-side surface of the sixth lens element are aspheric, and the sixth lens element has at least one inflection point on the image-side surface thereof. When a curvature of the object-side surface of the second lens element is C3, a curvature of an image-side surface of the second lens element is C4, the image capturing optical lens assembly further comprises a stop, an axial distance between the stop and a non-axial critical point on the image-side surface of the sixth lens element is Dsc, and an axial distance between the object-side surface of the first lens element and an image plane is TL, the following relationships are satisfied:

$$0 < (C3-C4)/(C3+C4) < 5.0;$$

and $$0.5 < Dsc/TL < 1.0.$$

According to another aspect of the present disclosure, an image capturing optical lens assembly includes, in order from an object side to an image side, a first lens element, a second lens element, a third lens element, a fourth lens element, a fifth lens element, and a sixth lens element. The first lens element with positive refractive power has a convex object-side surface. The second lens element with negative refractive power has a concave object-side surface. The third lens element has negative refractive power. The fourth lens element has refractive power. The fifth lens element with positive refractive power has a convex image-side surface. The sixth lens element with negative refractive power has a concave image-side surface, wherein an object-side surface and the image-side surface of the sixth lens element are aspheric, and the sixth lens element has at least one inflection point on the image-side surface thereof. When a curvature of the object-side surface of the second lens element is C3, and a curvature of an image-side surface of the second lens element is C4, the following relationship is satisfied:

$$0.3 < (C3-C4)/(C3+C4) \le 1.0.$$

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
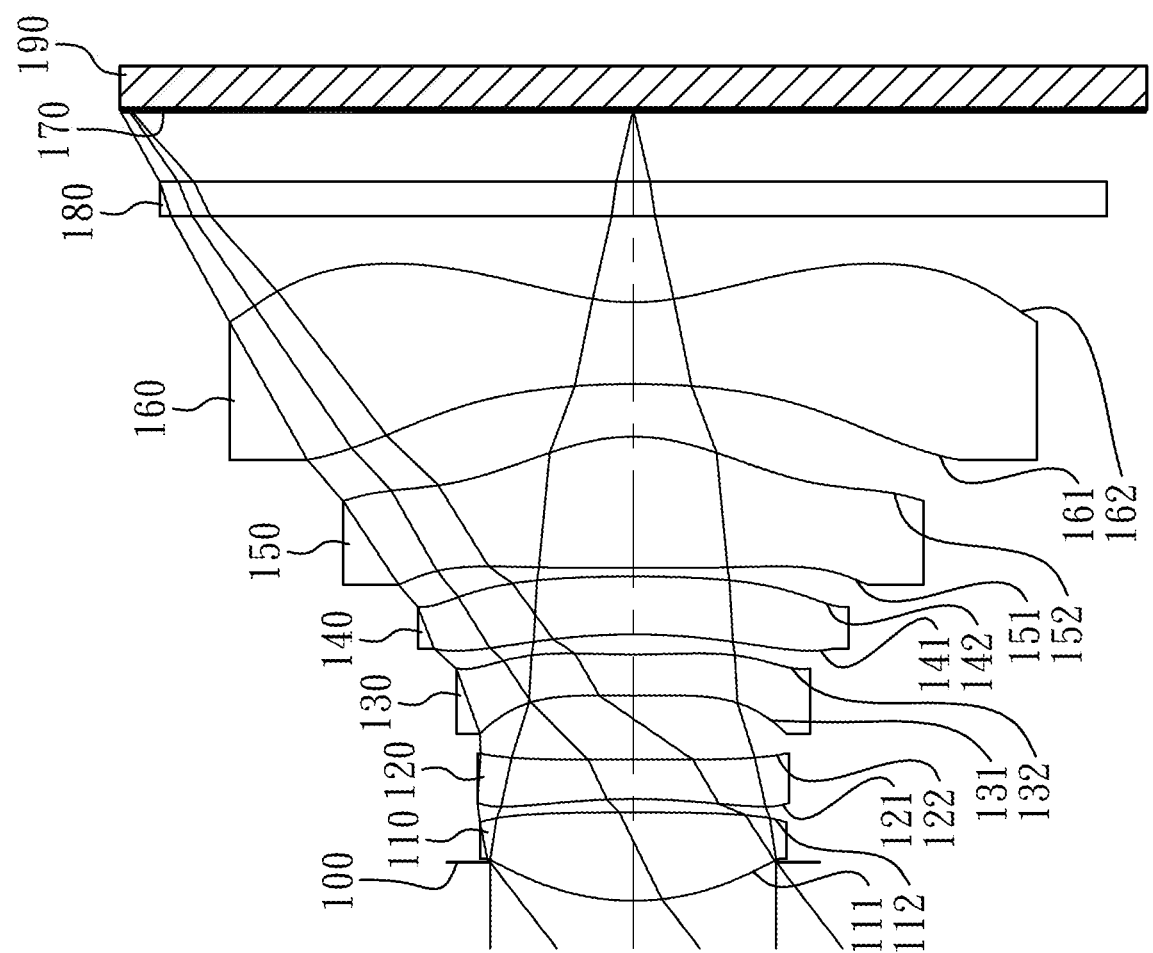
FIG. 1 is a schematic view of an image capturing optical lens assembly according to the 1st embodiment of the present disclosure.

An image capturing optical lens assembly includes, in order from an object side to an image side, a first lens element, a second lens element, a third lens element, a fourth lens element, a fifth lens element, and a sixth lens element. The image capturing optical lens assembly can further include a stop and an image sensor, wherein the stop can be an aperture stop, and the image sensor is located on an image plane.

The first lens element with positive refractive power has a convex object-side surface, so that the total track length of the image capturing optical lens assembly can be reduced by adjusting the positive refractive power of the first lens element.

The second lens element has negative refractive power, so that the aberration generated from the first lens element can be corrected. The second lens element has a concave object-side surface, so that the astigmatism of the image capturing optical lens assembly can be corrected.

The third lens element has negative refractive power. Therefore, the chromatic aberration and the Petzval sum of the image capturing optical lens assembly can be corrected effectively, so that the peripheral field of view can be better focused on the image plane with higher resolving power.

The fifth lens element with positive refractive power has a convex image-side surface, so that the sensitivity of the image capturing optical lens assembly can be reduced.

The sixth lens element can have negative refractive power, and has a concave image-side surface. Therefore, the principal point of the image capturing optical lens assembly can be positioned away from the image plane, and the back focal length thereof can be reduced so as to maintain the compact size of the image capturing optical lens assembly. Furthermore, the sixth lens element has at least one inflection point on the image-side surface thereof, so that the incident angle of the off-axis field on the image sensor can be effectively reduced for increasing the responding efficiency of the image sensor, and the aberration of the off-axis field can be further corrected.

When a curvature of the object-side surface of the second lens element is C3, and a curvature of an image-side surface of the second lens element is C4, the following relationship is satisfied:

$$0 < (C3-C4)/(C3+C4) < 5.0.$$

Therefore, the astigmatism and the coma of the image capturing optical lens assembly can be corrected by adjusting the curvature of the surfaces of the second lens element, and the image quality of the image capturing optical lens assembly can be enhanced so as to obtain a better resolving power.

C3 and C4 can preferably satisfy the following relationship:

$$0<(C3-C4)/(C3+C4)<2.0.$$

Moreover, C3 and C4 may satisfy the following relationship:

$$0.3<(C3-C4)/(C3+C4)\leq1.0.$$

When an axial distance between the stop and a non-axial critical point on the image-side surface of the sixth lens element is Dsc, and an axial distance between the object-side surface of the first lens element and the image plane is TL, the following relationship is satisfied:

$$0.5<Dsc/TL<1.0.$$

Therefore, the telecentric characteristic and the wide-angle characteristic of the image capturing optical lens assembly can be well balanced.

When a focal length of the second lens element is f2, and a focal length of the third lens element is f3, the following relationship is satisfied:

$$0<f2/f3<0.6.$$

Therefore, the distribution of the negative refractive power of the image capturing optical lens assembly can be balanced for correcting the chromatic aberration and the Petzval sum thereof.

When an Abbe number of the first lens element is V1, an Abbe number of the second lens element is V2, and an Abbe number of the third lens element is V3, the following relationship is satisfied:

$$0.5<(V2+V3)/V1<1.0.$$

Therefore, the chromatic aberration of the image capturing optical lens assembly can be corrected effectively.

When a central thickness of the second lens element is CT2, a central thickness of the third lens element is CT3, and a focal length of the image capturing optical lens assembly is f, the following relationship is satisfied:

$$0.08<(CT2+CT3)/f<0.16.$$

Therefore, the thickness of the lens elements of the image capturing optical lens assembly are proper for manufacturing, so that the production yield rate of the lens elements is improved.

When a curvature radius of an object-side surface of the sixth lens element is R11, and a curvature radius of the image-side surface of the sixth lens element is R12, the following relationship is satisfied:

$$-0.85<R12/R11<0.4.$$

Therefore, the back focal length of the image capturing optical lens assembly can be reduced by adjusting the curvature of the surfaces of the sixth lens element. Accordingly, the compact size of the image capturing optical lens assembly can be maintained.

When the focal length of the second lens element is f2, and a curvature radius of the image-side surface of the second lens element is R4, the following relationship is satisfied:

$$0<f2/R4<1.5.$$

Therefore, the astigmatism and the aberration of the image capturing optical lens assembly can be corrected by adjusting the refractive power and the curvature of the image-side surface of the second lens element, and the image quality thereof can be enhanced thereby.

When the focal length of the image capturing optical lens assembly is f, the focal length of the second lens element is f2, the focal length of the third lens element is f3, a focal length of the fourth lens element is f4, a focal length of the fifth lens element is f5, and a focal length of the sixth lens element is f6, the following relationship is satisfied:

$$0.1<(|f/f2|+|f/f3|+|f/f4|)/(|f/f5|+|f/f6|)<0.6.$$

Therefore, the distribution of the refractive power of the image capturing optical lens assembly can be balanced by adjusting the refractive power of the second lens element, the third lens element, the fourth lens element, the fifth lens element and the sixth lens element. Furthermore, the sensitivity of the image capturing optical lens assembly can be reduced.

When a curvature of an object-side surface of the third lens element is C5, and a curvature of an image-side surface of the third lens element is C6, the following relationship is satisfied:

$$-0.4<(C5-C6)/(C5+C6)<0.$$

Therefore, the astigmatism of the image capturing optical lens assembly can be corrected by adjusting the curvature of the surfaces of the third lens element, and the image quality thereof can be enhanced.

When a maximum image height of the image capturing optical lens assembly is ImgH, and the focal length of the image capturing optical lens assembly is f, the following relationship is satisfied:

$$0.65<ImgH/f<0.95.$$

Therefore, the compact size of the image capturing optical lens assembly can be maintained for applying to thin and portable electronics.

According to the image capturing optical lens assembly of the present disclosure, the lens elements thereof can be made of plastic or glass material. When the lens elements are made of glass material, the distribution of the refractive power of the image capturing optical lens assembly may be more flexible to design. When the lens elements are made of plastic material, the manufacturing costs can be effectively reduced. Furthermore, the surfaces of each lens element can be aspheric, so that it is easier to make the surfaces into non-spherical shapes. As a result, more controllable variables are obtained, and the aberration is reduced, as well as the number of required lens elements can be reduced while constructing an optical system. Therefore, the total track length of the image capturing optical lens assembly can also be reduced.

According to the image capturing optical lens assembly of the present disclosure, a critical point is a non-axial point of the lens surface where its tangent is perpendicular to the optical axis.

According to the image capturing optical lens assembly of the present disclosure, each of the object-side surface and the image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the paraxial region of the surface is convex; when the lens element has a concave surface, it indicates that the paraxial region of the surface is concave.

According to the image capturing optical lens assembly of the present disclosure, the image capturing optical lens assembly can include at least one stop, such as an aperture stop, a glare stop, or a field stop, etc. Said glare stop or said field stop is allocated for reducing stray light while retaining high image quality. Furthermore, an aperture stop can be configured as a front stop or a middle stop. A front stop disposed between an object and the first lens element provides a longer distance from an exit pupil of the system to the image plane and thereby the generated telecentric effect improves the image-sensing efficiency of the image sensor. A middle stop disposed between the first lens element and the image plane is favorable for enlarging the field of view of the image capturing optical lens assembly and thereby provides a wider field of view for the same.

According to the image capturing optical lens assembly of the present disclosure, the image capturing optical lens assembly is featured with a good correcting ability and high image quality, and can be applied to 3D (three-dimensional) image capturing applications, in products such as digital cameras, mobile devices and tablets.

According to the above description of the present disclosure, the following 1st-13th specific embodiments are provided for further explanation.

1st Embodiment

Figure 2:
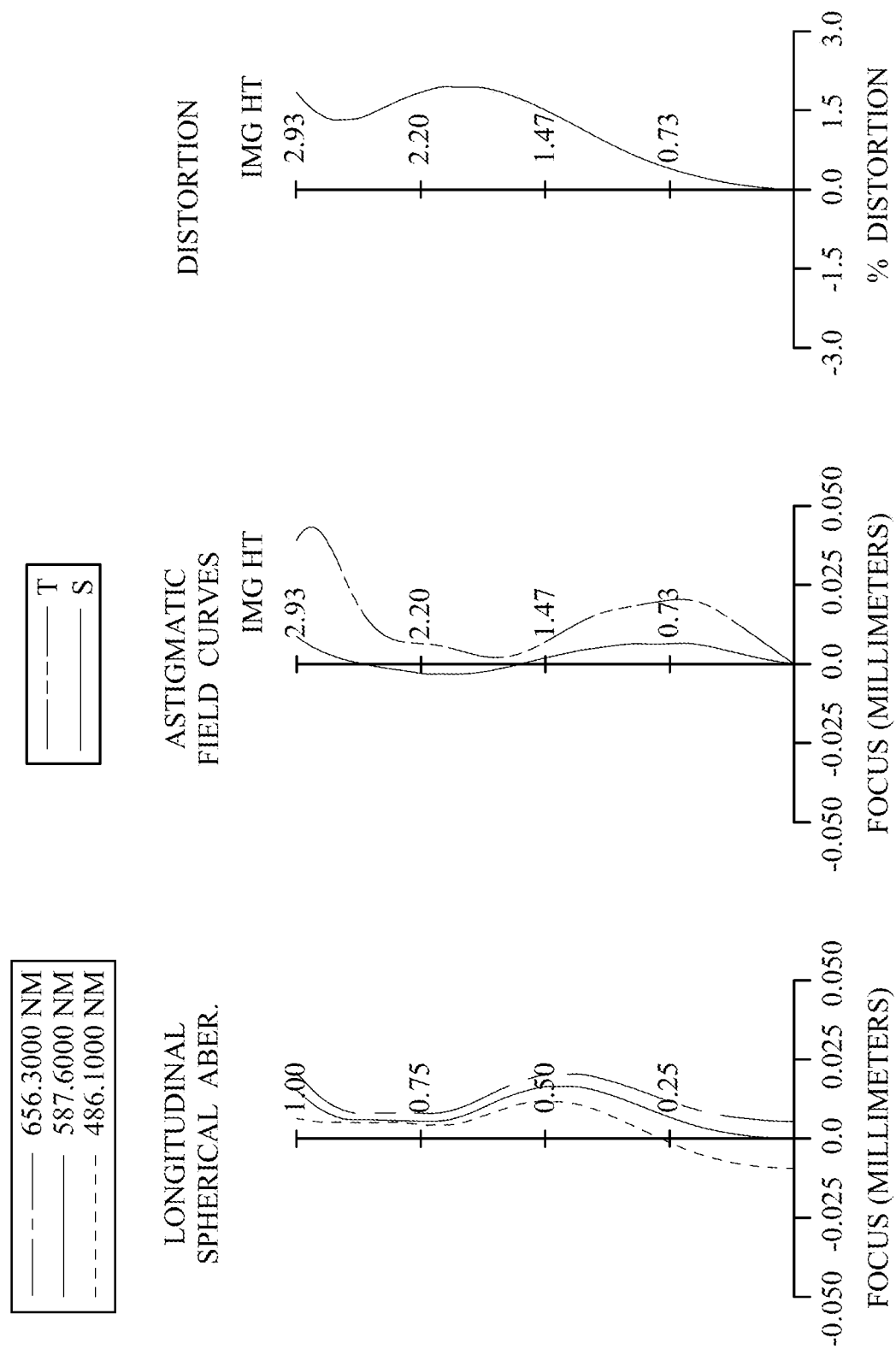
FIG. 2 shows spherical aberration curves, astigmatic field curves and a distortion curve of the image capturing optical lens assembly according to the 1st embodiment.

FIG. 1 is a schematic view of an image capturing optical lens assembly according to the 1st embodiment of the present disclosure. FIG. 2 shows spherical aberration curves, astigmatic field curves and a distortion curve of the image capturing optical lens assembly according to the 1st embodiment. In FIG. 1, the image capturing optical lens assembly includes, in order from an object side to an image side, an aperture stop 100, a first lens element 110, a second lens element 120, a third lens element 130, a fourth lens element 140, a fifth lens element 150, a sixth lens element 160, an IR-cut filter 180, an image plane 170, and an image sensor 190.

The first lens element 110 with positive refractive power has a convex object-side surface 111 and a convex image-side surface 112. The first lens element 110 is made of plastic material and has the object-side surface 111 and the image-side surface 112 being both aspheric.

The second lens element 120 with negative refractive power has a concave object-side surface 121 and a convex image-side surface 122. The second lens element 120 is made of plastic material and has the object-side surface 121 and the image-side surface 122 being both aspheric.

The third lens element 130 with negative refractive power has a convex object-side surface 131 and a concave image-side surface 132. The third lens element 130 is made of plastic material and has the object-side surface 131 and the image-side surface 132 being both aspheric.

The fourth lens element 140 with negative refractive power has a concave object-side surface 141 and a convex image-side surface 142. The fourth lens element 140 is made of plastic material and has the object-side surface 141 and the image-side surface 142 being both aspheric.

The fifth lens element 150 with positive refractive power has a concave object-side surface 151 and a convex image-side surface 152. The fifth lens element 150 is made of plastic material and has the object-side surface 151 and the image-side surface 152 being both aspheric.

The sixth lens element 160 with negative refractive power has a concave object-side surface 161 and a concave image-side surface 162. The sixth lens element 160 is made of plastic material and has the object-side surface 161 and the image-side surface 162 being both aspheric. Furthermore, the sixth lens element 160 has inflection points on the image-side surface 162 thereof.

The IR-cut filter 180 made of glass material is located between the sixth lens element 160 and the image plane 170, and will not affect a focal length of the image capturing optical lens assembly.

The equation of the aspheric surface profiles of the aforementioned lens elements of the 1st embodiment is expressed as follows:

$$X(Y)=(Y^2/R)/(1+\mathrm{sqrt}(1-(1+k)\times(Y/R)^2))+\Sigma_i(Ai)\times(Y^i)$$

, wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the image capturing optical lens assembly according to the 1st embodiment, when the focal length of the image capturing optical lens assembly is f, an f-number of the image capturing optical lens assembly is Fno, and half of a maximal field of view of the image capturing optical lens assembly is HFOV, these parameters have the following values:

f=3.71 mm;

Fno=2.23; and

HFOV=37.8 degrees.

In the image capturing optical lens assembly according to the 1st embodiment, when an Abbe number of the first lens element 110 is V1, an Abbe number of the second lens element 120 is V2, and an Abbe number of the third lens element 130 is V3, the following relationship is satisfied:

$$(V2+V3)/V1=0.83.$$

In the image capturing optical lens assembly according to the 1st embodiment, when a central thickness of the second lens element 120 is CT2, a central thickness of the third lens element 130 is CT3, and the focal length of the image capturing optical lens assembly is f, the following relationship is satisfied:

$$(CT2+CT3)/f=0.13.$$

In the image capturing optical lens assembly according to the 1st embodiment, when a focal length of the second lens element 120 is f2, and a curvature radius of the image-side surface 122 of the second lens element 120 is R4, the following relationship is satisfied:

$$f2/R4=0.09.$$

In the image capturing optical lens assembly according to the 1st embodiment, when a curvature radius of the object-side surface 161 of the sixth lens element 160 is R11, and a curvature radius of the image-side surface 162 of the sixth lens element 160 is R12, the following relationships are satisfied:

$$R12/R11=-0.28.$$

In the image capturing optical lens assembly according to the 1st embodiment, when a curvature of the object-side surface 121 of the second lens element 120 is C3, and a curvature of the image-side surface 122 of the second lens element 120 is C4, the following relationship is satisfied:

$$(C3-C4)/(C3+C4)=0.90.$$

In the image capturing optical lens assembly according to the 1st embodiment, when a curvature of the object-side surface 131 of the third lens element 130 is C5, and a curvature of the image-side surface 132 of the third lens element 130 is C6, the following relationship is satisfied:

$(C5-C6)/(C5+C6)=-0.35$.

In the image capturing optical lens assembly according to the 1st embodiment, when the focal length of the second lens element 120 is f2, and a focal length of the third lens element 130 is f3, the following relationship is satisfied:

$f2/f3=0.36$.

In the image capturing optical lens assembly according to the 1st embodiment, when the focal length of the image capturing optical lens assembly is f, the focal length of the second lens element 120 is f2, the focal length of the third lens element 130 is f3, a focal length of the fourth lens element 140 is f4, a focal length of the fifth lens element 150 is f5, and a focal length of the sixth lens element 160 is f6, the following relationship is satisfied:

$(|f/f2|+|f/f3|+|f/f4|)/(|f/f5|+|f/f6|)=0.27$.

Figure 27:
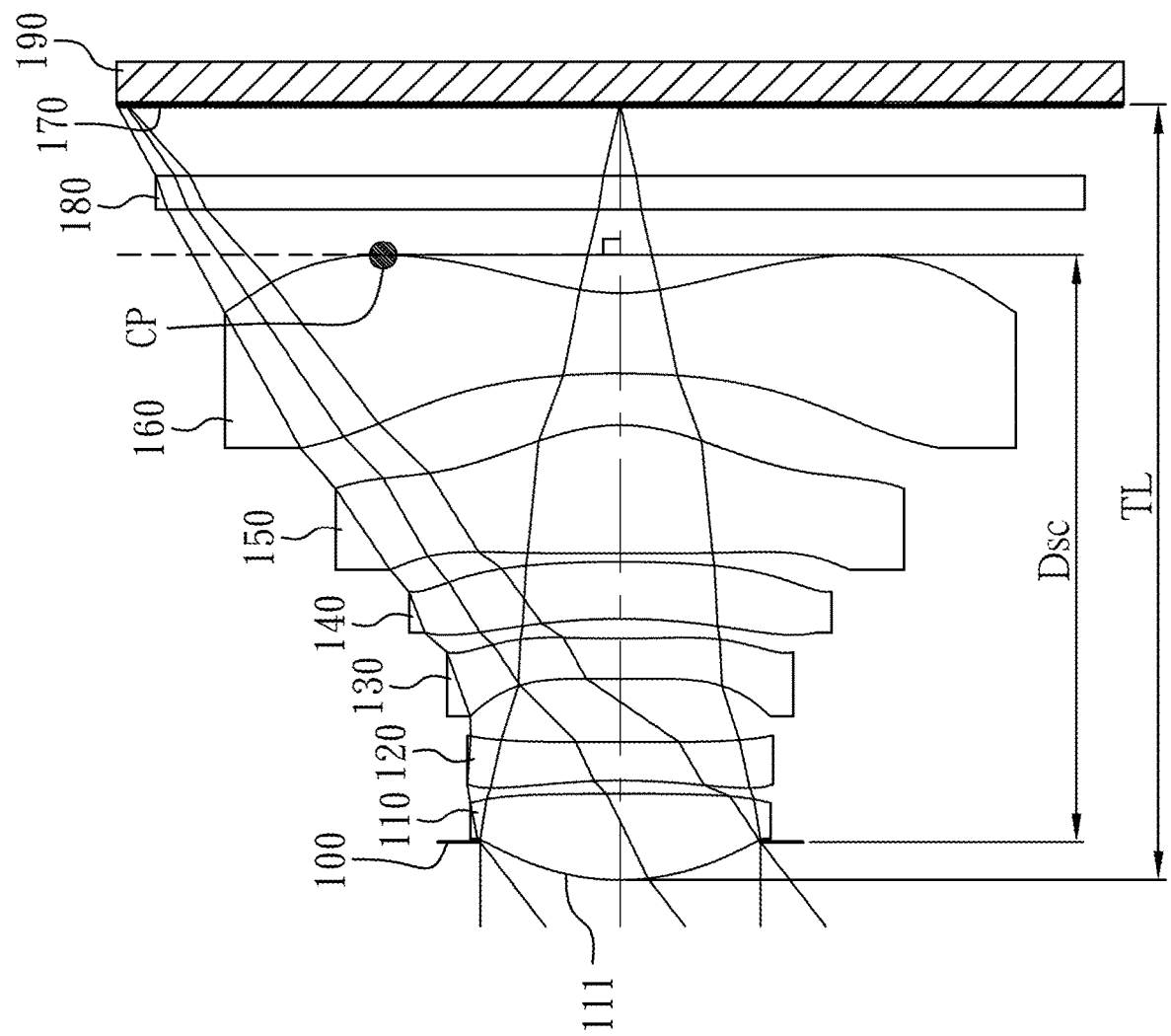
FIG. 27 shows Dsc, TL, a critical point and a tangent of the critical point of the image capturing optical lens assembly as illustrated in FIG. 1.

FIG. 27 shows Dsc, TL, a critical point CP and a tangent of the critical point CP of the image capturing optical lens assembly as illustrated in FIG. 1. In FIG. 27, when an axial distance between the stop 100 and the non-axial critical point CP on the image-side surface 162 of the sixth lens element 160 is Dsc, and an axial distance between the object-side surface 111 of the first lens element 110 and the image plane 170 is TL, the following relationship is satisfied:

$Dsc/TL=0.76$.

In the image capturing optical lens assembly according to the 1st embodiment, when a maximum image height of the image capturing optical lens assembly is ImgH which here is a half of the diagonal length of the photosensitive area of the image sensor 190 on the image plane 170, and the focal length of the image capturing optical lens assembly is f, the following relationship is satisfied:

$ImgH/f=0.79$.

The detailed optical data of the 1st embodiment are shown in Table 1, and the aspheric surface data are shown in Table 2 below.

TABLE 1

1st Embodiment
f = 3.71 mm, Fno = 2.23, HFOV = 37.8 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.224 | | | | |
| 2 | Lens 1 | 1.473 | (ASP) | 0.514 | Plastic | 1.544 | 55.9 | 2.61 |
| 3 | | −34.900 | (ASP) | 0.078 | | | | |
| 4 | Lens 2 | −4.004 | (ASP) | 0.230 | Plastic | 1.640 | 23.3 | −6.63 |
| 5 | | −73.655 | (ASP) | 0.371 | | | | |
| 6 | Lens 3 | 12.611 | (ASP) | 0.240 | Plastic | 1.640 | 23.3 | −18.37 |
| 7 | | 6.039 | (ASP) | 0.117 | | | | |
| 8 | Lens 4 | −3.801 | (ASP) | 0.338 | Plastic | 1.544 | 55.9 | −13.79 |
| 9 | | −7.943 | (ASP) | 0.050 | | | | |
| 10 | Lens 5 | −88.815 | (ASP) | 0.763 | Plastic | 1.544 | 55.9 | 2.02 |
| 11 | | −1.087 | (ASP) | 0.306 | | | | |
| 12 | Lens 6 | −4.704 | (ASP) | 0.476 | Plastic | 1.544 | 55.9 | −1.84 |
| 13 | | 1.320 | (ASP) | 0.500 | | | | |
| 14 | IR-cut filter | Plano | | 0.200 | Glass | 1.517 | 64.2 | — |
| 15 | | Plano | | 0.419 | | | | |
| 16 | Image | Plano | | — | | | | |

Note:
Reference wavelength (d-line) is 587.6 nm.

TABLE 2

Aspheric Coefficients

| Surface # | 2 | 3 | 4 | 5 |
|---|---|---|---|---|
| k = | −3.8338E+00 | −1.0000E+00 | −2.9113E+01 | −1.0000E+00 |
| A4 = | 1.4216E−01 | −6.7182E−02 | −2.9974E−02 | 1.6148E−02 |
| A6 = | −8.1062E−02 | 1.0470E−01 | 1.7401E−01 | 1.5689E−01 |
| A8 = | 2.1141E−01 | −8.9736E−02 | 2.1078E−01 | −1.5522E−01 |
| A10 = | −6.9134E−01 | −3.7516E−01 | −1.3132E+00 | −7.6187E−02 |
| A12 = | 9.1718E−01 | 6.4440E−01 | 1.8768E+00 | 1.9346E−01 |
| A14 = | −5.3981E−01 | −3.1414E−01 | −7.9026E−01 | −5.4330E−02 |

| Surface # | 6 | 7 | 8 | 9 |
|---|---|---|---|---|
| k = | −3.0000E+01 | −3.0000E+01 | 1.2152E+00 | −2.1714E+01 |
| A4 = | −4.0944E−01 | −2.5971E−01 | 1.2443E−02 | −3.2285E−02 |
| A6 = | 5.6034E−02 | −4.5719E−02 | 1.7061E−02 | −2.9268E−02 |
| A8 = | −3.9432E−01 | 9.6953E−02 | 1.1957E−02 | −5.3633E−03 |
| A10 = | 7.0026E−01 | 7.7114E−02 | −2.3175E−03 | 4.4995E−03 |
| A12 = | −3.4024E−01 | −2.4413E−02 | 3.4728E−03 | 4.8113E−03 |
| A14 = | | 2.9807E−10 | −1.0347E−03 | 9.1697E−04 |

| Surface # | 10 | 11 | 12 | 13 |
|---|---|---|---|---|
| k = | 0.0000E+00 | −4.6442E+00 | −2.7577E+01 | −8.0744E+00 |
| A4 = | 5.6027E−02 | −3.6485E−02 | −3.8100E−02 | −6.3110E−02 |
| A6 = | −2.6903E−03 | 1.6470E−01 | −2.6604E−02 | 2.1789E−02 |
| A8 = | −1.2799E−01 | −1.1043E−01 | 2.5484E−02 | −6.6809E−03 |
| A10 = | 1.3447E−01 | 3.2565E−02 | −7.4111E−03 | 1.3230E−03 |
| A12 = | −6.4131E−02 | −4.5561E−03 | 9.5762E−04 | −1.6652E−04 |
| A14 = | 1.2067E−02 | 2.2699E−04 | −4.5791E−05 | 9.9818E−06 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. This information related to Table 1 and Table 2 applies also to the Tables for the remaining embodiments, and so an explanation in this regard will not be provided again.

2nd Embodiment

Figure 3:
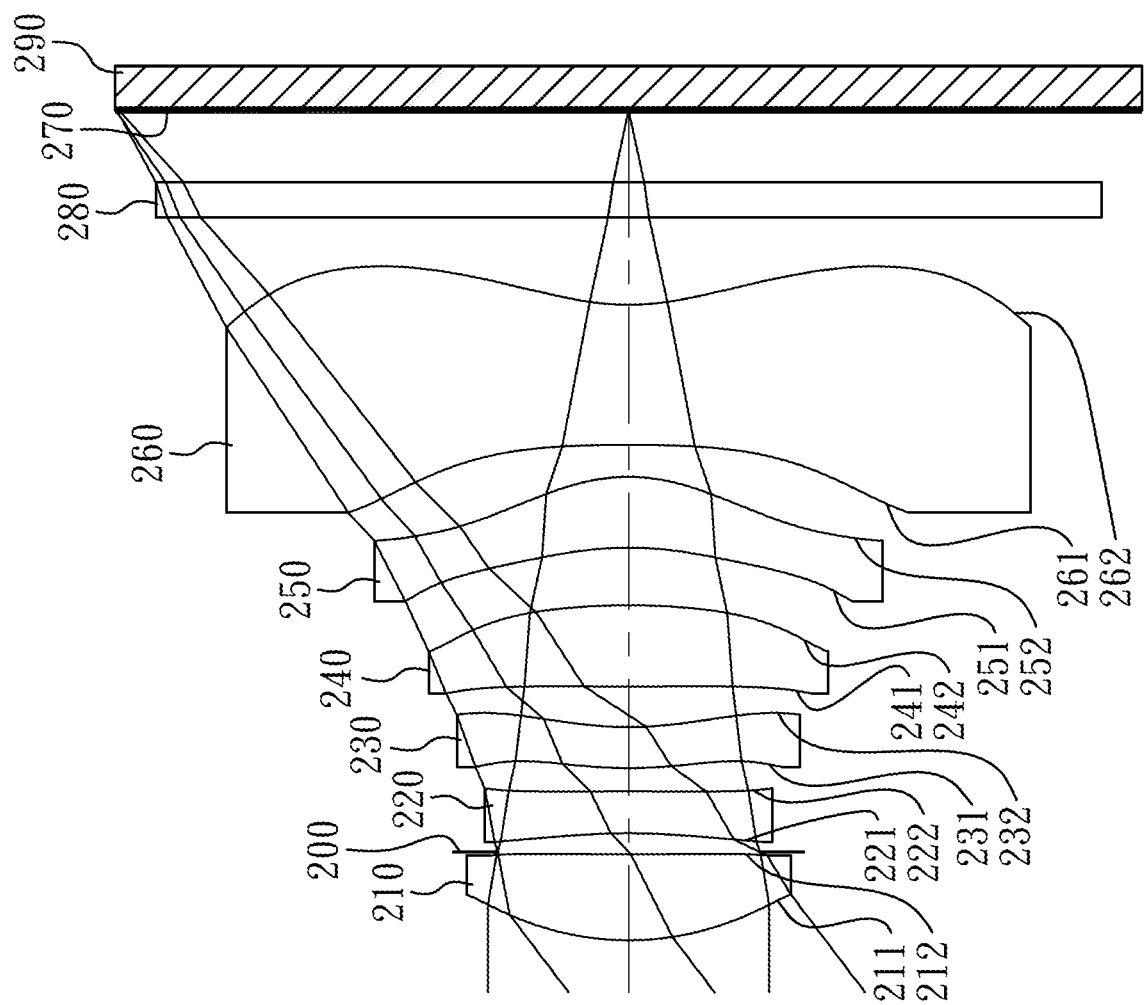
FIG. 3 is a schematic view of an image capturing optical lens assembly according to the 2nd embodiment of the present disclosure.
Figure 4:
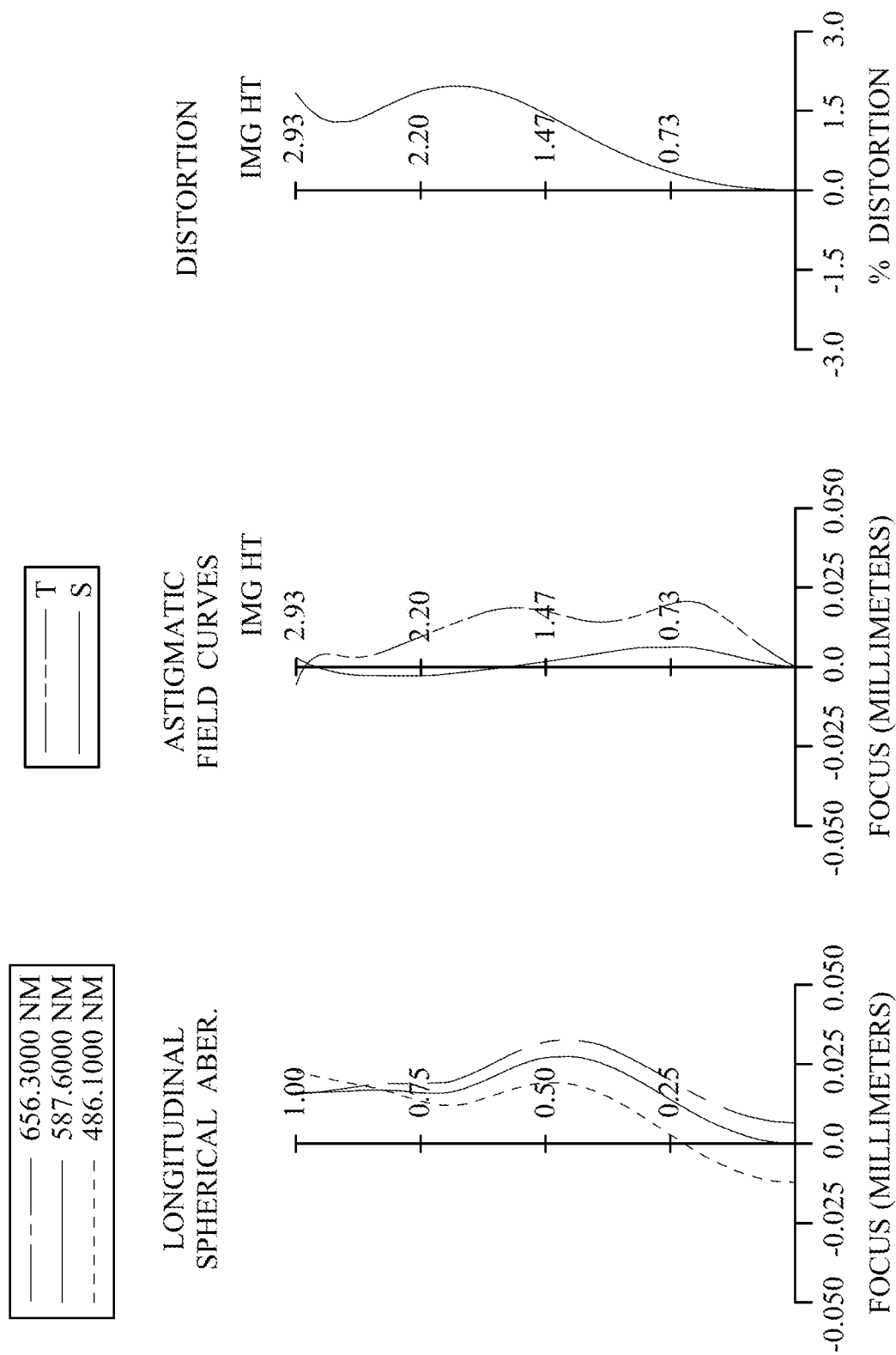
FIG. 4 shows spherical aberration curves, astigmatic field curves and a distortion curve of the image capturing optical lens assembly according to the 2nd embodiment.

FIG. 3 is a schematic view of an image capturing optical lens assembly according to the 2nd embodiment of the present disclosure. FIG. 4 shows spherical aberration curves, astigmatic field curves and a distortion curve of the image capturing optical lens assembly according to the 2nd embodiment. In FIG. 3, the image capturing optical lens assembly includes, in order from an object side to an image side, a first lens element 210, an aperture stop 200, a second lens element 220, a third lens element 230, a fourth lens element 240, a fifth lens element 250, a sixth lens element 260, an IR-cut filter 280, an image plane 270, and an image sensor 290.

The first lens element 210 with positive refractive power has a convex object-side surface 211 and a concave image-side surface 212. The first lens element 210 is made of plastic material and has the object-side surface 211 and the image-side surface 212 being both aspheric.

The second lens element 220 with negative refractive power has a concave object-side surface 221 and a convex image-side surface 222. The second lens element 220 is made of plastic material and has the object-side surface 221 and the image-side surface 222 being both aspheric.

The third lens element 230 with negative refractive power has a convex object-side surface 231 and a concave image-side surface 232. The third lens element 230 is made of plastic material and has the object-side surface 231 and the image-side surface 232 being both aspheric.

The fourth lens element 240 with positive refractive power has a convex object-side surface 241 and a convex image-side surface 242. The fourth lens element 240 is made of plastic material and has the object-side surface 241 and the image-side surface 242 being both aspheric.

The fifth lens element 250 with positive refractive power has a concave object-side surface 251 and a convex image-side surface 252. The fifth lens element 250 is made of plastic material and has the object-side surface 251 and the image-side surface 252 being both aspheric.

The sixth lens element 260 with negative refractive power has a concave object-side surface 261 and a concave image-side surface 262. The sixth lens element 260 is made of plastic material and has the object-side surface 261 and the image-side surface 262 being both aspheric. Furthermore, the sixth lens element 260 has inflection points on the image-side surface 262 thereof.

The IR-cut filter 280 made of glass material is located between the sixth lens element 260 and the image plane 270, and will not affect a focal length of the image capturing optical lens assembly.

The detailed optical data of the 2nd embodiment are shown in Table 3, and the aspheric surface data are shown in Table 4 below.

TABLE 3

2nd Embodiment
f = 3.78 mm, Fno = 2.35, HFOV = 37.2 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.648 | (ASP) | 0.492 | Plastic | 1.544 | 55.9 | 3.18 |
| 2 | | 30.816 | (ASP) | 0.013 | | | | |
| 3 | Ape. Stop | Plano | | 0.107 | | | | |
| 4 | Lens 2 | −3.759 | (ASP) | 0.240 | Plastic | 1.640 | 23.3 | −6.69 |
| 5 | | −31.669 | (ASP) | 0.133 | | | | |
| 6 | Lens 3 | 2.354 | (ASP) | 0.235 | Plastic | 1.640 | 23.3 | −37.19 |
| 7 | | 2.059 | (ASP) | 0.232 | | | | |
| 8 | Lens 4 | 46.550 | (ASP) | 0.465 | Plastic | 1.544 | 55.9 | 6.77 |
| 9 | | −3.988 | (ASP) | 0.330 | | | | |
| 10 | Lens 5 | −1.896 | (ASP) | 0.406 | Plastic | 1.544 | 55.9 | 3.30 |
| 11 | | −0.992 | (ASP) | 0.183 | | | | |
| 12 | Lens 6 | −8.393 | (ASP) | 0.801 | Plastic | 1.544 | 55.9 | −2.11 |
| 13 | | 1.377 | (ASP) | 0.500 | | | | |
| 14 | IR-cut filter | Plano | | 0.200 | Glass | 1.517 | 64.2 | — |
| 15 | | Plano | | 0.415 | | | | |
| 16 | Image | Plano | | — | | | | |

Note:
Reference wavelength (d-line) is 587.6 nm.

TABLE 4

Aspheric Coefficients

| Surface # | 1 | 2 | 4 | 5 |
|---|---|---|---|---|
| k = | −4.3720E+00 | −1.0000E+00 | −8.7825E−01 | −3.0000E+01 |
| A4 = | 1.2162E−01 | −1.4605E−02 | 1.3567E−01 | 6.8476E−02 |
| A6 = | −1.0729E−01 | −4.9334E−02 | −1.0978E−01 | −4.4189E−02 |
| A8 = | 3.1552E−01 | 1.3215E−01 | 4.4090E−02 | −4.1135E−02 |
| A10 = | −7.2424E−01 | −5.3851E−01 | −3.4681E−01 | 9.8854E−02 |
| A12 = | 8.0549E−01 | 8.4634E−01 | 1.1126E+00 | 2.0394E−01 |
| A14 = | −3.7914E−01 | −5.0760E−01 | −8.8583E−01 | −2.1609E−01 |

| Surface # | 6 | 7 | 8 | 9 |
|---|---|---|---|---|
| k = | 2.9990E+00 | 1.9319E+00 | −3.0000E+01 | −3.0000E+01 |
| A4 = | −3.3002E−01 | −2.2650E−01 | −2.5197E−02 | −6.9768E−02 |
| A6 = | 8.1739E−02 | −2.9738E−02 | −2.1466E−02 | −4.9231E−02 |
| A8 = | −3.3974E−01 | 1.4694E−01 | 9.2536E−03 | −1.3937E−03 |
| A10 = | 3.9517E−01 | 1.7162E−01 | −1.9460E−03 | 7.7438E−03 |
| A12 = | −9.3273E−02 | −2.2954E−02 | 2.5795E−03 | 5.7532E−03 |
| A14 = | | 3.2777E−03 | −4.5674E−03 | 3.9470E−03 |

| Surface # | 10 | 11 | 12 | 13 |
|---|---|---|---|---|
| k = | −2.0445E+00 | −3.6949E+00 | −1.0000E+00 | −8.5441E+00 |
| A4 = | 1.3297E−01 | −3.6615E−02 | −5.9571E−02 | −5.8798E−02 |
| A6 = | −3.5573E−04 | 1.7025E−01 | −2.4867E−02 | 2.0639E−02 |
| A8 = | −1.4231E−01 | −1.1156E−01 | 2.7059E−02 | −6.7998E−03 |
| A10 = | 1.3166E−01 | 3.1627E−02 | −7.4817E−03 | 1.4333E−03 |
| A12 = | −6.2943E−02 | −4.6469E−03 | 8.2840E−04 | −1.8522E−04 |
| A14 = | 1.3113E−02 | 4.6426E−04 | 8.0095E−07 | 1.0634E−05 |

In the image capturing optical lens assembly according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following relationships:

| f (mm) | 3.78 | (C3 − C4)/(C3 + C4) | 0.79 |
|---|---|---|---|
| Fno | 2.35 | (C5 − C6)/(C5 + C6) | −0.07 |
| HFOV (deg.) | 37.2 | f2/f3 | 0.18 |
| (V2 + V3)/V1 | 0.83 | (\|f/f2\| + \|f/f3\| + \|f/f4\|)/(\|f/f5\| + \|f/f6\|) | 0.42 |
| (CT2 + CT3)/f | 0.13 | Dsc/TL | 0.71 |
| f2/R4 | 0.21 | ImgH/f | 0.78 |
| R12/R11 | −0.16 | | |

3rd Embodiment

Figure 5:
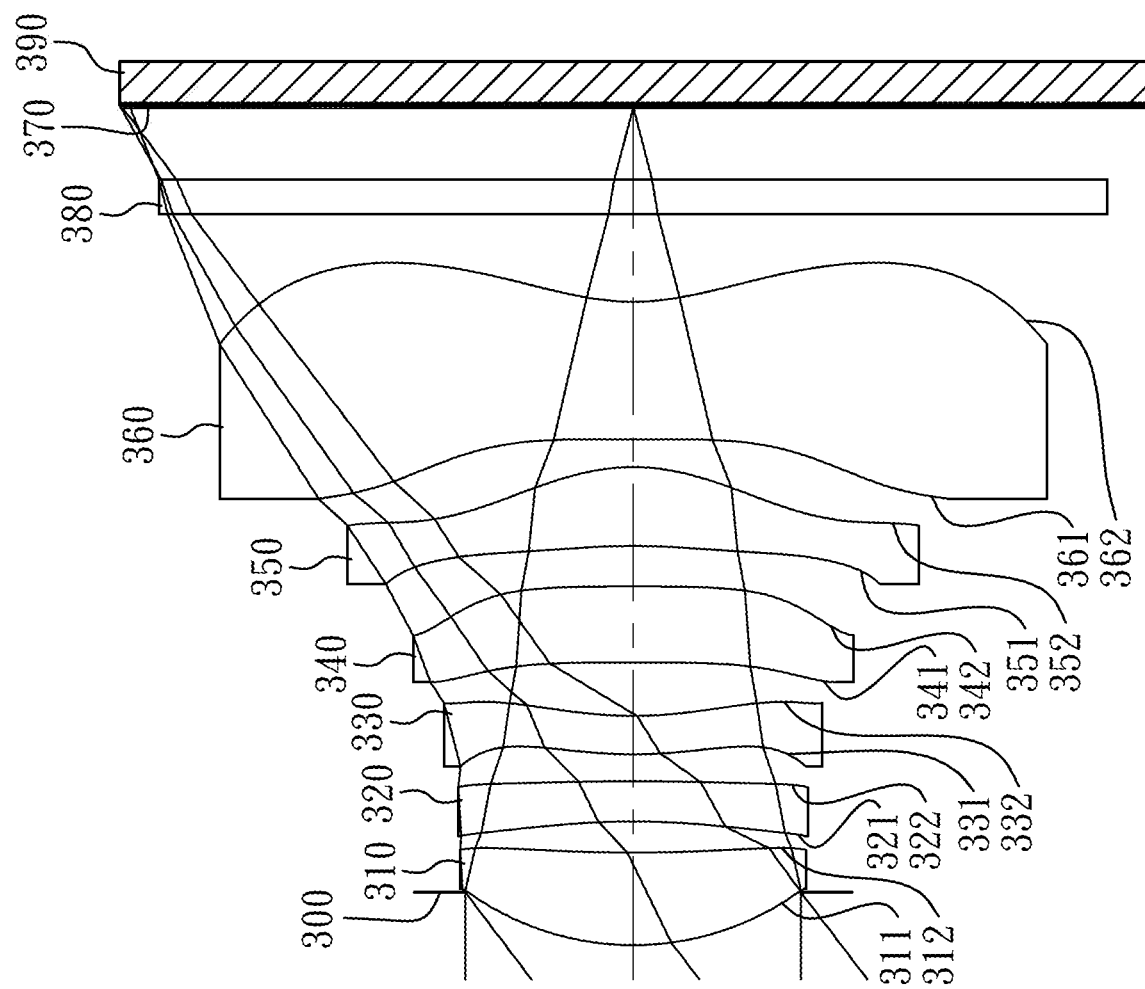
FIG. 5 is a schematic view of an image capturing optical lens assembly according to the 3rd embodiment of the present disclosure.
Figure 6:
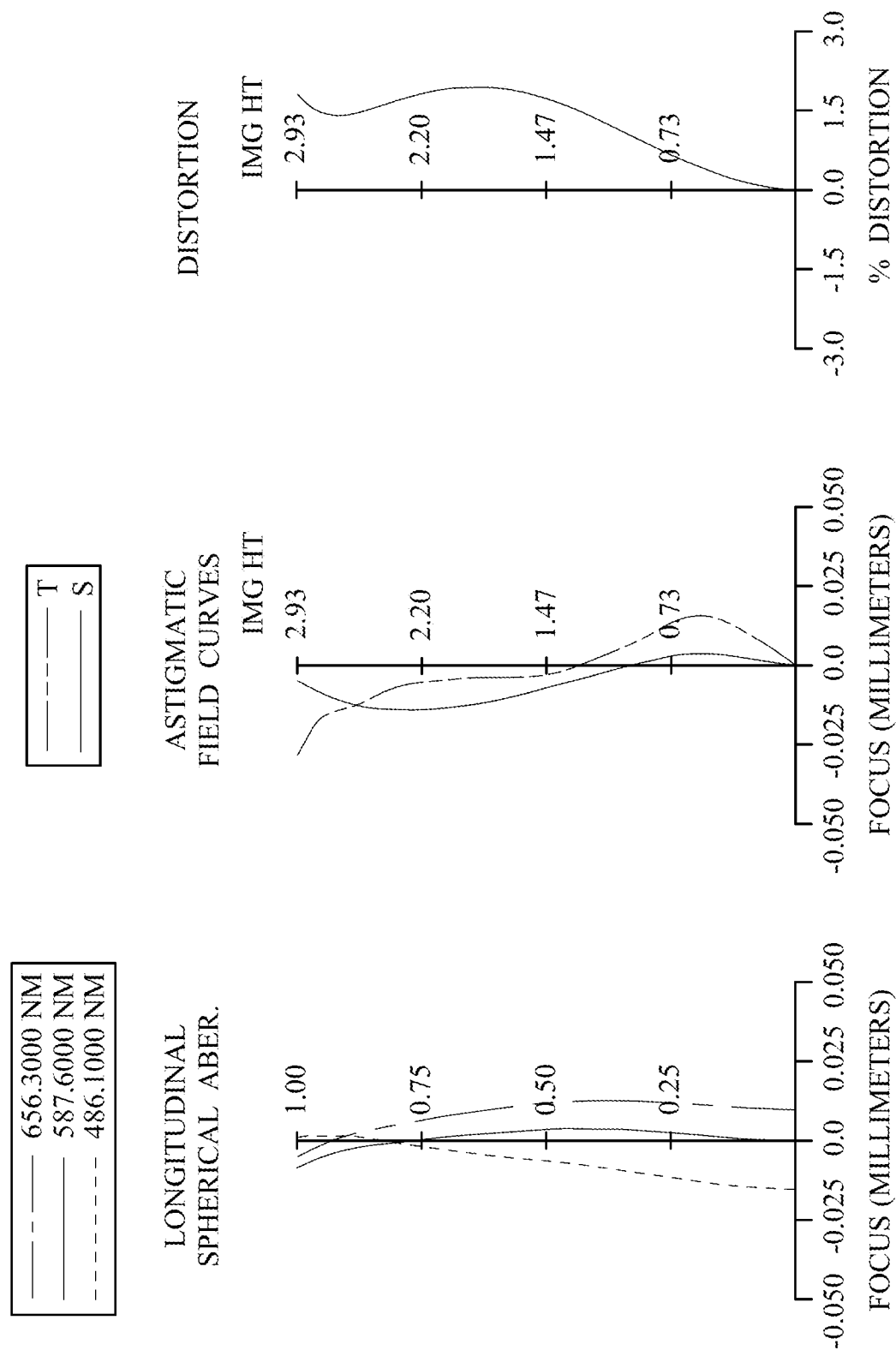
FIG. 6 shows spherical aberration curves, astigmatic field curves and a distortion curve of the image capturing optical lens assembly according to the 3rd embodiment.

FIG. 5 is a schematic view of an image capturing optical lens assembly according to the 3rd embodiment of the present disclosure. FIG. 6 shows spherical aberration curves, astigmatic field curves and a distortion curve of the image capturing optical lens assembly according to the 3rd embodiment. In FIG. 5, the image capturing optical lens assembly includes, in order from an object side to an image side, an aperture stop 300, a first lens element 310, a second lens element 320, a third lens element 330, a fourth lens element 340, a fifth lens element 350, a sixth lens element 360, an IR-cut filter 380, an image plane 370, and an image sensor 390.

The first lens element 310 with positive refractive power has a convex object-side surface 311 and a concave image-side surface 312. The first lens element 310 is made of plastic material and has the object-side surface 311 and the image-side surface 312 being both aspheric.

The second lens element 320 with negative refractive power has a concave object-side surface 321 and a convex image-side surface 322. The second lens element 320 is made of plastic material and has the object-side surface 321 and the image-side surface 322 being both aspheric.

The third lens element 330 with negative refractive power has a convex object-side surface 331 and a concave image-side surface 332. The third lens element 330 is made of plastic material and has the object-side surface 331 and the image-side surface 332 being both aspheric.

The fourth lens element 340 with positive refractive power has a concave object-side surface 341 and a convex image-side surface 342. The fourth lens element 340 is made of plastic material and has the object-side surface 341 and the image-side surface 342 being both aspheric.

The fifth lens element 350 with positive refractive power has a concave object-side surface 351 and a convex image-side surface 352. The fifth lens element 350 is made of plastic material and has the object-side surface 351 and the image-side surface 352 being both aspheric.

The sixth lens element 360 with negative refractive power has a convex object-side surface 361 and a concave image-side surface 362. The sixth lens element 360 is made of plastic material and has the object-side surface 361 and the image-side surface 362 being both aspheric. Furthermore, the sixth lens element 360 has inflection points on the image-side surface 362 thereof.

The IR-cut filter 380 made of glass material is located between the sixth lens element 360 and the image plane 370, and will not affect a focal length of the image capturing optical lens assembly.

The detailed optical data of the 3rd embodiment are shown in Table 5, and the aspheric surface data are shown in Table 6 below.

TABLE 5

3rd Embodiment
f = 3.80 mm, Fno = 1.98, HFOV = 37.2 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.302 | | | | |
| 2 | Lens 1 | 1.630 | (ASP) | 0.529 | Plastic | 1.565 | 58.0 | 3.47 |
| 3 | | 8.540 | (ASP) | 0.178 | | | | |
| 4 | Lens 2 | −4.322 | (ASP) | 0.230 | Plastic | 1.650 | 21.4 | −9.11 |
| 5 | | −16.340 | (ASP) | 0.154 | | | | |
| 6 | Lens 3 | 2.464 | (ASP) | 0.220 | Plastic | 1.650 | 21.4 | −108.64 |
| 7 | | 2.297 | (ASP) | 0.305 | | | | |
| 8 | Lens 4 | −100.000 | (ASP) | 0.435 | Plastic | 1.544 | 55.9 | 65.69 |
| 9 | | −26.372 | (ASP) | 0.232 | | | | |
| 10 | Lens 5 | −3.801 | (ASP) | 0.451 | Plastic | 1.535 | 55.7 | 2.94 |
| 11 | | −1.159 | (ASP) | 0.158 | | | | |
| 12 | Lens 6 | 42.485 | (ASP) | 0.787 | Plastic | 1.535 | 55.7 | −2.59 |
| 13 | | 1.332 | (ASP) | 0.500 | | | | |
| 14 | IR-cut filter | Plano | | 0.200 | Glass | 1.517 | 64.2 | — |
| 15 | | Plano | | 0.424 | | | | |
| 16 | Image | Plano | | — | | | | |

Note:
Reference wavelength (d-line) is 587.6 nm.

TABLE 6

Aspheric Coefficients

| Surface # | 2 | 3 | 4 | 5 |
|---|---|---|---|---|
| k = | −8.0547E+00 | −1.0000E+00 | 6.0413E−01 | −3.0000E+01 |
| A4 = | 2.3656E−01 | −1.8800E−02 | 4.3472E−02 | −1.6158E−02 |
| A6 = | −2.6842E−01 | −5.9563E−02 | −2.6734E−02 | 1.1228E−01 |
| A8 = | 4.2966E−01 | 2.6364E−01 | 1.7827E−01 | −1.2621E−01 |
| A10 = | −5.4345E−01 | −5.8416E−01 | −4.8321E−01 | −7.4662E−02 |
| A12 = | 4.1968E−01 | 6.0304E−01 | 5.7464E−01 | 2.4892E−01 |
| A14 = | −1.4532E−01 | −2.5082E−01 | −2.5509E−01 | −1.4919E−01 |

| Surface # | 6 | 7 | 8 | 9 |
|---|---|---|---|---|
| k = | 1.6048E+00 | 3.0000E+00 | 0.0000E+00 | −1.0920E+01 |
| A4 = | −2.4823E−01 | −1.8523E−01 | −1.0173E−01 | −5.5131E−02 |
| A6 = | 6.9329E−02 | −2.2977E−03 | −2.7791E−02 | −9.4376E−02 |
| A8 = | −2.3613E−01 | −4.6234E−02 | 6.9287E−02 | −2.7371E−02 |
| A10 = | 1.9929E−01 | 3.5220E−03 | −2.8550E−02 | 5.0445E−02 |

TABLE 6-continued

Aspheric Coefficients

| A12 = | −1.9173E−01 | 1.2148E−02 | 8.9810E−04 | −1.6368E−04 |
| A14 = | 9.6073E−02 | −8.0536E−04 | 5.0259E−03 | −2.6041E−03 |

| Surface # | 10 | 11 | 12 | 13 |
| --- | --- | --- | --- | --- |
| k = | 4.0632E−01 | −4.6987E+00 | 0.0000E+00 | −6.8336E+00 |
| A4 = | 1.5093E−01 | −8.1682E−02 | −1.3853E−01 | −7.6688E−02 |
| A6 = | −2.9416E−02 | 1.8660E−01 | 1.0607E−02 | 2.8127E−02 |
| A8 = | −1.4399E−01 | −1.0734E−01 | 2.5646E−02 | −8.5261E−03 |
| A10 = | 1.3773E−01 | 3.0925E−02 | −8.4316E−03 | 1.6263E−03 |
| A12 = | −5.0099E−02 | −4.8953E−03 | 7.7498E−04 | −1.8439E−04 |
| A14 = | 6.1875E−03 | 3.3156E−04 | 8.0095E−07 | 9.0196E−06 |

In the image capturing optical lens assembly according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following relationships:

| f (mm) | 3.80 | (C3 − C4)/(C3 + C4) | 0.58 |
| --- | --- | --- | --- |
| Fno | 1.98 | (C5 − C6)/(C5 + C6) | −0.04 |
| HFOV (deg.) | 37.2 | f2/f3 | 0.08 |
| (V2 + V3)/V1 | 0.74 | (|f/f2| + |f/f3| + |f/f4|)/(|f/f5| + |f/f6|) | 0.18 |
| (CT2 + CT3)/f | 0.12 | Dsc/TL | 0.75 |
| f2/R4 | 0.56 | ImgH/f | 0.77 |
| R12/R11 | 0.03 | | |

4th Embodiment

Figure 7:
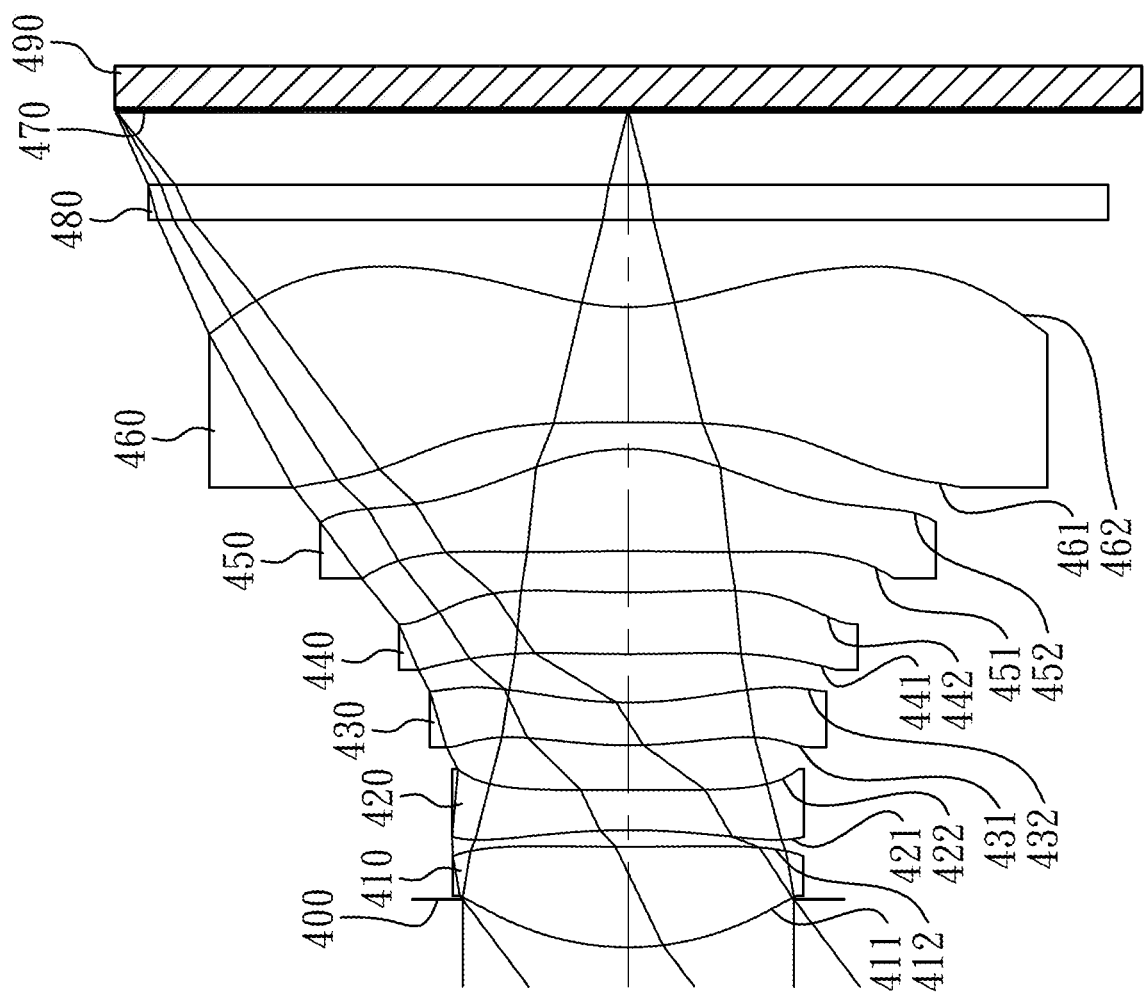
FIG. 7 is a schematic view of an image capturing optical lens assembly according to the 4th embodiment of the present disclosure.
Figure 8:
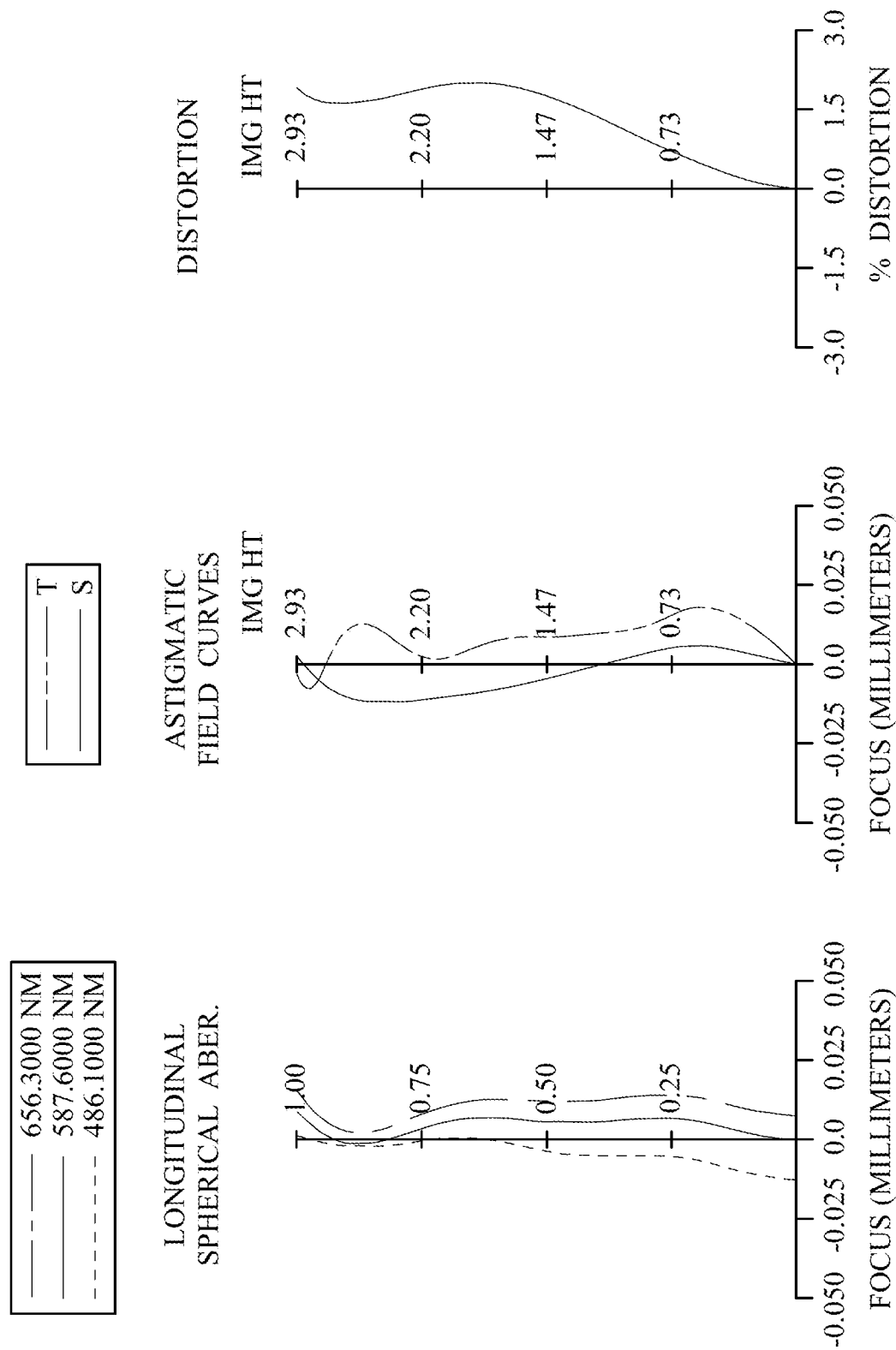
FIG. 8 shows spherical aberration curves, astigmatic field curves and a distortion curve of the image capturing optical lens assembly according to the 4th embodiment.

FIG. 7 is a schematic view of an image capturing optical lens assembly according to the 4th embodiment of the present disclosure. FIG. 8 shows spherical aberration curves, astigmatic field curves and a distortion curve of the image capturing optical lens assembly according to the 4th embodiment. In FIG. 7, the image capturing optical lens assembly includes, in order from an object side to an image side, an aperture stop 400, a first lens element 410, a second lens element 420, a third lens element 430, a fourth lens element 440, a fifth lens element 450, a sixth lens element 460, an IR-cut filter 480, an image plane 470, and an image sensor 490.

The first lens element 410 with positive refractive power has a convex object-side surface 411 and a concave image-side surface 412. The first lens element 410 is made of plastic material and has the object-side surface 411 and the image-side surface 412 being both aspheric.

The second lens element 420 with negative refractive power has a concave object-side surface 421 and a convex image-side surface 422. The second lens element 420 is made of plastic material and has the object-side surface 421 and the image-side surface 422 being both aspheric.

The third lens element 430 with negative refractive power has a convex object-side surface 431 and a concave image-side surface 432. The third lens element 430 is made of plastic material and has the object-side surface 431 and the image-side surface 432 being both aspheric.

The fourth lens element 440 with negative refractive power has a convex object-side surface 441 and a concave image-side surface 442. The fourth lens element 440 is made of plastic material and has the object-side surface 441 and the image-side surface 442 being both aspheric.

The fifth lens element 450 with positive refractive power has a concave object-side surface 451 and a convex image-side surface 452. The fifth lens element 450 is made of plastic material and has the object-side surface 451 and the image-side surface 452 being both aspheric.

The sixth lens element 460 with negative refractive power has a concave object-side surface 461 and a concave image-side surface 462. The sixth lens element 460 is made of plastic material and has the object-side surface 461 and the image-side surface 462 being both aspheric. Furthermore, the sixth lens element 460 has inflection points on the image-side surface 462 thereof.

The IR-cut filter 480 made of glass material is located between the sixth lens element 460 and the image plane 470, and will not affect a focal length of the image capturing optical lens assembly.

The detailed optical data of the 4th embodiment are shown in Table 7, and the aspheric surface data are shown in Table 8 below.

TABLE 7

4th Embodiment
f = 3.79 mm, Fno = 2.00, HFOV = 37.2 deg.

| Surface # | | Curvature Radius | | Thickness | Material | Index | Abbe # | Focal length |
| --- | --- | --- | --- | --- | --- | --- | --- | --- |
| 0 | Object | Plano | | Infinity | | | | |
| 1 | Ape. Stop | Plano | | −0.274 | | | | |
| 2 | Lens 1 | 1.615 | (ASP) | 0.575 | Plastic | 1.565 | 58.0 | 3.16 |
| 3 | | 14.803 | (ASP) | 0.096 | | | | |
| 4 | Lens 2 | −4.194 | (ASP) | 0.230 | Plastic | 1.634 | 23.8 | −6.91 |
| 5 | | −100.000 | (ASP) | 0.256 | | | | |
| 6 | Lens 3 | 2.592 | (ASP) | 0.245 | Plastic | 1.544 | 55.9 | −50.59 |
| 7 | | 2.290 | (ASP) | 0.277 | | | | |
| 8 | Lens 4 | 8.593 | (ASP) | 0.354 | Plastic | 1.544 | 55.9 | −64.92 |
| 9 | | 6.812 | (ASP) | 0.237 | | | | |
| 10 | Lens 5 | −10.727 | (ASP) | 0.585 | Plastic | 1.544 | 55.9 | 2.31 |
| 11 | | −1.145 | (ASP) | 0.152 | | | | |
| 12 | Lens 6 | −41.781 | (ASP) | 0.660 | Plastic | 1.535 | 55.7 | −2.21 |
| 13 | | 1.224 | (ASP) | 0.500 | | | | |
| 14 | IR-cut filter | Plano | | 0.200 | Glass | 1.517 | 64.2 | — |
| 15 | | Plano | | 0.430 | | | | |
| 16 | Image | Plano | | — | | | | |

Note:
Reference wavelength (d-line) is 587.6 nm.

TABLE 8

Aspheric Coefficients

| Surface # | 2 | 3 | 4 | 5 |
|---|---|---|---|---|
| k = | −9.8760E+00 | −1.0000E+00 | −1.8822E−01 | −1.3240E+01 |
| A4 = | 2.8682E−01 | −6.1960E−02 | 1.6341E−02 | 3.0800E−02 |
| A6 = | −3.7524E−01 | −6.6124E−02 | 4.7673E−02 | 1.4122E−01 |
| A8 = | 5.0885E−01 | 2.8877E−01 | 1.5195E−01 | −5.7860E−02 |
| A10 = | −5.0819E−01 | −6.0227E−01 | −4.8730E−01 | −1.3876E−01 |
| A12 = | 3.0355E−01 | 5.5615E−01 | 5.6098E−01 | 2.7058E−01 |
| A14 = | −1.0700E−01 | −2.0041E−01 | −2.0814E−01 | −9.8183E−02 |

| Surface # | 6 | 7 | 8 | 9 |
|---|---|---|---|---|
| k = | 2.4825E+00 | 2.6391E+00 | 0.0000E+00 | −1.0000E+00 |
| A4 = | −2.2217E−01 | −1.7218E−01 | −1.3247E−01 | −1.0570E−01 |
| A6 = | 4.3136E−02 | 2.4650E−03 | −1.5267E−02 | −5.8115E−02 |
| A8 = | −1.8227E−01 | −3.5520E−02 | 9.1366E−02 | −3.3875E−02 |
| A10 = | 2.1630E−01 | 5.5357E−03 | −4.9318E−02 | 5.8888E−02 |
| A12 = | −2.1944E−01 | −5.2411E−03 | −6.5058E−04 | −7.4415E−03 |
| A14 = | 1.2937E−01 | 3.7677E−03 | 4.9024E−03 | −2.2004E−03 |

| Surface # | 10 | 11 | 12 | 13 |
|---|---|---|---|---|
| k = | −2.8451E+01 | −5.1954E+00 | 0.0000E+00 | −6.8459E+00 |
| A4 = | 9.7755E−02 | −7.2992E−02 | −1.1293E−01 | −8.0499E−02 |
| A6 = | −5.7472E−03 | 1.6648E−01 | −5.8592E−04 | 3.0927E−02 |
| A8 = | −1.4004E−01 | −1.0147E−01 | 2.6943E−02 | −9.3540E−03 |
| A10 = | 1.2629E−01 | 3.1356E−02 | −8.1368E−03 | 1.7534E−03 |
| A12 = | −4.6134E−02 | −5.1244E−03 | 7.1304E−04 | −1.9053E−04 |
| A14 = | 6.2138E−03 | 3.2490E−04 | 8.0095E−07 | 9.2052E−06 |

In the image capturing optical lens assembly according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following relationships:

| | | | |
|---|---|---|---|
| f (mm) | 3.79 | (C3 − C4)/(C3 + C4) | 0.92 |
| Fno | 2.00 | (C5 − C6)/(C5 + C6) | −0.06 |
| HFOV (deg.) | 37.2 | f2/f3 | 0.14 |
| (V2 + V3)/V1 | 1.37 | (|f/f2| + |f/f3| + |f/f4|)/(|f/f5| + |f/f6|) | 0.20 |
| (CT2 + CT3)/f | 0.13 | Dsc/TL | 0.76 |
| f2/R4 | 0.07 | ImgH/f | 0.77 |
| R12/R11 | −0.03 | | |

5th Embodiment

Figure 9:
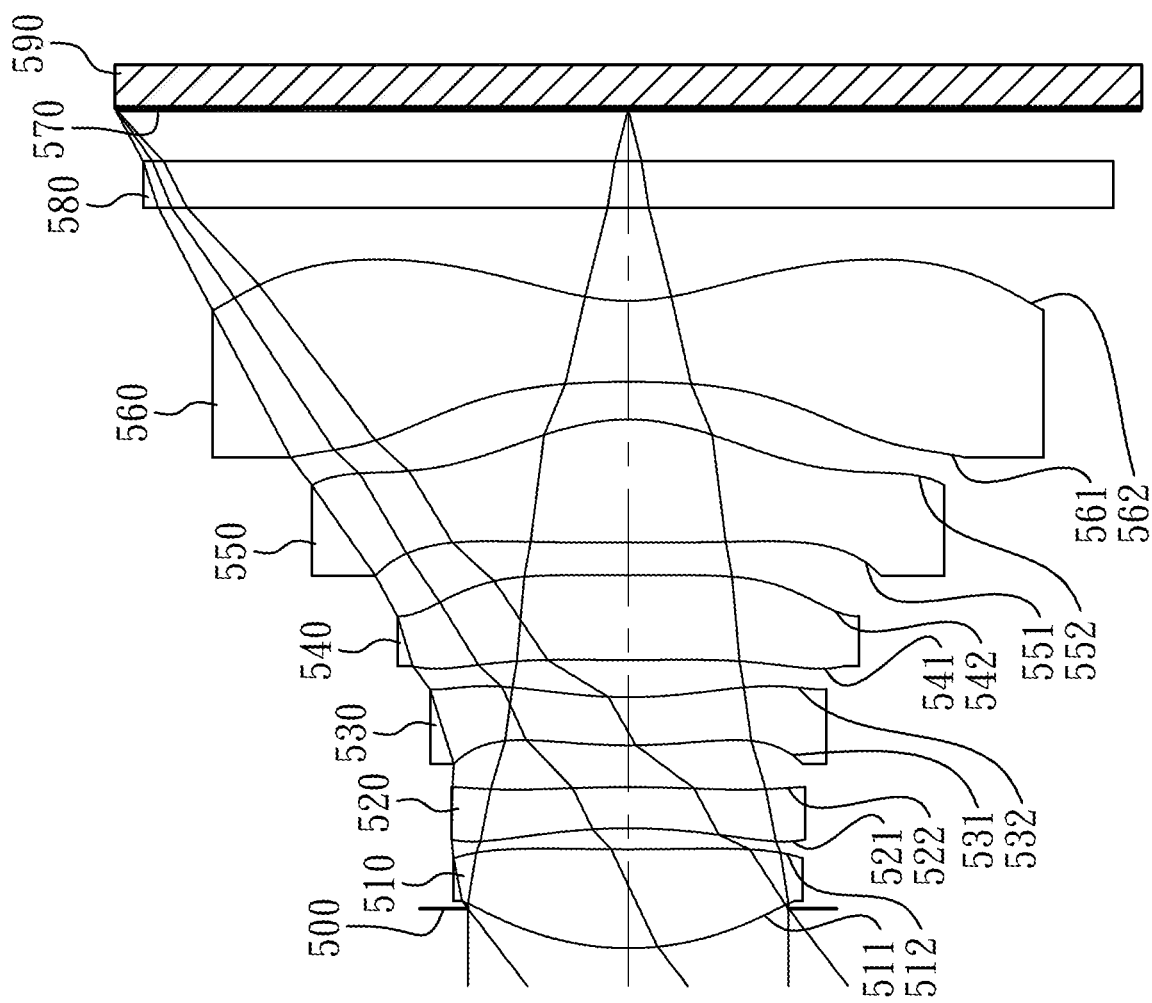
FIG. 9 is a schematic view of an image capturing optical lens assembly according to the 5th embodiment of the present disclosure.
Figure 10:
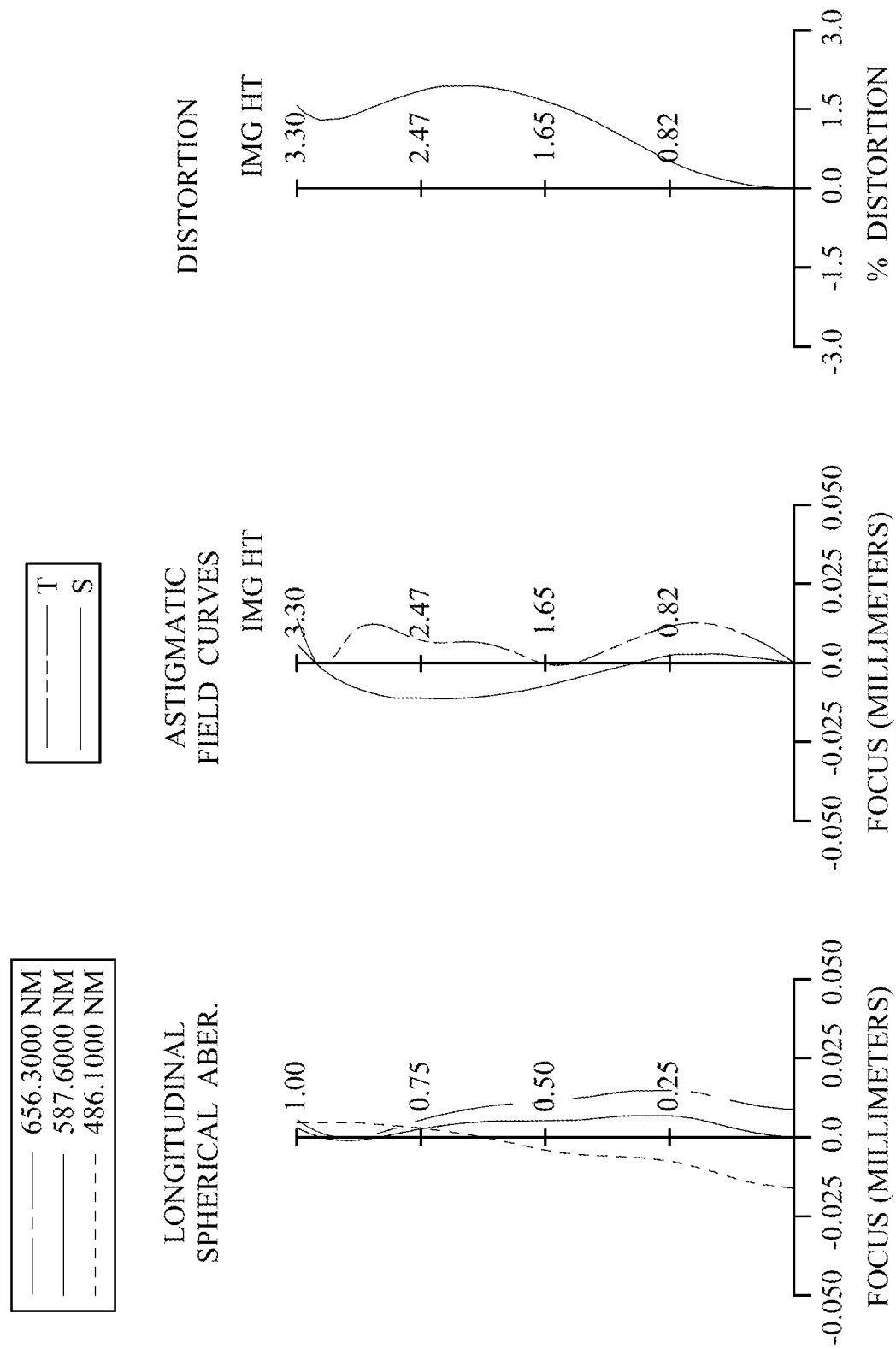
FIG. 10 shows spherical aberration curves, astigmatic field curves and a distortion curve of the image capturing optical lens assembly according to the 5th embodiment.

FIG. 9 is a schematic view of an image capturing optical lens assembly according to the 5th embodiment of the present disclosure. FIG. 10 shows spherical aberration curves, astigmatic field curves and a distortion curve of the image capturing optical lens assembly according to the 5th embodiment. In FIG. 9, the image capturing optical lens assembly includes, in order from an object side to an image side, an aperture stop 500, a first lens element 510, a second lens element 520, a third lens element 530, a fourth lens element 540, a fifth lens element 550, a sixth lens element 560, an IR-cut filter 580, an image plane 570, and an image sensor 590.

The first lens element 510 with positive refractive power has a convex object-side surface 511 and a concave image-side surface 512. The first lens element 510 is made of plastic material and has the object-side surface 511 and the image-side surface 512 being both aspheric.

The second lens element 520 with negative refractive power has a concave object-side surface 521 and a convex image-side surface 522. The second lens element 520 is made of plastic material and has the object-side surface 521 and the image-side surface 522 being both aspheric.

The third lens element 530 with negative refractive power has a convex object-side surface 531 and a concave image-side surface 532. The third lens element 530 is made of plastic material and has the object-side surface 531 and the image-side surface 532 being both aspheric.

The fourth lens element 540 with positive refractive power has a convex object-side surface 541 and a concave image-side surface 542. The fourth lens element 540 is made of plastic material and has the object-side surface 541 and the image-side surface 542 being both aspheric.

The fifth lens element 550 with positive refractive power has a convex object-side surface 551 and a convex image-side surface 552. The fifth lens element 550 is made of plastic material and has the object-side surface 551 and the image-side surface 552 being both aspheric.

The sixth lens element 560 with negative refractive power has a concave object-side surface 561 and a concave image-side surface 562. The sixth lens element 560 is made of plastic material and has the object-side surface 561 and the image-side surface 562 being both aspheric. Furthermore, the sixth lens element 560 has inflection points on the image-side surface 562 thereof.

The IR-cut filter 580 made of glass material is located between the sixth lens element 560 and the image plane 570, and will not affect a focal length of the image capturing optical lens assembly.

The detailed optical data of the 5th embodiment are shown in Table 9, and the aspheric surface data are shown in Table 10 below.

TABLE 9

5th Embodiment
f = 4.23 mm, Fno = 2.05, HFOV = 37.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.255 | | | | |
| 2 | Lens 1 | 1.863 | (ASP) | 0.637 | Plastic | 1.565 | 58.0 | 3.66 |
| 3 | | 16.480 | (ASP) | 0.136 | | | | |
| 4 | Lens 2 | −3.699 | (ASP) | 0.265 | Plastic | 1.640 | 23.3 | −9.92 |
| 5 | | −9.108 | (ASP) | 0.269 | | | | |
| 6 | Lens 3 | 3.562 | (ASP) | 0.310 | Plastic | 1.640 | 23.3 | −31.48 |
| 7 | | 2.924 | (ASP) | 0.240 | | | | |

TABLE 9-continued

5th Embodiment
f = 4.23 mm, Fno = 2.05, HFOV = 37.5 deg.

| Surface # | | Curvature Radius | | Thickness | Material | Index | Abbe # | Focal length |
|---|---|---|---|---|---|---|---|---|
| 8 | Lens 4 | 30.082 | (ASP) | 0.547 | Plastic | 1.544 | 55.9 | 171.56 |
| 9 | | 44.099 | (ASP) | 0.211 | | | | |
| 10 | Lens 5 | 538.276 | (ASP) | 0.793 | Plastic | 1.535 | 55.7 | 2.34 |
| 11 | | −1.255 | (ASP) | 0.242 | | | | |
| 12 | Lens 6 | −6.663 | (ASP) | 0.521 | Plastic | 1.535 | 55.7 | −1.99 |
| 13 | | 1.303 | (ASP) | 0.600 | | | | |
| 14 | IR-cut filter | Plano | | 0.300 | Glass | 1.517 | 64.2 | — |
| 15 | | Plano | | 0.339 | | | | |
| 16 | Image | Plano | | — | | | | |

Note:
Reference wavelength (d-line) is 587.6 nm.

TABLE 10

Aspheric Coefficients

| Surface # | 2 | 3 | 4 | 5 |
|---|---|---|---|---|
| k = | −1.0179E+01 | −1.0000E+00 | 1.5490E−01 | −3.0000E+01 |
| A4 = | 1.8997E−01 | −4.0974E−02 | 2.9946E−02 | 1.6699E−02 |
| A6 = | −2.0479E−01 | −4.4069E−02 | 1.2517E−02 | 6.6057E−02 |
| A8 = | 2.2008E−01 | 1.2524E−01 | 6.8847E−02 | −3.0921E−02 |
| A10 = | −1.7906E−01 | −2.0961E−01 | −1.6697E−01 | −4.7229E−02 |
| A12 = | 8.1513E−02 | 1.5799E−01 | 1.5135E−01 | 6.3310E−02 |
| A14 = | −2.0169E−02 | −4.4418E−02 | −4.4023E−02 | −2.4196E−02 |

| Surface # | 6 | 7 | 8 | 9 |
|---|---|---|---|---|
| k = | 2.9311E+00 | 2.9615E+00 | 0.0000E+00 | −1.0000E+00 |
| A4 = | −1.6008E−01 | −1.2830E−01 | −5.7826E−02 | −5.5815E−02 |
| A6 = | 3.2536E−02 | 8.5333E−03 | −1.9372E−02 | −4.2413E−02 |
| A8 = | −8.0284E−02 | −7.1691E−03 | 2.9702E−02 | −8.1273E−03 |
| A10 = | 6.8813E−02 | −3.7846E−03 | −7.2410E−03 | 1.8987E−02 |
| A12 = | −6.8723E−02 | 1.1377E−03 | 3.1294E−03 | −2.1950E−03 |
| A14 = | 2.5910E−02 | 1.8563E−03 | −9.7049E−04 | −4.3030E−04 |

| Surface # | 10 | 11 | 12 | 13 |
|---|---|---|---|---|
| k = | −1.0000E+00 | −5.4952E+00 | 1.9880E−02 | −7.3852E+00 |
| A4 = | 2.4631E−02 | −3.9834E−02 | −6.3970E−02 | −5.4708E−02 |
| A6 = | 1.1906E−02 | 8.9180E−02 | 1.4430E−02 | 1.6697E−02 |
| A8 = | −6.2686E−02 | −4.4441E−02 | 1.1069E−02 | −3.7696E−03 |
| A10 = | 4.3251E−02 | 1.0904E−02 | −2.8298E−03 | 5.3110E−04 |
| A12 = | −1.2796E−02 | −1.3997E−03 | 2.0593E−04 | −4.5110E−05 |
| A14 = | 1.3718E−03 | 7.1585E−05 | 1.7012E−07 | 1.7948E−06 |

In the image capturing optical lens assembly according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| f (mm) | 4.23 | (C3 − C4)/(C3 + C4) | 0.42 |
| Fno | 2.05 | (C5 − C6)/(C5 + C6) | −0.10 |
| HFOV (deg.) | 37.5 | f2/f3 | 0.32 |
| (V2 + V3)/V1 | 0.80 | (\|f/f2\| + \|f/f3\| + \|f/f4\|)/(\|f/f5\| + \|f/f6\|) | 0.15 |
| (CT2 + CT3)/f | 0.14 | Dsc/TL | 0.77 |
| f2/R4 | 1.09 | ImgH/f | 0.78 |
| R12/R11 | −0.20 | | |

6th Embodiment

Figure 11:
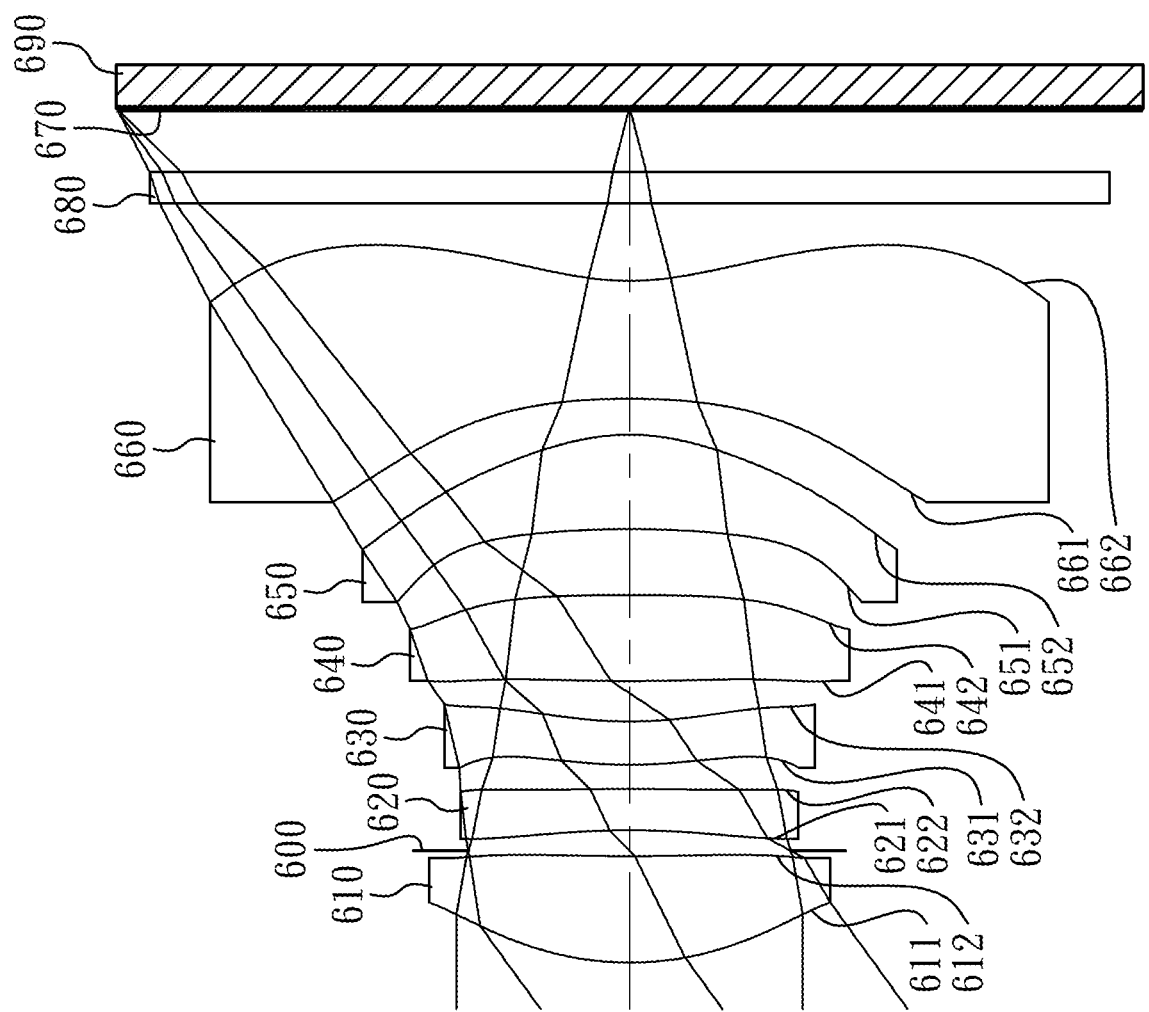
FIG. 11 is a schematic view of an image capturing optical lens assembly according to the 6th embodiment of the present disclosure.
Figure 12:
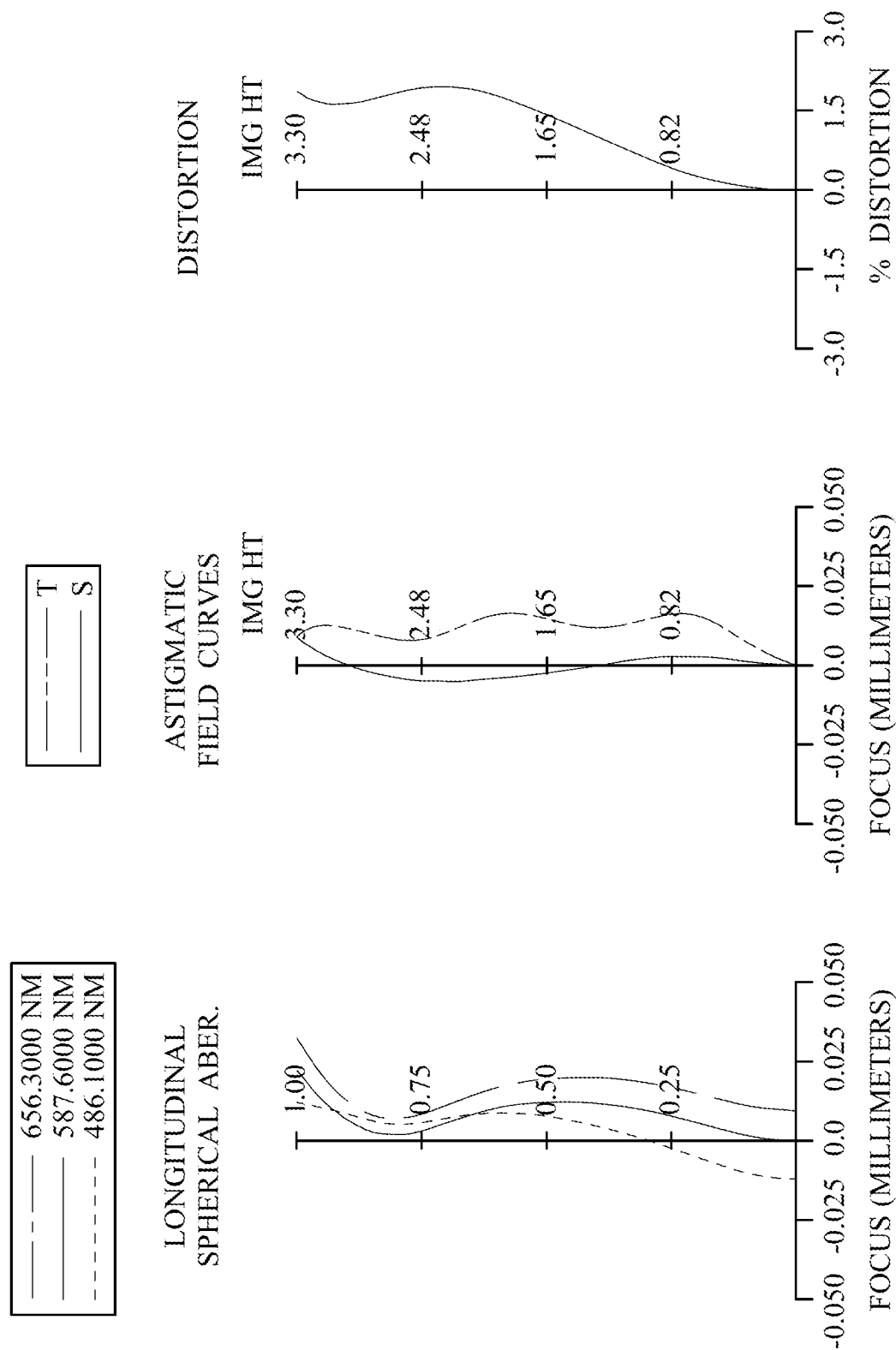
FIG. 12 shows spherical aberration curves, astigmatic field curves and a distortion curve of the image capturing optical lens assembly according to the 6th embodiment.

FIG. 11 is a schematic view of an image capturing optical lens assembly according to the 6th embodiment of the present disclosure. FIG. 12 shows spherical aberration curves, astigmatic field curves and a distortion curve of the image capturing optical lens assembly according to the 6th embodiment. In FIG. 11, the image capturing optical lens assembly includes, in order from an object side to an image side, a first lens element 610, an aperture stop 600, a second lens element 620, a third lens element 630, a fourth lens element 640, a fifth lens element 650, a sixth lens element 660, an IR-cut filter 680, an image plane 670, and an image sensor 690.

The first lens element 610 with positive refractive power has a convex object-side surface 611 and a concave image-side surface 612. The first lens element 610 is made of glass material and has the object-side surface 611 and the image-side surface 612 being both aspheric.

The second lens element 620 with negative refractive power has a concave object-side surface 621 and a convex image-side surface 622. The second lens element 620 is made of plastic material and has the object-side surface 621 and the image-side surface 622 being both aspheric.

The third lens element 630 with negative refractive power has a convex object-side surface 631 and a concave image-side surface 632. The third lens element 630 is made of plastic material and has the object-side surface 631 and the image-side surface 632 being both aspheric.

The fourth lens element 640 with positive refractive power has a convex object-side surface 641 and a convex image-side surface 642. The fourth lens element 640 is made of plastic material and has the object-side surface 641 and the image-side surface 642 being both aspheric.

The fifth lens element 650 with positive refractive power has a concave object-side surface 651 and a convex image-side surface 652. The fifth lens element 650 is made of plastic material and has the object-side surface 651 and the image-side surface 652 being both aspheric.

The sixth lens element 660 with negative refractive power has a concave object-side surface 661 and a concave image-side surface 662. The sixth lens element 660 is made of plastic material and has the object-side surface 661 and the image-side surface 662 being both aspheric. Furthermore, the sixth lens element 660 has inflection points on the image-side surface 662 thereof.

The IR-cut filter 680 made of glass material is located between the sixth lens element 660 and the image plane 670, and will not affect a focal length of the image capturing optical lens assembly.

The detailed optical data of the 6th embodiment are shown in Table 11, and the aspheric surface data are shown in Table 12 below.

TABLE 11

6th Embodiment
f = 4.45 mm, Fno = 2.00, HFOV = 36.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.972 | (ASP) | 0.685 | Glass | 1.566 | 61.1 | 3.98 |
| 2 | | 13.973 | (ASP) | 0.035 | | | | |
| 3 | Ape. Stop | Plano | | 0.132 | | | | |
| 4 | Lens 2 | −4.954 | (ASP) | 0.265 | Plastic | 1.650 | 21.4 | −10.21 |
| 5 | | −20.000 | (ASP) | 0.156 | | | | |
| 6 | Lens 3 | 2.969 | (ASP) | 0.279 | Plastic | 1.650 | 21.4 | −61.92 |
| 7 | | 2.662 | (ASP) | 0.260 | | | | |
| 8 | Lens 4 | 11.724 | (ASP) | 0.554 | Plastic | 1.544 | 55.9 | 13.01 |
| 9 | | −17.578 | (ASP) | 0.425 | | | | |
| 10 | Lens 5 | −6.177 | (ASP) | 0.607 | Plastic | 1.544 | 55.9 | 3.30 |
| 11 | | −1.441 | (ASP) | 0.232 | | | | |
| 12 | Lens 6 | −4.559 | (ASP) | 0.758 | Plastic | 1.535 | 55.7 | −2.26 |
| 13 | | 1.741 | (ASP) | 0.500 | | | | |
| 14 | IR-cut filter | Plano | | 0.200 | Glass | 1.517 | 64.2 | — |
| 15 | | Plano | | 0.409 | | | | |
| 16 | Image | Plano | | — | | | | |

Note:
Reference wavelength (d-line) is 587.6 nm.

TABLE 12

Aspheric Coefficients

| Surface # | 1 | 2 | 4 | 5 |
|---|---|---|---|---|
| k = | −6.9860E+00 | −1.0000E+00 | −1.5482E+01 | −1.0000E+00 |
| A4 = | 1.0370E−01 | −3.6951E−02 | 3.6097E−02 | 3.6759E−02 |
| A6 = | −6.5821E−02 | −4.8521E−03 | −2.1927E−02 | 9.7551E−04 |
| A8 = | 3.6281E−02 | 1.9737E−03 | 3.9190E−02 | −1.3470E−02 |
| A10 = | −1.5255E−02 | 6.4495E−03 | −3.5148E−02 | 1.3672E−03 |
| A12 = | −3.8536E−04 | −5.2183E−03 | 2.2369E−02 | −7.6603E−03 |
| A14 = | 1.0184E−03 | 1.2044E−03 | −7.1444E−03 | 8.8689E−04 |

| Surface # | 6 | 7 | 8 | 9 |
|---|---|---|---|---|
| k = | 3.0000E+00 | 3.0193E−01 | −1.0000E+00 | 7.3230E−01 |
| A4 = | −1.4940E−01 | −1.0719E−01 | −4.0591E−02 | −3.8236E−02 |
| A6 = | 6.9291E−03 | 4.8847E−04 | −1.6386E−03 | −1.6766E−02 |
| A8 = | −4.0432E−02 | 2.6956E−03 | 3.0118E−03 | 1.5516E−03 |
| A10 = | 3.3276E−02 | −1.4324E−03 | −1.6669E−03 | 1.9172E−03 |
| A12 = | −4.0941E−02 | −1.0315E−03 | 3.9392E−03 | 7.7495E−05 |
| A14 = | 1.8041E−02 | 3.7960E−03 | −1.0294E−03 | 2.5274E−04 |

| Surface # | 10 | 11 | 12 | 13 |
|---|---|---|---|---|
| k = | 3.0000E+00 | −5.2011E+00 | 7.4867E−01 | −9.1033E+00 |
| A4 = | 5.9770E−03 | −4.0899E−02 | −4.3803E−02 | −3.9810E−02 |
| A6 = | −3.8209E−03 | 4.1827E−02 | −2.1488E−03 | 1.0186E−02 |
| A8 = | −3.7313E−02 | −3.0146E−02 | 6.9975E−03 | −2.0430E−03 |
| A10 = | 2.5595E−02 | 7.8065E−03 | −1.7421E−03 | 2.4134E−04 |
| A12 = | −1.0879E−02 | −2.1073E−04 | 1.5390E−04 | −1.6903E−05 |
| A14 = | 2.1360E−03 | −1.1210E−04 | −2.2086E−06 | 5.5703E−07 |

In the image capturing optical lens assembly according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following relationships:

| | | | |
|---|---|---|---|
| f (mm) | 4.45 | (C3 − C4)/(C3 + C4) | 0.60 |
| Fno | 2.00 | (C5 − C6)/(C5 + C6) | −0.05 |
| HFOV (deg.) | 36.0 | f2/f3 | 0.16 |
| (V2 + V3)/V1 | 0.70 | (|f/f2| + |f/f3| + |f/f4|)/(|f/f5| + |f/f6|) | 0.26 |
| (CT2 + CT3)/f | 0.12 | Dsc/TL | 0.71 |
| f2/R4 | 0.51 | ImgH/f | 0.74 |
| R12/R11 | −0.38 | | |

7th Embodiment

Figure 13:
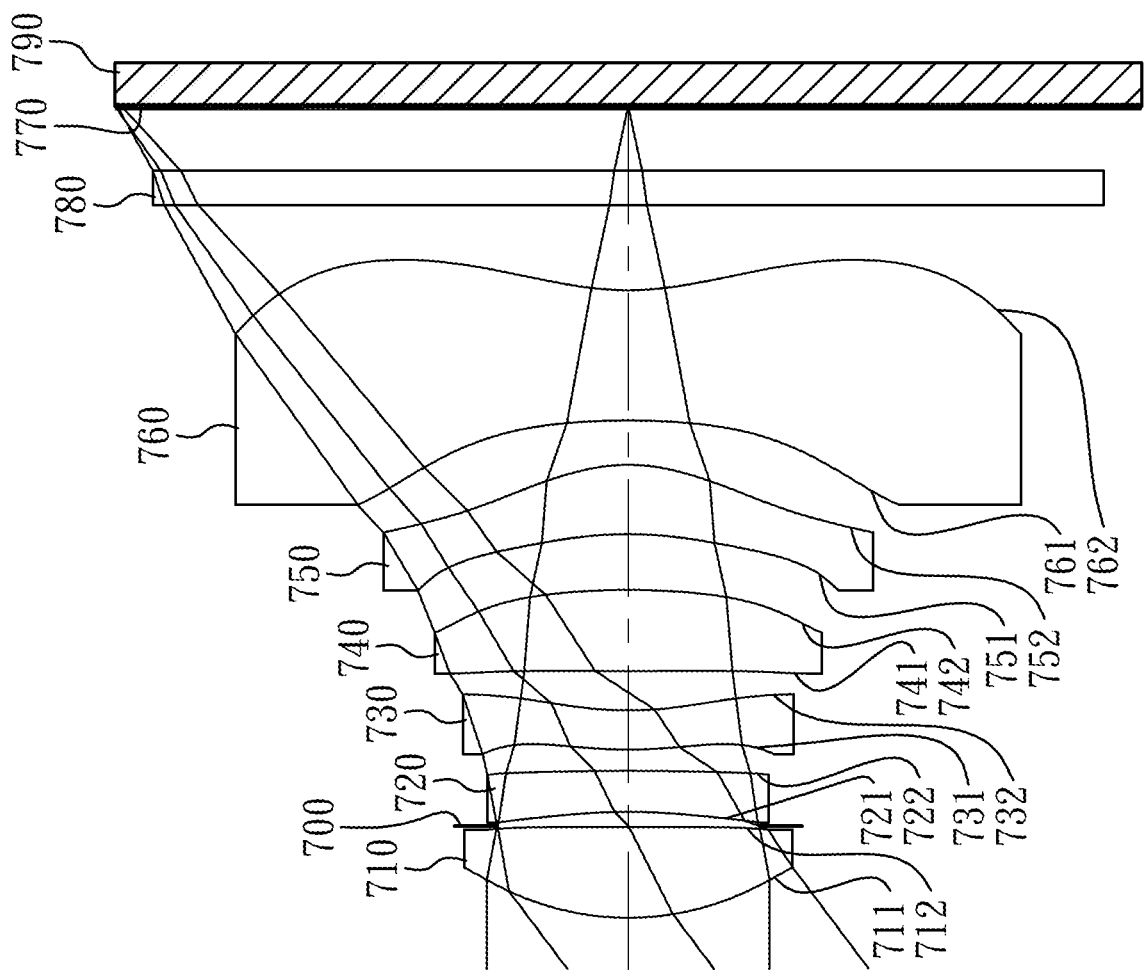
FIG. 13 is a schematic view of an image capturing optical lens assembly according to the 7th embodiment of the present disclosure.
Figure 14:
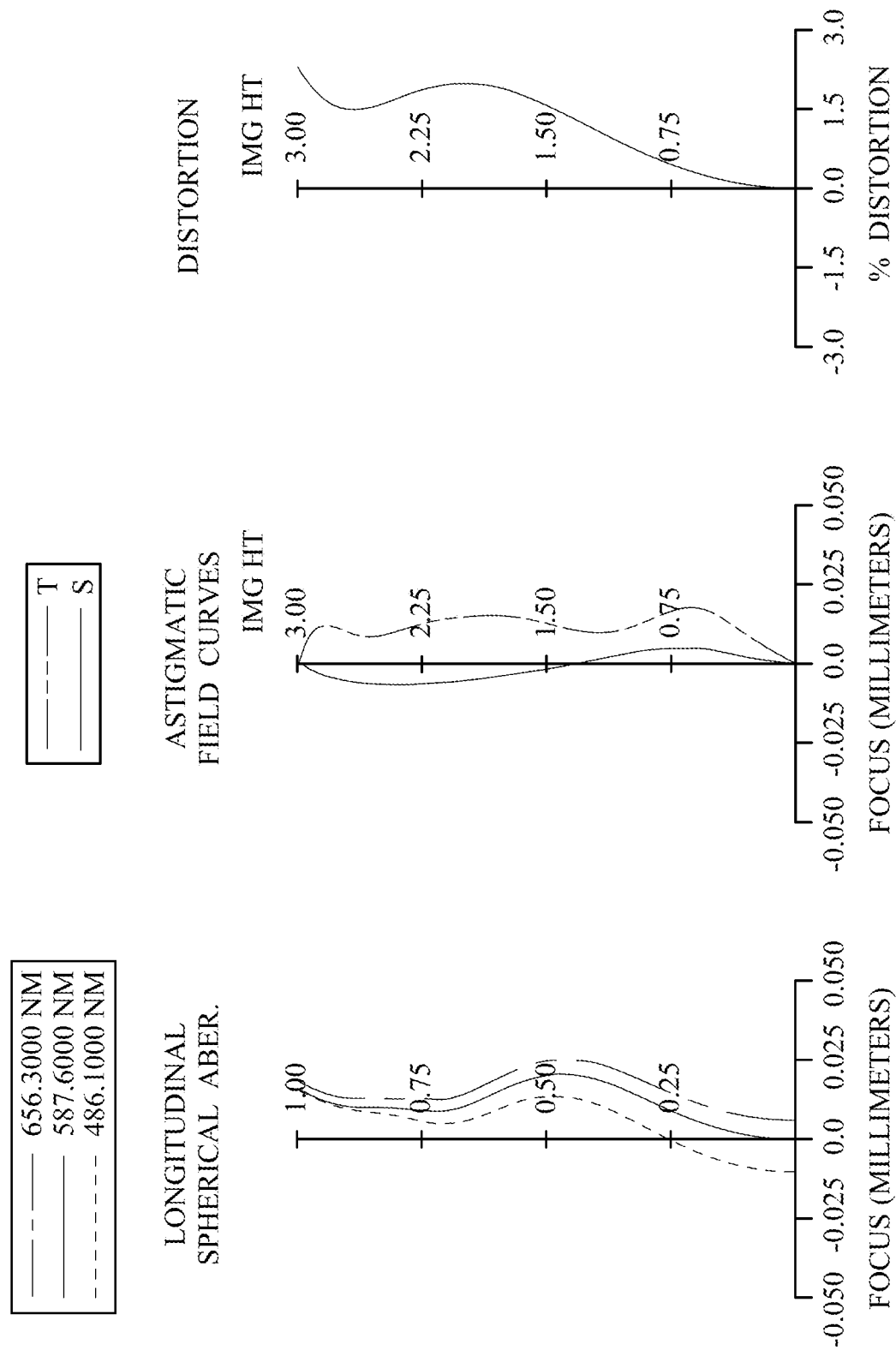
FIG. 14 shows spherical aberration curves, astigmatic field curves and a distortion curve of the image capturing optical lens assembly according to the 7th embodiment.

FIG. 13 is a schematic view of an image capturing optical lens assembly according to the 7th embodiment of the present disclosure. FIG. 14 shows spherical aberration curves, astigmatic field curves and a distortion curve of the image capturing optical lens assembly according to the 7th embodiment. In FIG. 13, the image capturing optical lens assembly includes, in order from an object side to an image side, a first lens element 710, an aperture stop 700, a second lens element 720, a third lens element 730, a fourth lens element 740, a fifth lens element 750, a sixth lens element 760, an IR-cut filter 780, an image plane 770, and an image sensor 790.

The first lens element 710 with positive refractive power has a convex object-side surface 711 and a convex image-side surface 712. The first lens element 710 is made of plastic material and has the object-side surface 711 and the image-side surface 712 being both aspheric.

The second lens element 720 with negative refractive power has a concave object-side surface 721 and a convex image-side surface 722. The second lens element 720 is made of plastic material and has the object-side surface 721 and the image-side surface 722 being both aspheric.

The third lens element 730 with negative refractive power has a convex object-side surface 731 and a concave image-side surface 732. The third lens element 730 is made of plastic material and has the object-side surface 731 and the image-side surface 732 being both aspheric.

The fourth lens element 740 with positive refractive power has a convex object-side surface 741 and a convex image-side surface 742. The fourth lens element 740 is made of plastic material and has the object-side surface 741 and the image-side surface 742 being both aspheric.

The fifth lens element 750 with positive refractive power has a concave object-side surface 751 and a convex image-side surface 752. The fifth lens element 750 is made of plastic material and has the object-side surface 751 and the image-side surface 752 being both aspheric.

The sixth lens element 760 with negative refractive power has a concave object-side surface 761 and a concave image-side surface 762. The sixth lens element 760 is made of plastic material and has the object-side surface 761 and the image-side surface 762 being both aspheric. Furthermore, the sixth lens element 760 has inflection points on the image-side surface 762 thereof.

The IR-cut filter 780 made of glass material is located between the sixth lens element 760 and the image plane 770, and will not affect a focal length of the image capturing optical lens assembly.

The detailed optical data of the 7th embodiment are shown in Table 13, and the aspheric surface data are shown in Table 14 below.

TABLE 13

7th Embodiment
f = 3.89 mm, Fno = 2.35, HFOV = 36.9 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.629 | (ASP) | 0.532 | Plastic | 1.544 | 55.9 | 2.98 |
| 2 | | −284.603 | (ASP) | 0.004 | | | | |
| 3 | Ape. Stop | Plano | | 0.084 | | | | |
| 4 | Lens 2 | −3.287 | (ASP) | 0.240 | Plastic | 1.640 | 23.3 | −6.89 |
| 5 | | −13.305 | (ASP) | 0.124 | | | | |
| 6 | Lens 3 | 2.505 | (ASP) | 0.230 | Plastic | 1.608 | 25.7 | −20.71 |
| 7 | | 2.017 | (ASP) | 0.230 | | | | |
| 8 | Lens 4 | 48.314 | (ASP) | 0.475 | Plastic | 1.544 | 55.9 | 7.48 |
| 9 | | −4.430 | (ASP) | 0.327 | | | | |
| 10 | Lens 5 | −2.154 | (ASP) | 0.405 | Plastic | 1.544 | 55.9 | 3.52 |
| 11 | | −1.081 | (ASP) | 0.260 | | | | |
| 12 | Lens 6 | −4.585 | (ASP) | 0.762 | Plastic | 1.530 | 55.8 | −2.15 |
| 13 | | 1.605 | (ASP) | 0.500 | | | | |
| 14 | IR-cut filter | Plano | | 0.200 | Glass | 1.517 | 64.2 | — |
| 15 | | Plano | | 0.375 | | | | |
| 16 | Image | Plano | | — | | | | |

Note:
Reference wavelength (d-line) is 587.6 nm.

TABLE 14

Aspheric Coefficients

| Surface # | 1 | 2 | 4 | 5 |
|---|---|---|---|---|
| k = | −4.1203E+00 | −1.0000E+00 | −3.9484E−01 | −1.4487E+01 |
| A4 = | 1.2003E−01 | −2.4060E−02 | 1.3436E−01 | 6.2850E−02 |
| A6 = | −1.1027E−01 | −9.5642E−03 | −1.0248E−01 | −6.2185E−02 |
| A8 = | 3.3905E−01 | 1.4757E−01 | 7.8859E−02 | −1.0307E−01 |
| A10 = | −7.0628E−01 | −5.9074E−01 | −4.2379E−01 | 6.0874E−02 |
| A12 = | 7.2577E−01 | 8.1763E−01 | 9.1797E−01 | 2.1129E−01 |
| A14 = | −3.0663E−01 | −4.1306E−01 | −5.9700E−01 | −2.2504E−01 |

| Surface # | 6 | 7 | 8 | 9 |
|---|---|---|---|---|
| k = | 2.6113E+00 | 2.0303E+00 | −5.7479E+00 | −3.0000E+01 |
| A4 = | −3.3155E−01 | −2.2892E−01 | −2.3851E−02 | −5.8580E−02 |
| A6 = | 6.1685E−02 | −2.8056E−02 | −1.8087E−02 | −5.3311E−02 |
| A8 = | −3.4318E−01 | 1.7870E−02 | 1.5569E−02 | −3.2257E−03 |
| A10 = | 3.6556E−01 | 2.4326E−02 | −9.5950E−06 | 6.0107E−03 |
| A12 = | −1.2602E−01 | −2.1296E−02 | 1.3582E−03 | 5.5415E−03 |
| A14 = | | 3.2777E−03 | 7.3583E−04 | 5.2224E−03 |

| Surface # | 10 | 11 | 12 | 13 |
|---|---|---|---|---|
| k = | −9.8667E−01 | −4.0221E+00 | −4.3046E−01 | −9.6995E+00 |
| A4 = | 1.2290E−01 | −4.9966E−02 | −6.0971E−02 | −6.1862E−02 |
| A6 = | 6.4133E−03 | 1.6642E−01 | −2.4059E−02 | 2.1181E−02 |
| A8 = | −1.4877E−01 | −1.1134E−01 | 2.7297E−02 | −6.8845E−03 |
| A10 = | 1.2894E−01 | 3.1990E−02 | −7.4620E−03 | 1.4328E−03 |
| A12 = | −6.3052E−02 | −4.4850E−03 | 8.3250E−04 | −1.8456E−04 |
| A14 = | 1.2793E−02 | 4.1152E−04 | 8.0095E−07 | 1.0545E−05 |

In the image capturing optical lens assembly according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following relationships:

| f (mm) | 3.89 | (C3 − C4)/(C3 + C4) | 0.60 |
|---|---|---|---|
| Fno | 2.35 | (C5 − C6)/(C5 + C6) | −0.11 |
| HFOV (deg.) | 36.9 | f2/f3 | 0.33 |
| (V2 + V3)/V1 | 0.88 | (|f/f2| + |f/f3| + |f/f4|)/(|f/f5| + |f/f6|) | 0.44 |
| (CT2 + CT3)/f | 0.12 | Dsc/TL | 0.70 |

-continued

| f2/R4 | 0.52 | ImgH/f | 0.77 |
|---|---|---|---|
| R12/R11 | −0.35 | | |

8th Embodiment

Figure 15:
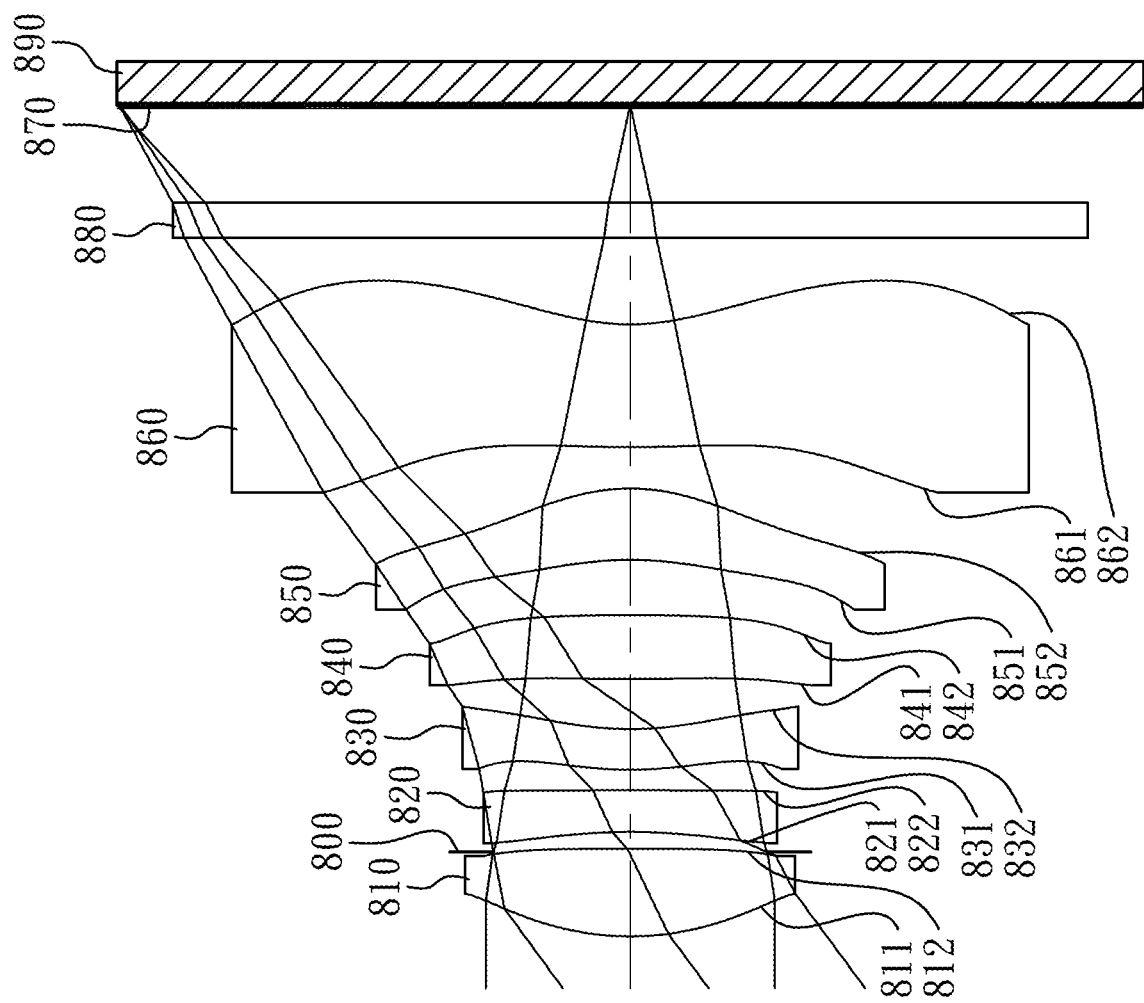
FIG. 15 is a schematic view of an image capturing optical lens assembly according to the 8th embodiment of the present disclosure.
Figure 16:
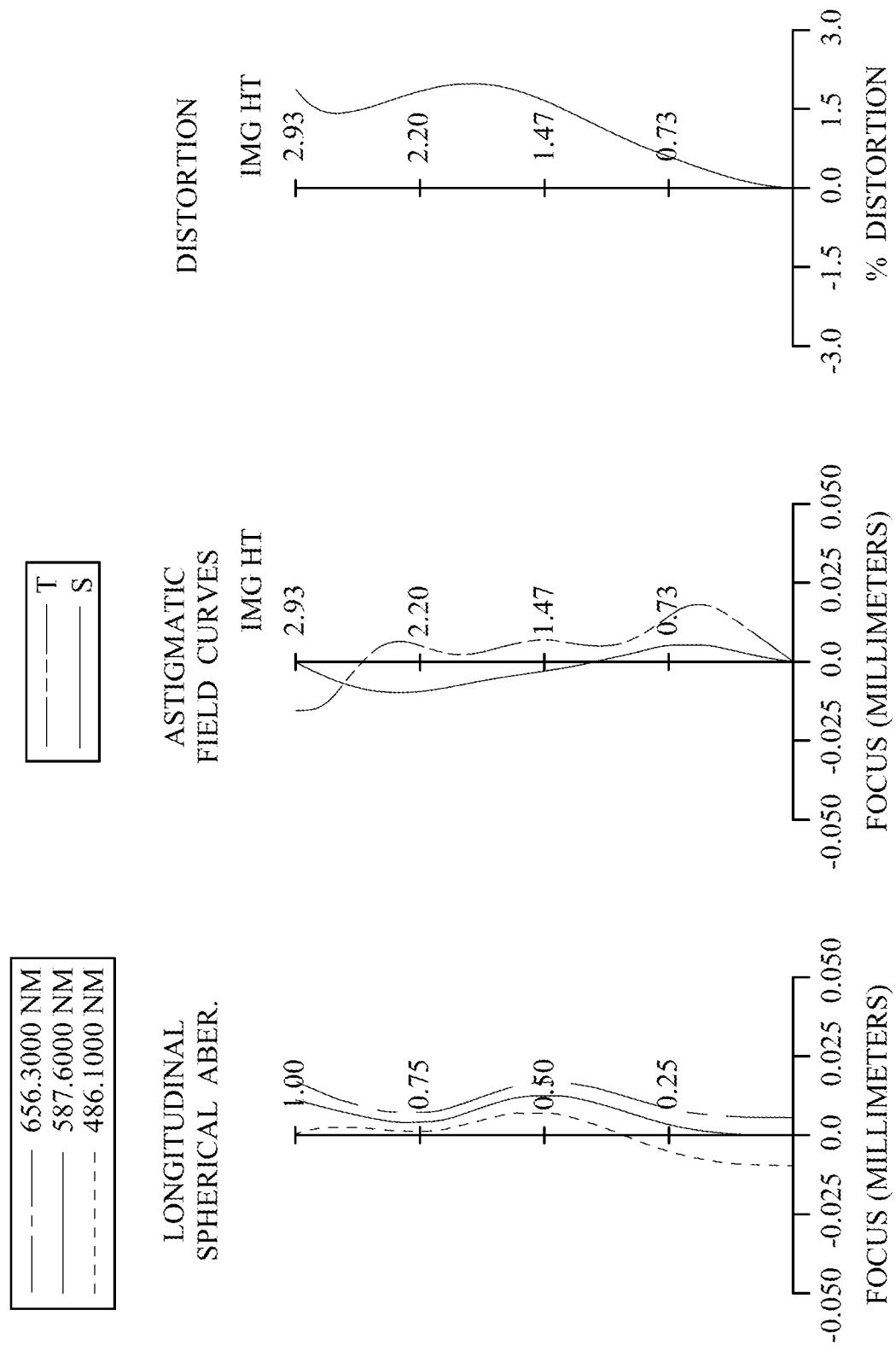
FIG. 16 shows spherical aberration curves, astigmatic field curves and a distortion curve of the image capturing optical lens assembly according to the 8th embodiment.

FIG. 15 is a schematic view of an image capturing optical lens assembly according to the 8th embodiment of the present disclosure. FIG. 16 shows spherical aberration curves, astigmatic field curves and a distortion curve of the image capturing optical lens assembly according to the 8th embodiment. In FIG. 15, the image capturing optical lens assembly includes, in order from an object side to an image side, a first lens element 810, an aperture stop 800, a second lens element 820, a third lens element 830, a fourth lens element 840, a fifth lens element 850, a sixth lens element 860, an IR-cut filter 880, an image plane 870, and an image sensor 890.

The first lens element 810 with positive refractive power has a convex object-side surface 811 and a convex image-side surface 812. The first lens element 810 is made of plastic material and has the object-side surface 811 and the image-side surface 812 being both aspheric.

The second lens element 820 with negative refractive power has a concave object-side surface 821 and a convex image-side surface 822. The second lens element 820 is made of plastic material and has the object-side surface 821 and the image-side surface 822 being both aspheric.

The third lens element 830 with negative refractive power has a convex object-side surface 831 and a concave image-side surface 832. The third lens element 830 is made of plastic material and has the object-side surface 831 and the image-side surface 832 being both aspheric.

The fourth lens element 840 with positive refractive power has a convex object-side surface 841 and a convex image-side surface 842. The fourth lens element 840 is made of plastic material and has the object-side surface 841 and the image-side surface 842 being both aspheric.

The fifth lens element 850 with positive refractive power has a concave object-side surface 851 and a convex image-side surface 852. The fifth lens element 850 is made of plastic material and has the object-side surface 851 and the image-side surface 852 being both aspheric.

The sixth lens element 860 with negative refractive power has a convex object-side surface 861 and a concave image-side surface 862. The sixth lens element 860 is made of plastic material and has the object-side surface 861 and the image-side surface 862 being both aspheric. Furthermore, the sixth lens element 860 has inflection points on the image-side surface 862 thereof.

The IR-cut filter 880 made of glass material is located between the sixth lens element 860 and the image plane 870, and will not affect a focal length of the image capturing optical lens assembly.

The detailed optical data of the 8th embodiment are shown in Table 15, and the aspheric surface data are shown in Table 16 below.

TABLE 15

8th Embodiment
f = 3.90 mm, Fno = 2.35, HFOV = 36.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.646 | (ASP) | 0.504 | Plastic | 1.544 | 55.9 | 3.00 |
| 2 | | −194.035 | (ASP) | −0.018 | | | | |
| 3 | Ape. Stop | Plano | | 0.115 | | | | |
| 4 | Lens 2 | −3.265 | (ASP) | 0.240 | Plastic | 1.640 | 23.3 | −5.91 |
| 5 | | −24.645 | (ASP) | 0.118 | | | | |
| 6 | Lens 3 | 2.110 | (ASP) | 0.234 | Plastic | 1.583 | 30.2 | −46.25 |
| 7 | | 1.877 | (ASP) | 0.288 | | | | |
| 8 | Lens 4 | 14.575 | (ASP) | 0.368 | Plastic | 1.544 | 55.9 | 12.99 |
| 9 | | −13.599 | (ASP) | 0.318 | | | | |
| 10 | Lens 5 | −1.944 | (ASP) | 0.411 | Plastic | 1.544 | 55.9 | 3.90 |
| 11 | | −1.090 | (ASP) | 0.238 | | | | |
| 12 | Lens 6 | 7.576 | (ASP) | 0.706 | Plastic | 1.530 | 55.8 | −3.03 |
| 13 | | 1.283 | (ASP) | 0.500 | | | | |
| 14 | IR-cut filter | Plano | | 0.200 | Glass | 1.517 | 64.2 | — |
| 15 | | Plano | | 0.561 | | | | |
| 16 | Image | Plano | | — | | | | |

Note:
Reference wavelength (d-line) is 587.6 nm.

TABLE 16

Aspheric Coefficients

| Surface # | 1 | 2 | 4 | 5 |
|---|---|---|---|---|
| k = | −4.3332E+00 | −1.0000E+00 | 2.7158E+00 | −3.0000E+01 |
| A4 = | 1.1180E−01 | −8.3187E−02 | 1.1364E−01 | 5.4670E−01 |
| A6 = | −1.3192E−01 | −3.6581E−03 | −8.1495E−02 | −3.2406E−02 |
| A8 = | 3.2994E−01 | 1.7534E−01 | 1.9353E−01 | −5.8738E−02 |
| A10 = | −6.9104E−01 | −5.6190E−02 | −4.4750E−01 | −1.0753E−02 |
| A12 = | 6.6606E−01 | 7.6930E−01 | 7.1228E−01 | 1.5063E−01 |
| A14 = | −2.7813E−01 | −4.1762E−01 | −4.4386E−01 | −1.7796E−01 |

| Surface # | 6 | 7 | 8 | 9 |
|---|---|---|---|---|
| k = | 2.4545E+00 | 1.8379E+00 | −1.3445E+01 | −5.5511E+00 |
| A4 = | −3.2646E−01 | −2.2102E−01 | −7.3879E−02 | −2.5795E−02 |
| A6 = | 4.2005E−02 | −3.0011E−02 | −1.3353E−02 | −6.1606E−02 |
| A8 = | −2.9326E−01 | 9.5213E−04 | 1.8859E−02 | −8.5201E−03 |
| A10 = | 3.4152E−01 | 5.2355E−02 | 1.6284E−03 | 6.3402E−03 |
| A12 = | −1.7634E−01 | −3.6132E−02 | 1.6956E−03 | 6.2536E−03 |
| A14 = | | 3.2777E−03 | 3.1879E−04 | 5.5733E−03 |

| Surface # | 10 | 11 | 12 | 13 |
|---|---|---|---|---|
| k = | −4.0971E+00 | −4.0671E+00 | −1.0000E+00 | −6.3390E+00 |
| A4 = | 1.4985E−01 | −2.5498E−02 | −9.5503E−02 | −6.7505E−02 |
| A6 = | −4.9813E−03 | 1.4583E−01 | −1.5234E−02 | 2.2305E−02 |
| A8 = | −1.5785E−01 | −1.0919E−01 | 2.6629E−02 | −6.7871E−03 |
| A10 = | 1.3346E−01 | 3.3649E−02 | −7.7532E−03 | 1.4137E−03 |
| A12 = | −5.9309E−02 | −4.4796E−03 | 7.4988E−04 | −1.8027E−04 |
| A14 = | 1.2086E−02 | 7.2470E−05 | 8.0095E−07 | 1.0392E−05 |

In the image capturing optical lens assembly according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following relationships:

| | | | |
|---|---|---|---|
| f (mm) | 3.90 | (C3 − C4)/(C3 + C4) | 0.77 |
| Fno | 2.35 | (C5 − C6)/(C5 + C6) | −0.06 |
| HFOV (deg.) | 36.4 | f2/f3 | 0.13 |
| (V2 + V3)/V1 | 0.96 | (\|f/f2\| + \|f/f3\| + \|f/f4\|)/(\|f/f5\| + \|f/f6\|) | 0.46 |
| (CT2 + CT3)/f | 0.12 | Dsc/TL | 0.69 |
| f2/R4 | 0.24 | ImgH/f | 0.75 |
| R12/R11 | 0.17 | | |

9th Embodiment

Figure 17:
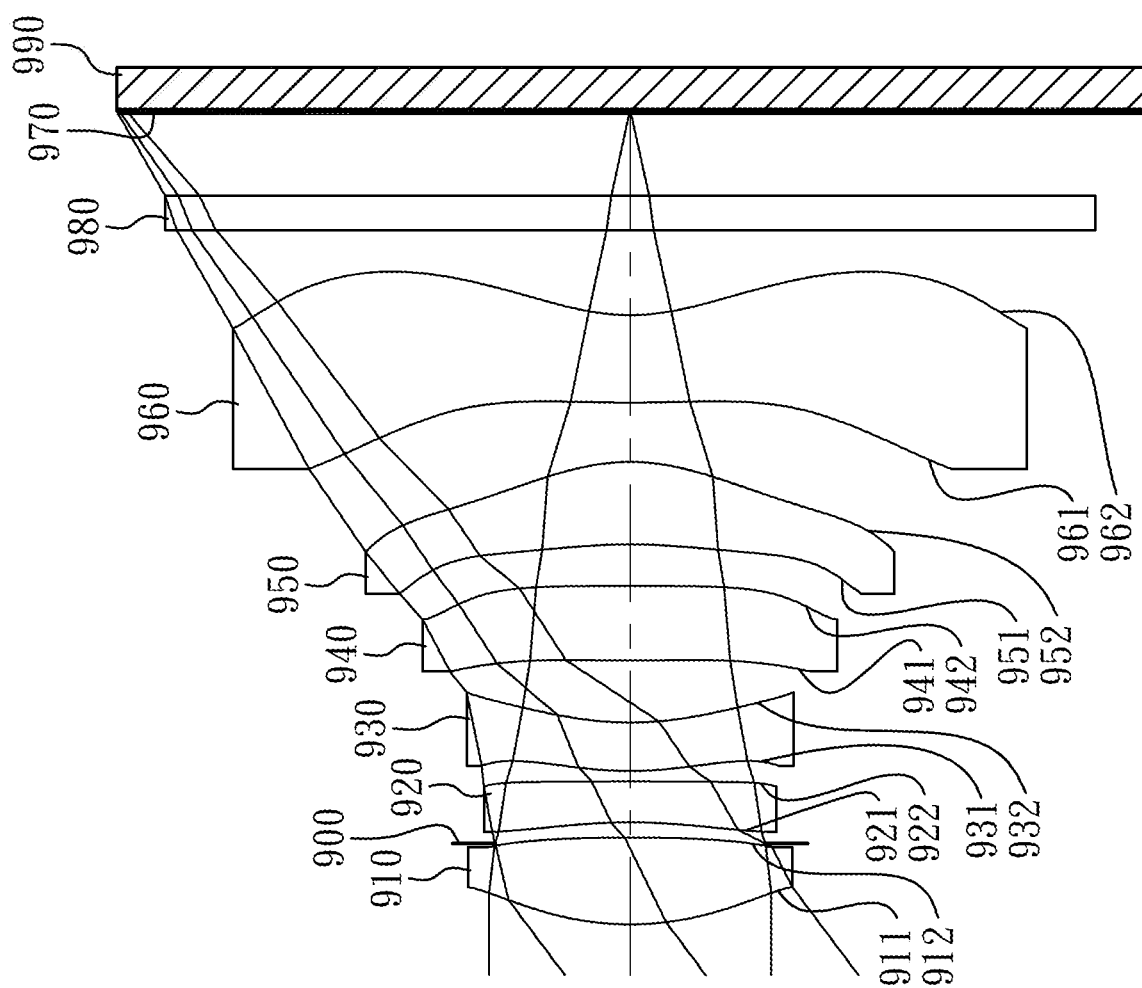
FIG. 17 is a schematic view of an image capturing optical lens assembly according to the 9th embodiment of the present disclosure.
Figure 18:
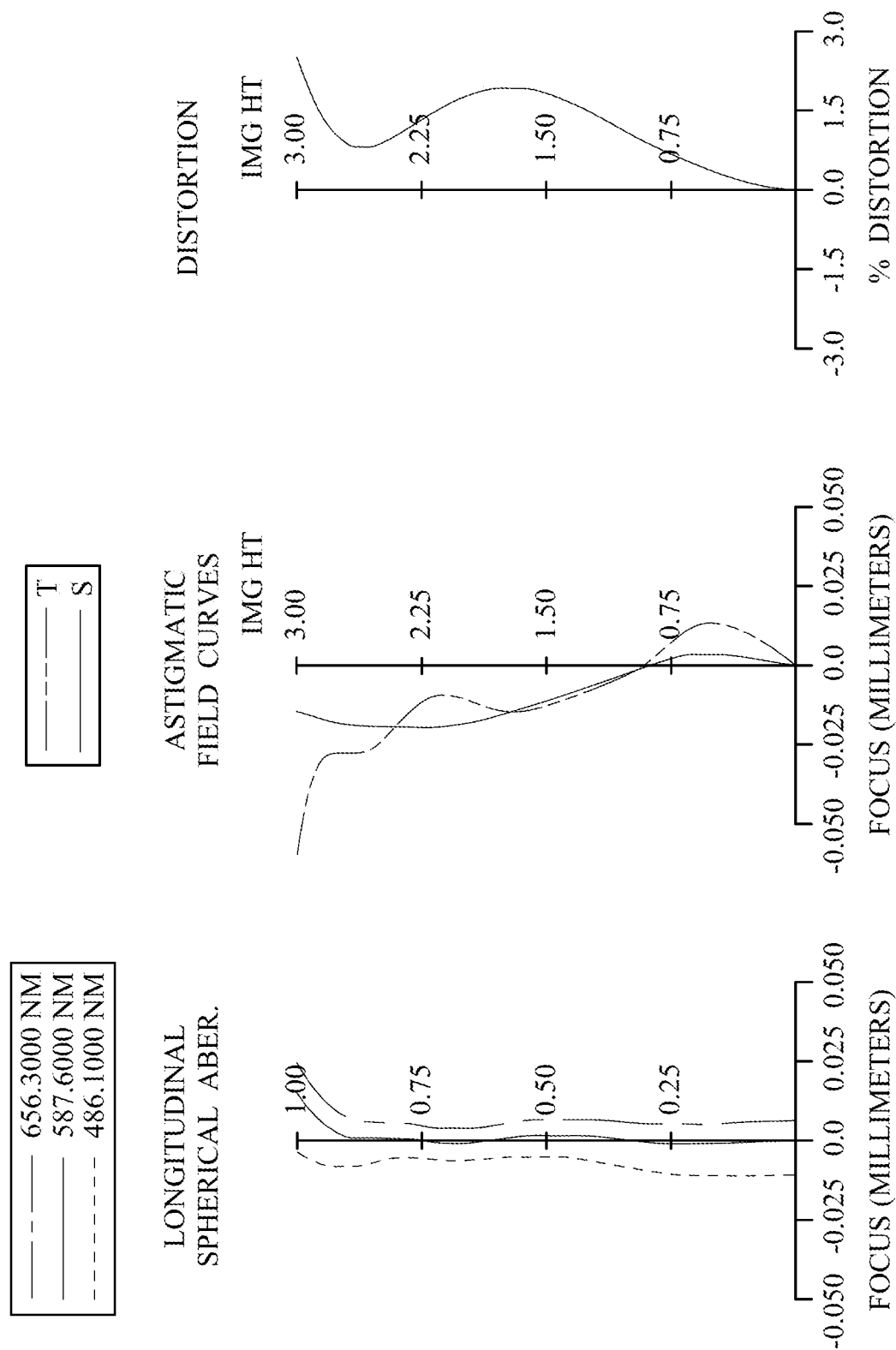
FIG. 18 shows spherical aberration curves, astigmatic field curves and a distortion curve of the image capturing optical lens assembly according to the 9th embodiment.

FIG. 17 is a schematic view of an image capturing optical lens assembly according to the 9th embodiment of the present disclosure. FIG. 18 shows spherical aberration curves, astigmatic field curves and a distortion curve of the image capturing optical lens assembly according to the 9th embodiment. In FIG. 17, the image capturing optical lens assembly includes, in order from an object side to an image side, a first lens element 910, an aperture stop 900, a second lens element 920, a third lens element 930, a fourth lens element 940, a fifth lens element 950, a sixth lens element 960, an IR-cut filter 980, an image plane 970, and an image sensor 990.

The first lens element 910 with positive refractive power has a convex object-side surface 911 and a convex image-side surface 912. The first lens element 910 is made of plastic material and has the object-side surface 911 and the image-side surface 912 being both aspheric.

The second lens element 920 with negative refractive power has a concave object-side surface 921 and a convex image-side surface 922. The second lens element 920 is made of plastic material and has the object-side surface 921 and the image-side surface 922 being both aspheric.

The third lens element 930 with negative refractive power has a convex object-side surface 931 and a concave image-side surface 932. The third lens element 930 is made of plastic material and has the object-side surface 931 and the image-side surface 932 being both aspheric.

The fourth lens element 940 with positive refractive power has a convex object-side surface 941 and a convex image-side surface 942. The fourth lens element 940 is made of plastic material and has the object-side surface 941 and the image-side surface 942 being both aspheric.

The fifth lens element 950 with positive refractive power has a concave object-side surface 951 and a convex image-side surface 952. The fifth lens element 950 is made of plastic material and has the object-side surface 951 and the image-side surface 952 being both aspheric.

The sixth lens element 960 with negative refractive power has a convex object-side surface 961 and a concave image-side surface 962. The sixth lens element 960 is made of plastic material and has the object-side surface 961 and the image-side surface 962 being both aspheric. Furthermore, the sixth lens element 960 has inflection points on the image-side surface 962 thereof.

The IR-cut filter 980 made of glass material is located between the sixth lens element 960 and the image plane 970, and will not affect a focal length of the image capturing optical lens assembly.

The detailed optical data of the 9th embodiment are shown in Table 17, and the aspheric surface data are shown in Table 18 below.

TABLE 17

9th Embodiment
f = 3.90 mm, Fno = 2.35, HFOV = 36.9 deg.

| Surface # |  | Curvature Radius |  | Thickness | Material | Index | Abbe # | Focal length |
|---|---|---|---|---|---|---|---|---|
| 0 | Object | Plano |  | Infinity |  |  |  |  |
| 1 | Lens 1 | 1.725 | (ASP) | 0.510 | Plastic | 1.530 | 55.8 | 2.95 |
| 2 |  | −14.834 | (ASP) | −0.035 |  |  |  |  |
| 3 | Ape. Stop | Plano |  | 0.125 |  |  |  |  |
| 4 | Lens 2 | −3.214 | (ASP) | 0.240 | Plastic | 1.634 | 23.8 | −5.64 |
| 5 |  | −32.705 | (ASP) | 0.062 |  |  |  |  |
| 6 | Lens 3 | 2.060 | (ASP) | 0.285 | Plastic | 1.608 | 25.7 | −78.88 |
| 7 |  | 1.871 | (ASP) | 0.365 |  |  |  |  |
| 8 | Lens 4 | 20.986 | (ASP) | 0.438 | Plastic | 1.544 | 55.9 | 29.61 |
| 9 |  | −68.864 | (ASP) | 0.245 |  |  |  |  |
| 10 | Lens 5 | −3.241 | (ASP) | 0.485 | Plastic | 1.544 | 55.9 | 3.17 |
| 11 |  | −1.185 | (ASP) | 0.349 |  |  |  |  |
| 12 | Lens 6 | 9.690 | (ASP) | 0.514 | Plastic | 1.530 | 55.8 | −2.67 |
| 13 |  | 1.213 | (ASP) | 0.500 |  |  |  |  |
| 14 | IR-cut filter | Plano |  | 0.200 | Glass | 1.517 | 64.2 | — |
| 15 |  | Plano |  | 0.499 |  |  |  |  |
| 16 | Image | Plano |  | — |  |  |  |  |

Note:
Reference wavelength (d-line) is 587.6 nm.

TABLE 18

Aspheric Coefficients

| Surface # | 1 | 2 | 4 | 5 |
|---|---|---|---|---|
| k = | −4.9451E+00 | −1.0000E+00 | −3.1599E+00 | −3.0000E+01 |
| A4 = | 1.0141E−01 | −8.6152E−02 | 1.3487E−01 | 4.3340E−02 |
| A6 = | −1.4923E−01 | 1.6945E−02 | −1.1865E−01 | −3.7184E−02 |
| A8 = | 3.2156E−01 | 1.8698E−01 | 2.1845E−01 | −9.1713E−02 |
| A10 = | −6.5465E−01 | −5.6535E−01 | −4.4278E−01 | 6.9942E−03 |
| A12 = | 5.9508E−01 | 6.8494E−01 | 6.8577E−01 | 1.2791E−01 |
| A14 = | −2.2109E−01 | −3.3023E−01 | −4.5621E−01 | −1.7873E−01 |

| Surface # | 6 | 7 | 8 | 9 |
|---|---|---|---|---|
| k = | 2.8972E+00 | 1.9348E+00 | 3.0000E+00 | 3.0000E+00 |
| A4 = | −3.2348E−01 | −1.7913E−01 | −8.1726E−02 | −3.5489E−02 |
| A6 = | 7.8069E−02 | −1.2206E−02 | −1.5030E−02 | −6.1115E−02 |
| A8 = | −2.6308E−01 | −2.1231E−03 | 9.7706E−03 | −1.5002E−02 |
| A10 = | 3.1632E−01 | 6.2994E−02 | 7.2151E−03 | 7.9002E−03 |
| A12 = | −2.4569E−01 | −6.0347E−02 | 7.1867E−03 | 2.7177E−03 |
| A14 = |  | 3.0866E−03 | −4.1367E−03 | 4.9159E−03 |

| Surface # | 10 | 11 | 12 | 13 |
|---|---|---|---|---|
| k = | −1.3271E+00 | −4.8742E+00 | −1.0000E+00 | −5.6640E+00 |
| A4 = | 1.3955E−01 | −3.1354E−02 | −9.3221E−02 | −7.8001E−02 |
| A6 = | −4.6787E−03 | 1.3910E−01 | −1.8133E−02 | 2.5371E−02 |
| A8 = | −1.5810E−01 | −1.0835E−01 | 2.6921E−02 | −7.2074E−03 |
| A10 = | 1.3307E−01 | 3.3866E−02 | −7.7182E−03 | 1.3922E−03 |
| A12 = | −5.9550E−02 | −4.3712E−03 | 7.4190E−04 | −1.7510E−04 |
| A14 = | 1.2093E−02 | 9.8286E−06 | 8.0095E−07 | 1.0719E−05 |

In the image capturing optical lens assembly according to the 9th embodiment, the definitions of these parameters shown in the following table are the same as those stated in the 1st embodiment with corresponding values for the 9th embodiment. Moreover, these parameters can be calculated from Table 17 and Table 18 as the following values and satisfy the following relationships:

| f (mm) | 3.90 | (C3 − C4)/(C3 + C4) | 0.82 |
|---|---|---|---|
| Fno | 2.35 | (C5 − C6)/(C5 + C6) | −0.05 |

-continued

| | | | |
|---|---|---|---|
| HFOV (deg.) | 36.9 | f2/f3 | 0.07 |
| (V2 + V3)/V1 | 0.89 | (|f/f2| + |f/f3| + |f/f4|)/(|f/f5| + |f/f6|) | 0.32 |
| (CT2 + CT3)/f | 0.13 | Dsc/TL | 0.70 |
| f2/R4 | 0.17 | ImgH/f | 0.77 |
| R12/R11 | 0.13 | | |

10th Embodiment

Figure 19:
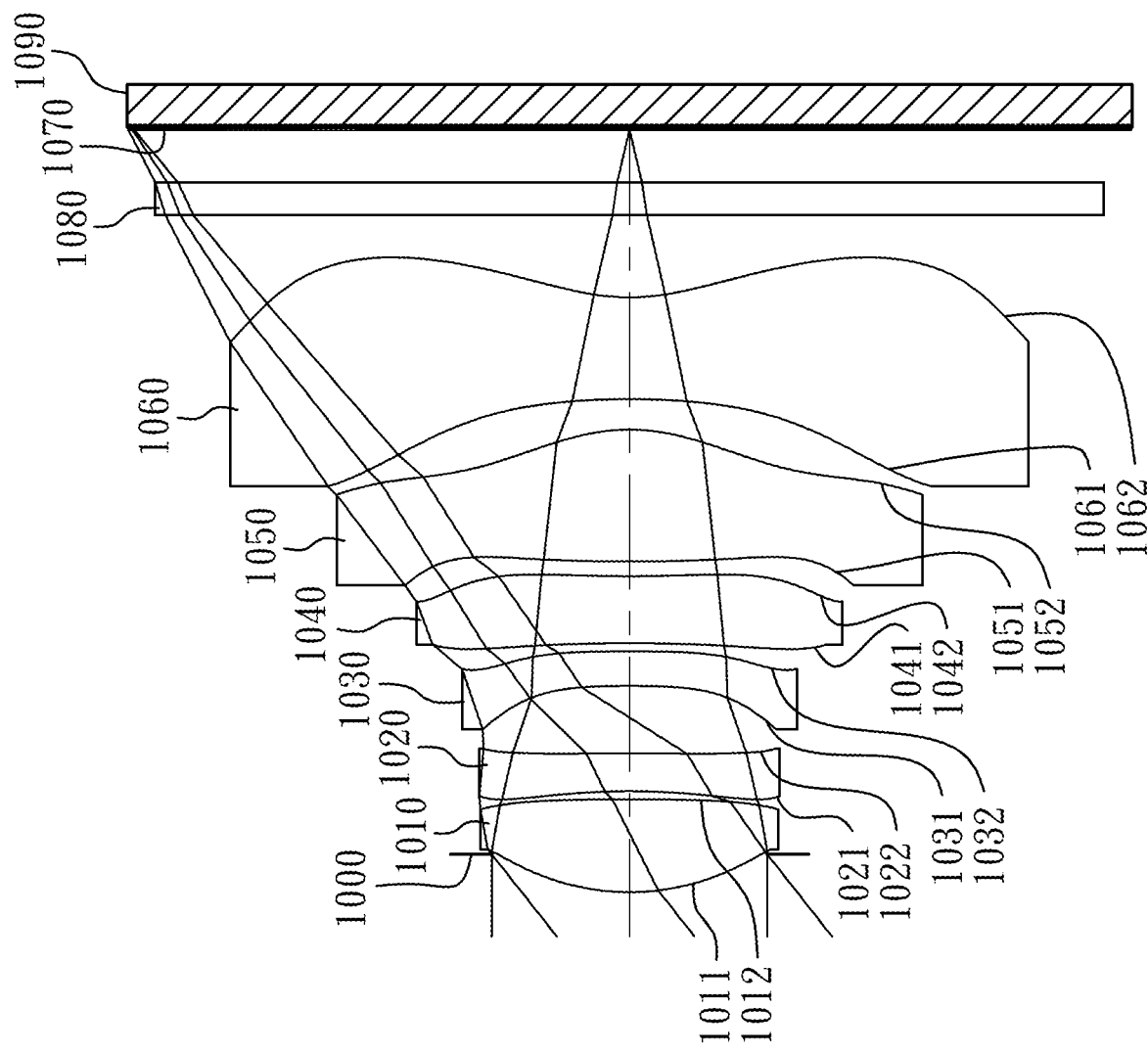
FIG. 19 is a schematic view of an image capturing optical lens assembly according to the 10th embodiment of the present disclosure.
Figure 20:
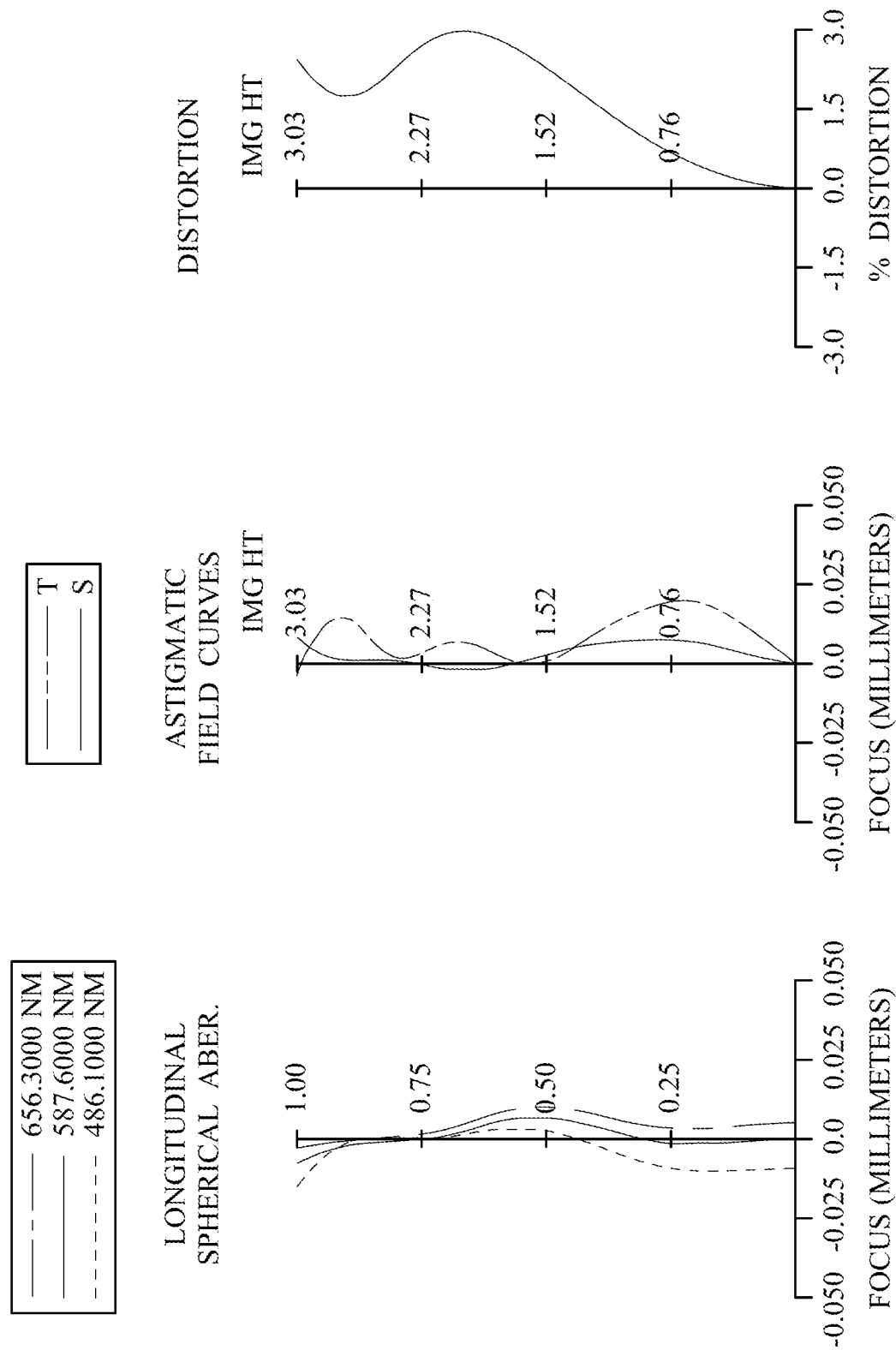
FIG. 20 shows spherical aberration curves, astigmatic field curves and a distortion curve of the image capturing optical lens assembly according to the 10th embodiment.

FIG. 19 is a schematic view of an image capturing optical lens assembly according to the 10th embodiment of the present disclosure. FIG. 20 shows spherical aberration curves, astigmatic field curves and a distortion curve of the image capturing optical lens assembly according to the 10th embodiment. In FIG. 19, the image capturing optical lens assembly includes, in order from an object side to an image side, an aperture stop 1000, a first lens element 1010, a second lens element 1020, a third lens element 1030, a fourth lens element 1040, a fifth lens element 1050, a sixth lens element 1060, an IR-cut filter 1080, an image plane 1070, and an image sensor 1090.

The first lens element 1010 with positive refractive power has a convex object-side surface 1011 and a convex image-side surface 1012. The first lens element 1010 is made of plastic material and has the object-side surface 1011 and the image-side surface 1012 being both aspheric.

The second lens element 1020 with negative refractive power has a concave object-side surface 1021 and a convex image-side surface 1022. The second lens element 1020 is made of plastic material and has the object-side surface 1021 and the image-side surface 1022 being both aspheric.

The third lens element 1030 with negative refractive power has a concave object-side surface 1031 and a convex image-side surface 1032. The third lens element 1030 is made of plastic material and has the object-side surface 1031 and the image-side surface 1032 being both aspheric.

The fourth lens element 1040 with negative refractive power has a concave object-side surface 1041 and a concave image-side surface 1042. The fourth lens element 1040 is made of plastic material and has the object-side surface 1041 and the image-side surface 1042 being both aspheric.

The fifth lens element 1050 with positive refractive power has a convex object-side surface 1051 and a convex image-side surface 1052. The fifth lens element 1050 is made of plastic material and has the object-side surface 1051 and the image-side surface 1052 being both aspheric.

The sixth lens element 1060 with negative refractive power has a concave object-side surface 1061 and a concave image-side surface 1062. The sixth lens element 1060 is made of plastic material and has the object-side surface 1061 and the image-side surface 1062 being both aspheric. Furthermore, the sixth lens element 1060 has inflection points on the image-side surface 1062 thereof.

The IR-cut filter 1080 made of glass material is located between the sixth lens element 1060 and the image plane 1070, and will not affect a focal length of the image capturing optical lens assembly.

The detailed optical data of the 10th embodiment are shown in Table 19, and the aspheric surface data are shown in Table 20 below.

TABLE 19

10th Embodiment
f = 3.74 mm, Fno = 2.23, HFOV = 38.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.230 | | | | |
| 2 | Lens 1 | 1.463 | (ASP) | 0.565 | Plastic | 1.544 | 55.9 | 2.57 |
| 3 | | −27.626 | (ASP) | 0.050 | | | | |
| 4 | Lens 2 | −4.112 | (ASP) | 0.230 | Plastic | 1.632 | 23.4 | −7.53 |
| 5 | | −30.905 | (ASP) | 0.411 | | | | |
| 6 | Lens 3 | −7.028 | (ASP) | 0.210 | Plastic | 1.640 | 23.3 | −16.26 |
| 7 | | −21.930 | (ASP) | 0.050 | | | | |
| 8 | Lens 4 | −11.801 | (ASP) | 0.409 | Plastic | 1.535 | 56.3 | −9.52 |
| 9 | | 9.059 | (ASP) | 0.090 | | | | |
| 10 | Lens 5 | 15.581 | (ASP) | 0.803 | Plastic | 1.544 | 55.9 | 1.95 |
| 11 | | −1.117 | (ASP) | 0.185 | | | | |
| 12 | Lens 6 | −4.892 | (ASP) | 0.620 | Plastic | 1.544 | 55.9 | −1.77 |
| 13 | | 1.253 | (ASP) | 0.500 | | | | |
| 14 | IR-cut filter | Plano | | 0.200 | Glass | 1.517 | 64.2 | — |
| 15 | | Plano | | 0.335 | | | | |
| 16 | Image | Plano | | — | | | | |

Note:
Reference wavelength (d-line) is 587.6 nm.

TABLE 20

Aspheric Coefficients

| Surface # | 2 | 3 | 4 | 5 |
|---|---|---|---|---|
| k = | −3.4077E+00 | −1.0459E+01 | −2.8384E+01 | 3.0000E+00 |
| A4 = | 1.3815E−01 | −7.9686E−02 | −4.2738E−02 | 2.7396E−02 |
| A6 = | −8.9194E−02 | 1.0719E−01 | 1.2186E−01 | 8.6705E−02 |
| A8 = | 2.5408E−01 | −7.1259E−02 | 2.8217E−01 | −1.1490E−01 |
| A10 = | −6.7475E−01 | −3.8997E−01 | −1.2773E+00 | 7.9771E−02 |
| A12 = | 8.4996E−01 | 7.3662E−01 | 1.7794E+00 | −1.2190E−01 |
| A14 = | −4.9201E−01 | −4.0012E−01 | −7.4908E−01 | 1.6330E−01 |

| Surface # | 6 | 7 | 8 | 9 |
|---|---|---|---|---|
| k = | −3.0000E+01 | −3.0000E+01 | 3.0000E+00 | −3.0000E+01 |
| A4 = | −3.7734E−01 | −2.2568E−01 | −1.2954E−02 | −6.1297E−02 |
| A6 = | 3.1050E−02 | −9.4975E−03 | 4.6049E−03 | −4.2322E−02 |
| A8 = | −2.5798E−01 | 9.0841E−02 | 1.4314E−02 | −9.8680E−03 |
| A10 = | 5.9581E−01 | 9.6897E−02 | −1.9955E−03 | 5.4813E−03 |
| A12 = | −2.9837E−01 | −2.0428E−02 | 6.0048E−03 | 5.1323E−03 |
| A14 = | | −1.9584E−02 | −2.7848E−03 | 7.1285E−04 |

TABLE 20-continued

Aspheric Coefficients

| Surface # | 10 | 11 | 12 | 13 |
|---|---|---|---|---|
| k = | −3.0000E+01 | −5.0760E+00 | −9.2765E+00 | −7.4572E+00 |
| A4 = | 4.2726E−02 | −3.6925E−02 | −4.4735E−02 | −6.4802E−02 |
| A6 = | −1.2540E−03 | 1.6222E−01 | −2.6653E−02 | 2.3260E−02 |
| A8 = | −1.3291E−01 | −1.1038E−01 | 2.5519E−02 | −6.9756E−03 |
| A10 = | 1.3244E−01 | 3.2626E−02 | −7.3833E−03 | 1.3150E−03 |
| A12 = | −6.3553E−02 | −4.5165E−03 | 9.5619E−04 | −1.6361E−04 |
| A14 = | 1.2124E−02 | 2.3012E−04 | −4.1725E−05 | 9.5475E−06 |

In the image capturing optical lens assembly according to the 10th embodiment, the definitions of these parameters shown in the following table are the same as those stated in the 1st embodiment with corresponding values for the 10th embodiment. Moreover, these parameters can be calculated from Table 19 and Table 20 as the following values and satisfy the following relationships:

| | | | |
|---|---|---|---|
| f (mm) | 3.74 | (C3 − C4)/(C3 + C4) | 0.77 |
| Fno | 2.23 | (C5 − C6)/(C5 + C6) | 0.51 |
| HFOV (deg.) | 38.4 | f2/f3 | 0.46 |
| (V2 + V3)/V1 | 0.84 | (|f/f2| + |f/f3| + |f/f4|)/(|f/f5| + |f/f6|) | 0.28 |
| (CT2 + CT3)/f | 0.12 | Dsc/TL | 0.78 |
| f2/R4 | 0.24 | ImgH/f | 0.81 |
| R12/R11 | −0.26 | | |

11th Embodiment

Figure 21:
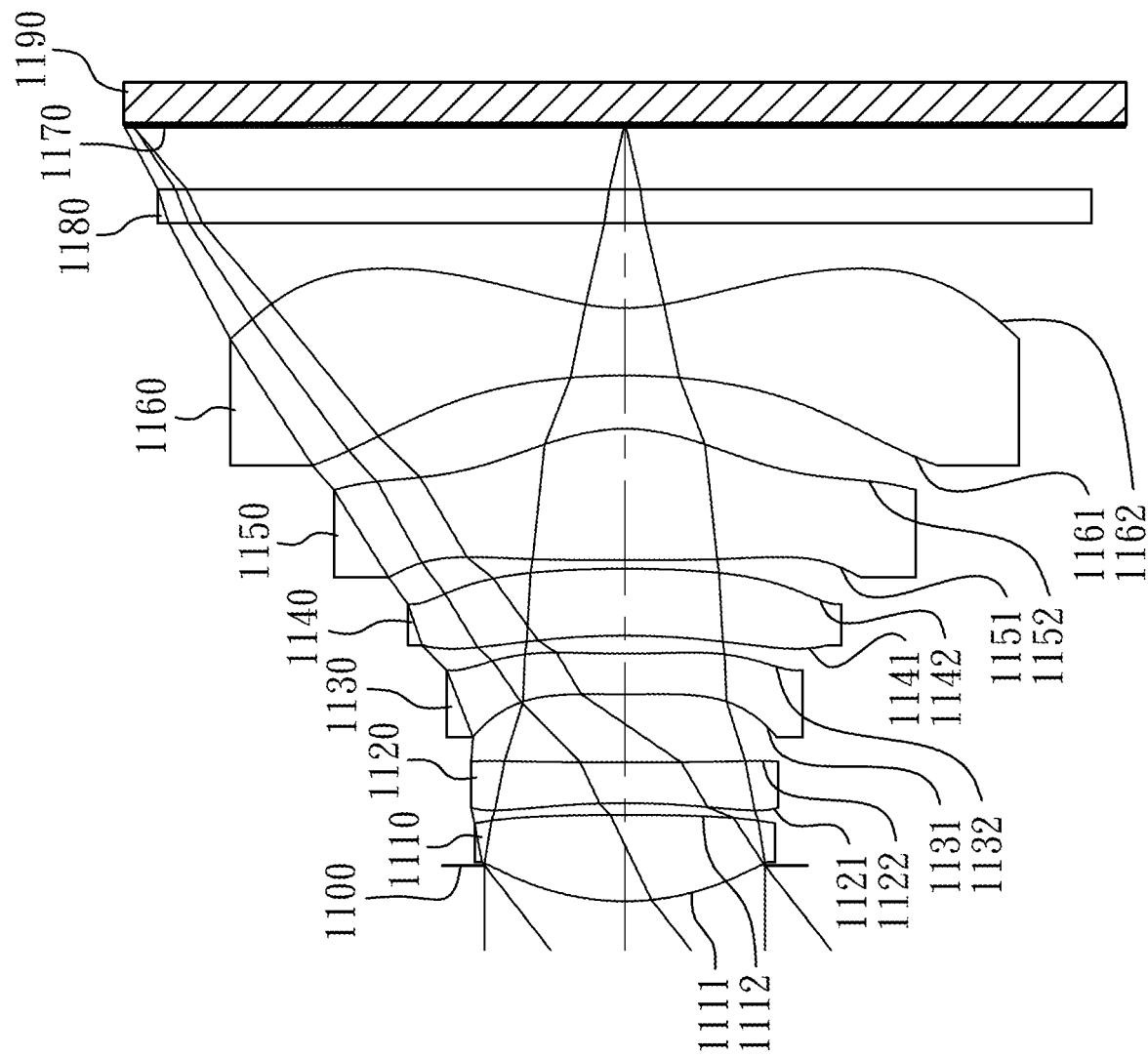
FIG. 21 is a schematic view of an image capturing optical lens assembly according to the 11th embodiment of the present disclosure.
Figure 22:
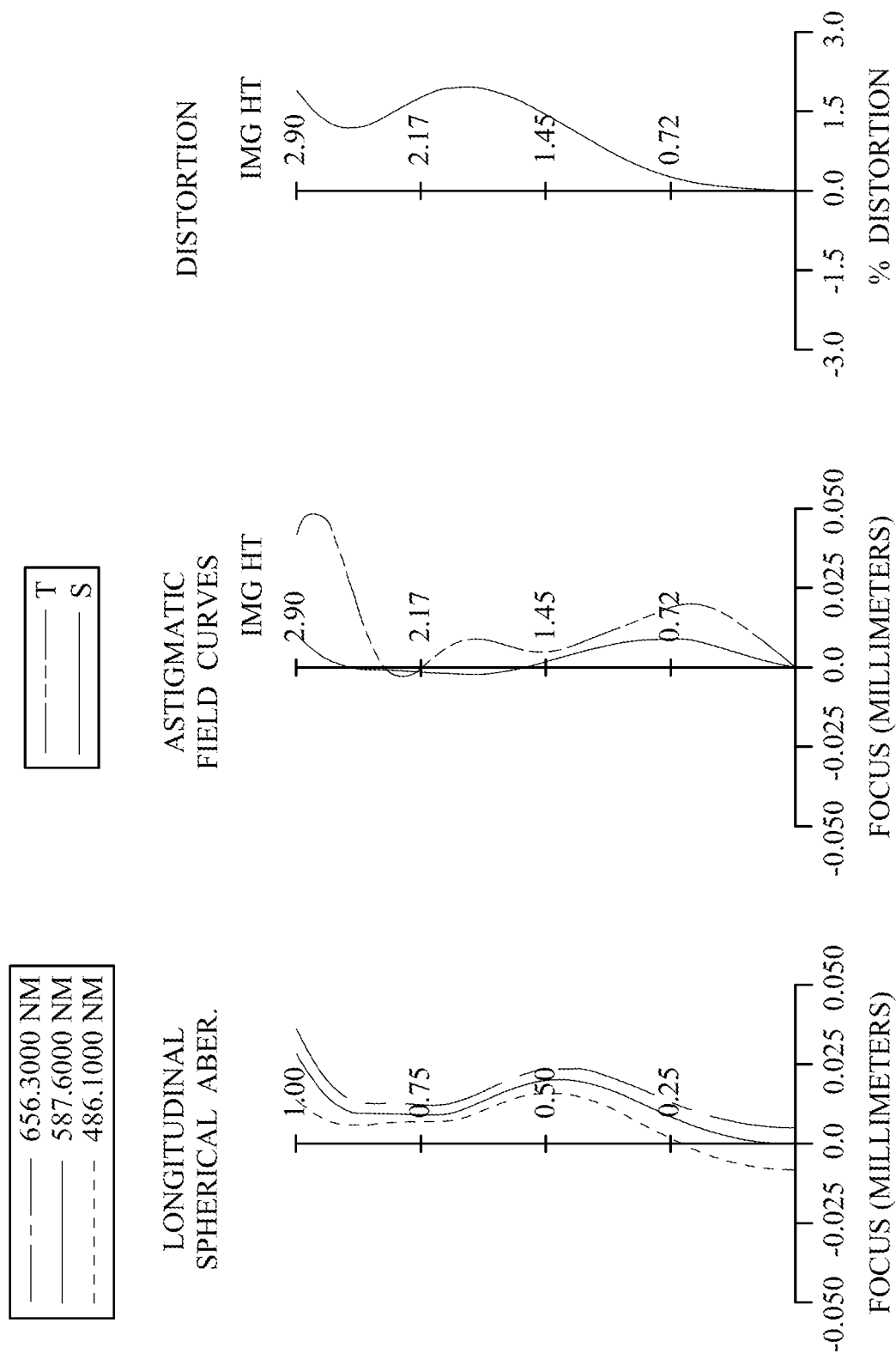
FIG. 22 shows spherical aberration curves, astigmatic field curves and a distortion curve of the image capturing optical lens assembly according to the 11th embodiment.

FIG. 21 is a schematic view of an image capturing optical lens assembly according to the 11th embodiment of the present disclosure. FIG. 22 shows spherical aberration curves, astigmatic field curves and a distortion curve of the image capturing optical lens assembly according to the 11th embodiment. In FIG. 21, the image capturing optical lens assembly includes, in order from an object side to an image side, an aperture stop 1100, a first lens element 1110, a second lens element 1120, a third lens element 1130, a fourth lens element 1140, a fifth lens element 1150, a sixth lens element 1160, an IR-cut filter 1180, an image plane 1170, and an image sensor 1190.

The first lens element 1110 with positive refractive power has a convex object-side surface 1111 and a convex image-side surface 1112. The first lens element 1110 is made of plastic material and has the object-side surface 1111 and the image-side surface 1112 being both aspheric.

The second lens element 1120 with negative refractive power has a concave object-side surface 1121 and a concave image-side surface 1122. The second lens element 1120 is made of plastic material and has the object-side surface 1121 and the image-side surface 1122 being both aspheric.

The third lens element 1130 with negative refractive power has a convex object-side surface 1131 and a concave image-side surface 1132. The third lens element 1130 is made of plastic material and has the object-side surface 1131 and the image-side surface 1132 being both aspheric.

The fourth lens element 1140 with negative refractive power has a concave object-side surface 1141 and a convex image-side surface 1142. The fourth lens element 1140 is made of plastic material and has the object-side surface 1141 and the image-side surface 1142 being both aspheric.

The fifth lens element 1150 with positive refractive power has a convex object-side surface 1151 and a convex image-side surface 1152. The fifth lens element 1150 is made of plastic material and has the object-side surface 1151 and the image-side surface 1152 being both aspheric.

The sixth lens element 1160 with negative refractive power has a concave object-side surface 1161 and a concave image-side surface 1162. The sixth lens element 1160 is made of plastic material and has the object-side surface 1161 and the image-side surface 1162 being both aspheric. Furthermore, the sixth lens element 1160 has inflection points on the image-side surface 1162 thereof.

The IR-cut filter 1180 made of glass material is located between the sixth lens element 1160 and the image plane 1170, and will not affect a focal length of the image capturing optical lens assembly.

The detailed optical data of the 11th embodiment are shown in Table 21, and the aspheric surface data are shown in Table 22 below.

TABLE 21

11th Embodiment
f = 3.63 mm, Fno = 2.20, HFOV = 38.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.211 | | | | |
| 2 | Lens 1 | 1.535 | (ASP) | 0.509 | Plastic | 1.544 | 55.9 | 2.63 |
| 3 | | −18.728 | (ASP) | 0.070 | | | | |
| 4 | Lens 2 | −4.747 | (ASP) | 0.240 | Plastic | 1.640 | 23.3 | −6.62 |
| 5 | | 40.277 | (ASP) | 0.401 | | | | |
| 6 | Lens 3 | 13.653 | (ASP) | 0.240 | Plastic | 1.640 | 23.3 | −15.60 |
| 7 | | 5.727 | (ASP) | 0.107 | | | | |
| 8 | Lens 4 | −4.490 | (ASP) | 0.395 | Plastic | 1.544 | 55.9 | −22.90 |
| 9 | | −7.238 | (ASP) | 0.051 | | | | |
| 10 | Lens 5 | 166.683 | (ASP) | 0.774 | Plastic | 1.544 | 55.9 | 1.90 |
| 11 | | −1.041 | (ASP) | 0.315 | | | | |
| 12 | Lens 6 | −3.779 | (ASP) | 0.398 | Plastic | 1.535 | 55.7 | −1.66 |
| 13 | | 1.199 | (ASP) | 0.500 | | | | |
| 14 | IR-cut filter | Plano | | 0.200 | Glass | 1.517 | 64.2 | — |
| 15 | | Plano | | 0.379 | | | | |
| 16 | Image | Plano | | — | | | | |

Note:
Reference wavelength (d-line) is 587.6 nm.

TABLE 22

| Aspheric Coefficients | | | | |
|---|---|---|---|---|
| Surface # | 2 | 3 | 4 | 5 |
| k = | -4.0836E+00 | -1.0000E+00 | -1.2180E+01 | -1.0000E+00 |
| A4 = | 1.3264E-01 | -6.6710E-02 | -2.9006E-02 | -2.4325E-02 |
| A6 = | -8.2477E-02 | 1.1914E-01 | 1.7014E-01 | 1.4864E-01 |
| A8 = | 2.1026E-01 | -8.4909E-02 | 2.0773E-01 | -1.6329E-01 |
| A10 = | -6.8917E-01 | -3.7192E-01 | -1.3180E+00 | -8.8726E-02 |
| A12 = | 9.2126E-01 | 6.5441E-01 | 1.8725E+00 | 1.7547E-01 |
| A14 = | -5.1198E-01 | -2.9644E-01 | -7.8971E-01 | -7.4911E-02 |
| Surface # | 6 | 7 | 8 | 9 |
| k = | -2.0000E+01 | -2.0000E+01 | 1.8661E+00 | -2.0000E+01 |
| A4 = | -4.1986E-01 | -2.7447E-01 | 1.1675E-02 | -3.2791E-02 |
| A6 = | 4.7442E-02 | -2.9121E-02 | 1.6428E-02 | -3.1137E-02 |
| A8 = | -3.9588E-01 | 7.9085E-02 | 1.1069E-02 | -6.4796E-03 |
| A10 = | 6.8222E-01 | 7.8569E-02 | -3.0061E-03 | 3.8485E-03 |
| A12 = | -3.7305E-01 | -2.4674E-02 | 3.0621E-03 | 4.5398E-03 |
| A14 = | -7.7146E-05 | -4.1779E-03 | -1.1898E-03 | 9.1337E-04 |
| Surface # | 10 | 11 | 12 | 13 |
| k = | 0.0000E+00 | -4.7672E+00 | -2.4415E+01 | -8.1375E+00 |
| A4 = | 6.1515E-02 | -2.6425E-02 | -4.4936E-02 | -6.3158E-02 |
| A6 = | -2.6721E-03 | 1.6094E-01 | -2.6758E-02 | 2.1776E-02 |
| A8 = | -1.2863E-01 | -1.1059E-01 | 2.5507E-02 | -6.7714E-03 |
| A10 = | 1.3431E-01 | 3.2643E-02 | -7.4051E-03 | 1.3129E-03 |
| A12 = | -6.4235E-02 | -4.5294E-03 | 9.5983E-04 | -1.6626E-04 |
| A14 = | 1.1946E-02 | 2.3416E-04 | -4.4722E-05 | 1.0172E-05 |

In the image capturing optical lens assembly according to the 11th embodiment, the definitions of these parameters shown in the following table are the same as those stated in the 1st embodiment with corresponding values for the 11th embodiment. Moreover, these parameters can be calculated from Table 21 and Table 22 as the following values and satisfy the following relationships:

| | | | |
|---|---|---|---|
| f (mm) | 3.63 | (C3 − C4)/(C3 + C4) | 1.27 |
| Fno | 2.20 | (C5 − C6)/(C5 + C6) | -0.41 |
| HFOV (deg.) | 38.0 | f2/f3 | 0.42 |
| (V2 + V3)/V1 | 0.83 | (|f/f2| + |f/f3| + |f/f4|)/(|f/f5| + |f/f6|) | 0.23 |
| (CT2 + CT3)/f | 0.13 | Dsc/TL | 0.77 |
| f2/R4 | -0.16 | ImgH/f | 0.80 |
| R12/R11 | -0.32 | | |

12th Embodiment

Figure 23:
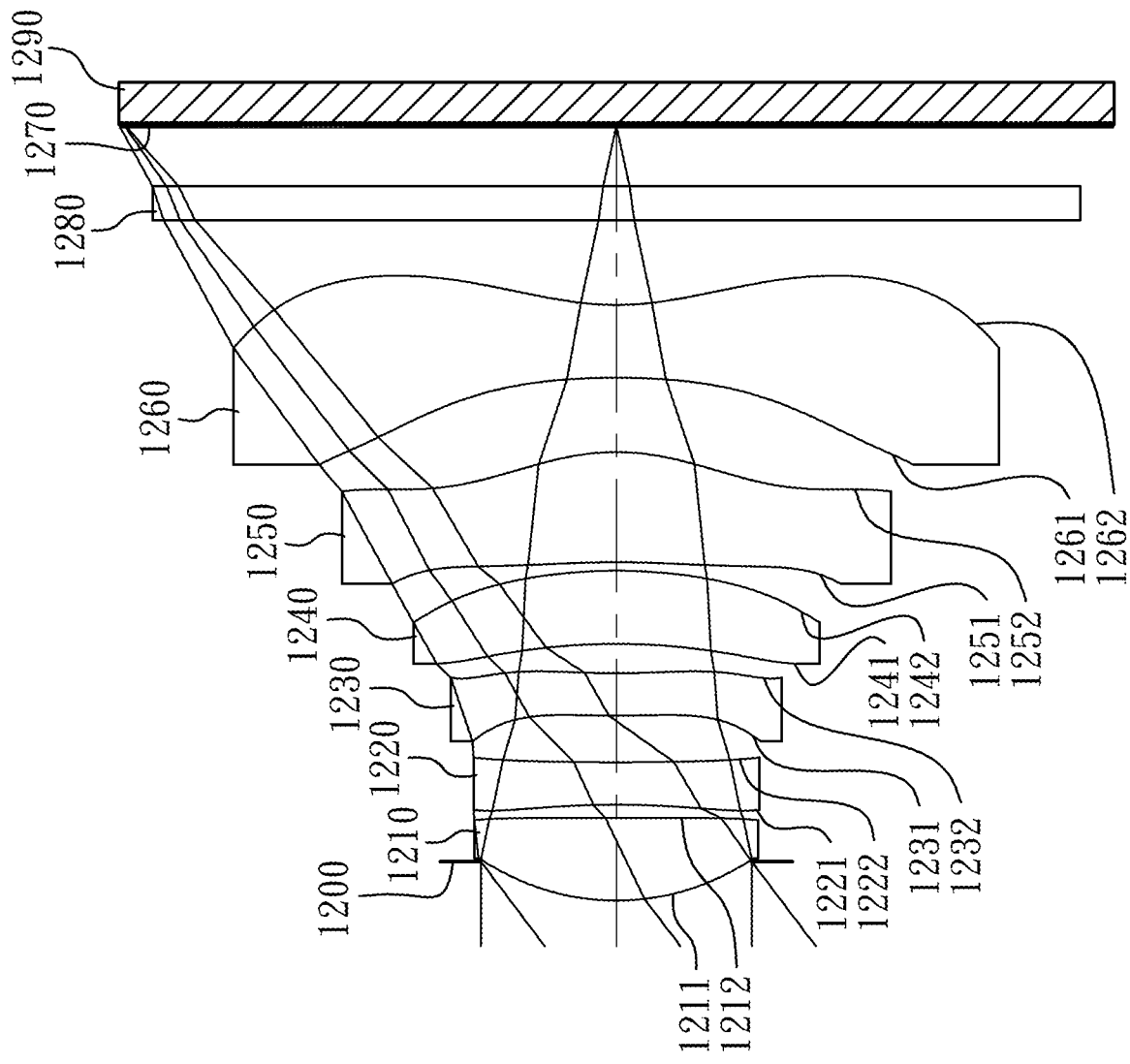
FIG. 23 is a schematic view of an image capturing optical lens assembly according to the 12th embodiment of the present disclosure.
Figure 24:
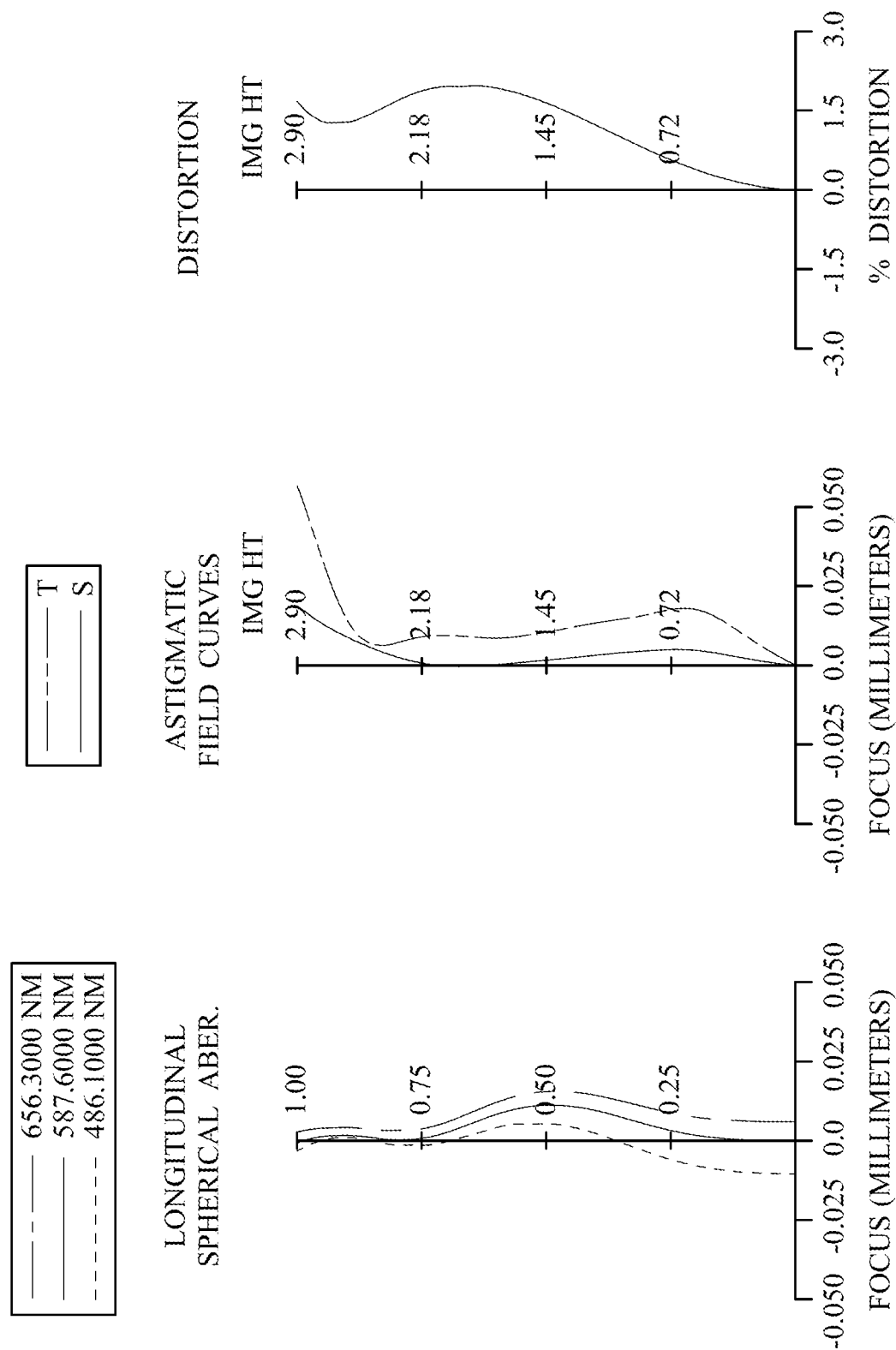
FIG. 24 shows spherical aberration curves, astigmatic field curves and a distortion curve of the image capturing optical lens assembly according to the 12th embodiment.

FIG. 23 is a schematic view of an image capturing optical lens assembly according to the 12th embodiment of the present disclosure. FIG. 24 shows spherical aberration curves, astigmatic field curves and a distortion curve of the image capturing optical lens assembly according to the 12th embodiment. In FIG. 23, the image capturing optical lens assembly includes, in order from an object side to an image side, an aperture stop 1200, a first lens element 1210, a second lens element 1220, a third lens element 1230, a fourth lens element 1240, a fifth lens element 1250, a sixth lens element 1260, an IR-cut filter 1280, an image plane 1270, and an image sensor 1290.

The first lens element 1210 with positive refractive power has a convex object-side surface 1211 and a concave image-side surface 1212. The first lens element 1210 is made of plastic material and has the object-side surface 1211 and the image-side surface 1212 being both aspheric.

The second lens element 1220 with negative refractive power has a concave object-side surface 1221 and a concave image-side surface 1222. The second lens element 1220 is made of plastic material and has the object-side surface 1221 and the image-side surface 1222 being both aspheric.

The third lens element 1230 with negative refractive power has a convex object-side surface 1231 and a concave image-side surface 1232. The third lens element 1230 is made of plastic material and has the object-side surface 1231 and the image-side surface 1232 being both aspheric.

The fourth lens element 1240 with positive refractive power has a concave object-side surface 1241 and a convex image-side surface 1242. The fourth lens element 1240 is made of plastic material and has the object-side surface 1241 and the image-side surface 1242 being both aspheric.

The fifth lens element 1250 with positive refractive power has a concave object-side surface 1251 and a convex image-side surface 1252. The fifth lens element 1250 is made of plastic material and has the object-side surface 1251 and the image-side surface 1252 being both aspheric.

The sixth lens element 1260 with negative refractive power has a concave object-side surface 1261 and a concave image-side surface 1262. The sixth lens element 1260 is made of plastic material and has the object-side surface 1261 and the image-side surface 1262 being both aspheric. Furthermore, the sixth lens element 1260 has inflection points on the image-side surface 1262 thereof.

The IR-cut filter 1280 made of glass material is located between the sixth lens element 1260 and the image plane 1270, and will not affect a focal length of the image capturing optical lens assembly.

The detailed optical data of the 12th embodiment are shown in Table 23, and the aspheric surface data are shown in Table 24 below.

TABLE 23

| 12th Embodiment f = 3.78 mm, Fno = 2.37, HFOV = 37.0 deg. | | | | | | | |
|---|---|---|---|---|---|---|---|
| Surface # | | Curvature Radius | Thickness | | Material | Index | Abbe # | Focal length |
| 0 | Object | Plano | Infinity | | | | |
| 1 | Ape. Stop | Plano | -0.230 | | | | |
| 2 | Lens 1 | 1.424 (ASP) | 0.487 | Plastic | 1.544 | 55.9 | 2.66 |
| 3 | | 72.464 (ASP) | 0.078 | | | | |
| 4 | Lens 2 | -5.202 (ASP) | 0.250 | Plastic | 1.640 | 23.3 | -6.22 |
| 5 | | 17.300 (ASP) | 0.275 | | | | |
| 6 | Lens 3 | 6.502 (ASP) | 0.250 | Plastic | 1.640 | 23.3 | -27.29 |
| 7 | | 4.667 (ASP) | 0.173 | | | | |
| 8 | Lens 4 | -3.877 (ASP) | 0.432 | Plastic | 1.544 | 55.9 | 20.66 |
| 9 | | -2.996 (ASP) | 0.050 | | | | |
| 10 | Lens 5 | -5.426 (ASP) | 0.649 | Plastic | 1.544 | 55.9 | 3.05 |
| 11 | | -1.323 (ASP) | 0.439 | | | | |

TABLE 23-continued

12th Embodiment
f = 3.78 mm, Fno = 2.37, HFOV = 37.0 deg.

| Surface # | | Curvature Radius | | Thickness | Material | Index | Abbe # | Focal length |
|---|---|---|---|---|---|---|---|---|
| 12 | Lens 6 | −4.075 | (ASP) | 0.428 | Plastic | 1.535 | 55.7 | −2.11 |
| 13 | | 1.622 | (ASP) | 0.500 | | | | |
| 14 | IR-cut filter | Plano | | 0.200 | Glass | 1.517 | 64.2 | — |
| 15 | | Plano | | 0.362 | | | | |
| 16 | Image | Plano | | — | | | | |

Note:
Reference wavelength (d-line) is 587.6 nm.

TABLE 24

Aspheric Coefficients

| Surface # | 2 | 3 | 4 | 5 |
|---|---|---|---|---|
| k = | −3.1860E+00 | −1.0000E+00 | −1.9752E+01 | −1.0000E+00 |
| A4 = | 1.4309E−01 | −5.8722E−02 | −2.5769E−02 | −4.2022E−02 |
| A6 = | −6.8092E−02 | 1.3043E−01 | 1.6764E−01 | 1.7624E−01 |
| A8 = | 2.3343E−01 | −8.3615E−02 | 2.0911E−01 | −1.5191E−01 |
| A10 = | −6.7075E−01 | −3.8003E−01 | −1.3141E+00 | −8.2100E−02 |
| A12 = | 9.1897E−01 | 6.4186E−01 | 1.8762E+00 | 1.8617E−01 |
| A14 = | −5.5110E−01 | −3.1146E−01 | −7.8596E−01 | −5.5168E−02 |

| Surface # | 6 | 7 | 8 | 9 |
|---|---|---|---|---|
| k = | 3.0000E+00 | −1.1641E−01 | 2.6583E+00 | −1.1811E+01 |
| A4 = | −4.0858E−01 | −2.5620E−01 | −5.0007E−03 | −3.1496E−02 |
| A6 = | 6.2202E−02 | −2.0156E−02 | 1.7894E−02 | −2.8039E−02 |
| A8 = | −3.7457E−01 | 8.3559E−02 | 1.2192E−02 | −6.5335E−03 |
| A10 = | 6.8794E−01 | 8.3844E−02 | −2.6533E−03 | 2.7377E−03 |
| A12 = | −3.7468E−01 | −1.8729E−02 | 3.3289E−03 | 3.5295E−03 |
| A14 = | 3.9927E−04 | 1.7876E−03 | −8.3227E−04 | 2.8157E−04 |

| Surface # | 10 | 11 | 12 | 13 |
|---|---|---|---|---|
| k = | 0.0000E+00 | −5.6834E+00 | 9.8447E−01 | −8.7092E+00 |
| A4 = | 1.2262E−01 | −2.5942E−02 | −3.6539E−02 | −7.1337E−02 |
| A6 = | −1.2759E−02 | 1.6272E−01 | −2.1476E−02 | 2.4236E−02 |
| A8 = | −1.3257E−01 | −1.1059E−01 | 2.5661E−02 | −7.0965E−03 |
| A10 = | 1.3392E−01 | 3.2585E−02 | −7.4758E−03 | 1.3491E−03 |
| A12 = | −6.3948E−02 | −4.5490E−03 | 9.2543E−04 | −1.6795E−04 |
| A14 = | 1.2151E−02 | 2.2973E−04 | −5.6570E−05 | 9.5421E−06 |

In the image capturing optical lens assembly according to the 12th embodiment, the definitions of these parameters shown in the following table are the same as those stated in the 1st embodiment with corresponding values for the 12th embodiment. Moreover, these parameters can be calculated from Table 23 and Table 24 as the following values and satisfy the following relationships:

| | | | |
|---|---|---|---|
| f (mm) | 3.78 | (C3 − C4)/(C3 + C4) | 1.86 |
| Fno | 2.37 | (C5 − C6)/(C5 + C6) | −0.16 |
| HFOV (deg.) | 37.0 | f2/f3 | 0.23 |
| (V2 + V3)/V1 | 0.83 | (|f/f2| + |f/f3| + |f/f4|)/(|f/f5| + |f/f6|) | 0.31 |
| (CT2 + CT3)/f | 0.13 | Dsc/TL | 0.76 |
| f2/R4 | −0.36 | ImgH/f | 0.77 |
| R12/R11 | −0.40 | | |

13th Embodiment

Figure 25:
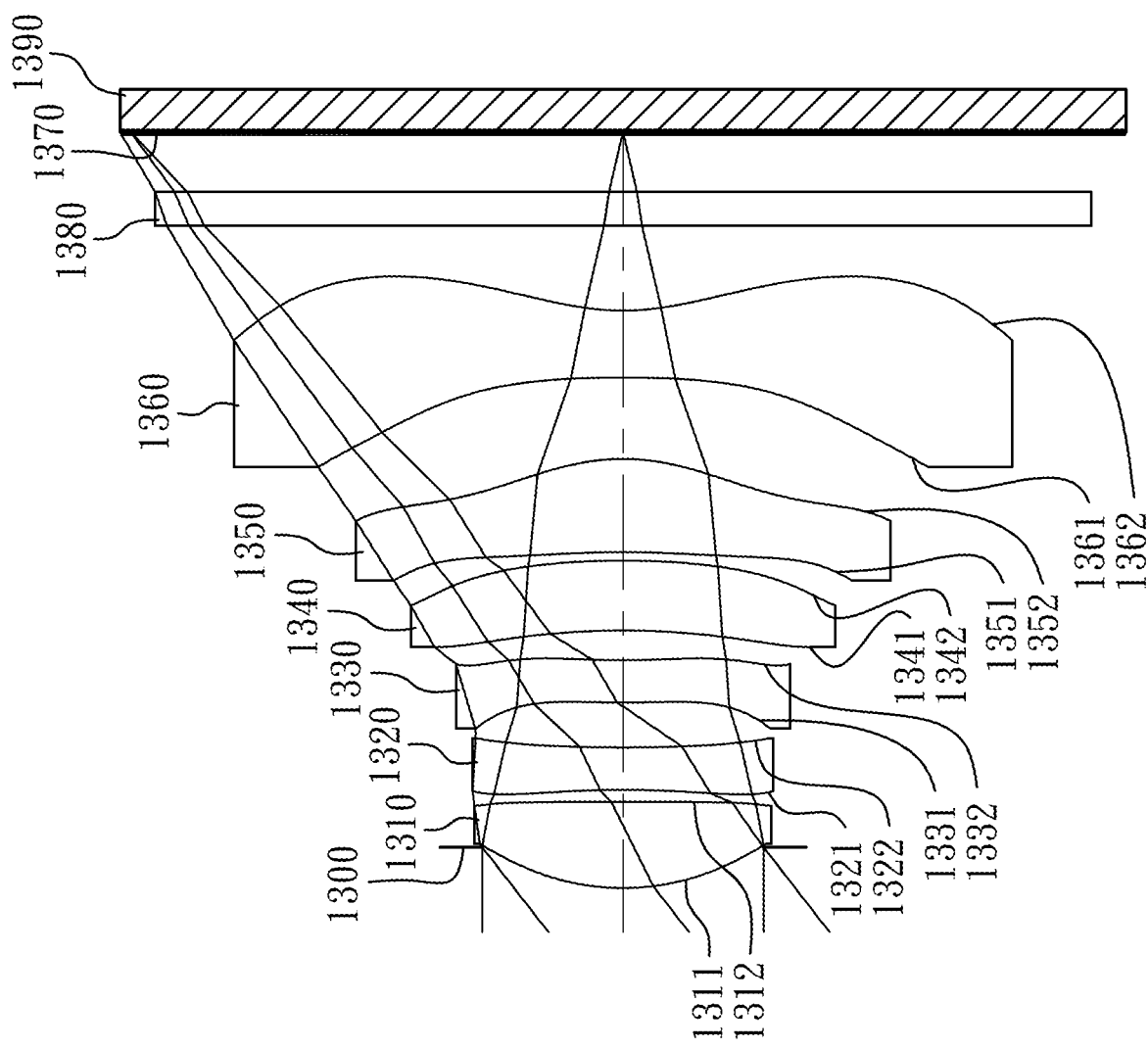
FIG. 25 is a schematic view of an image capturing optical lens assembly according to the 13th embodiment of the present disclosure.
Figure 26:
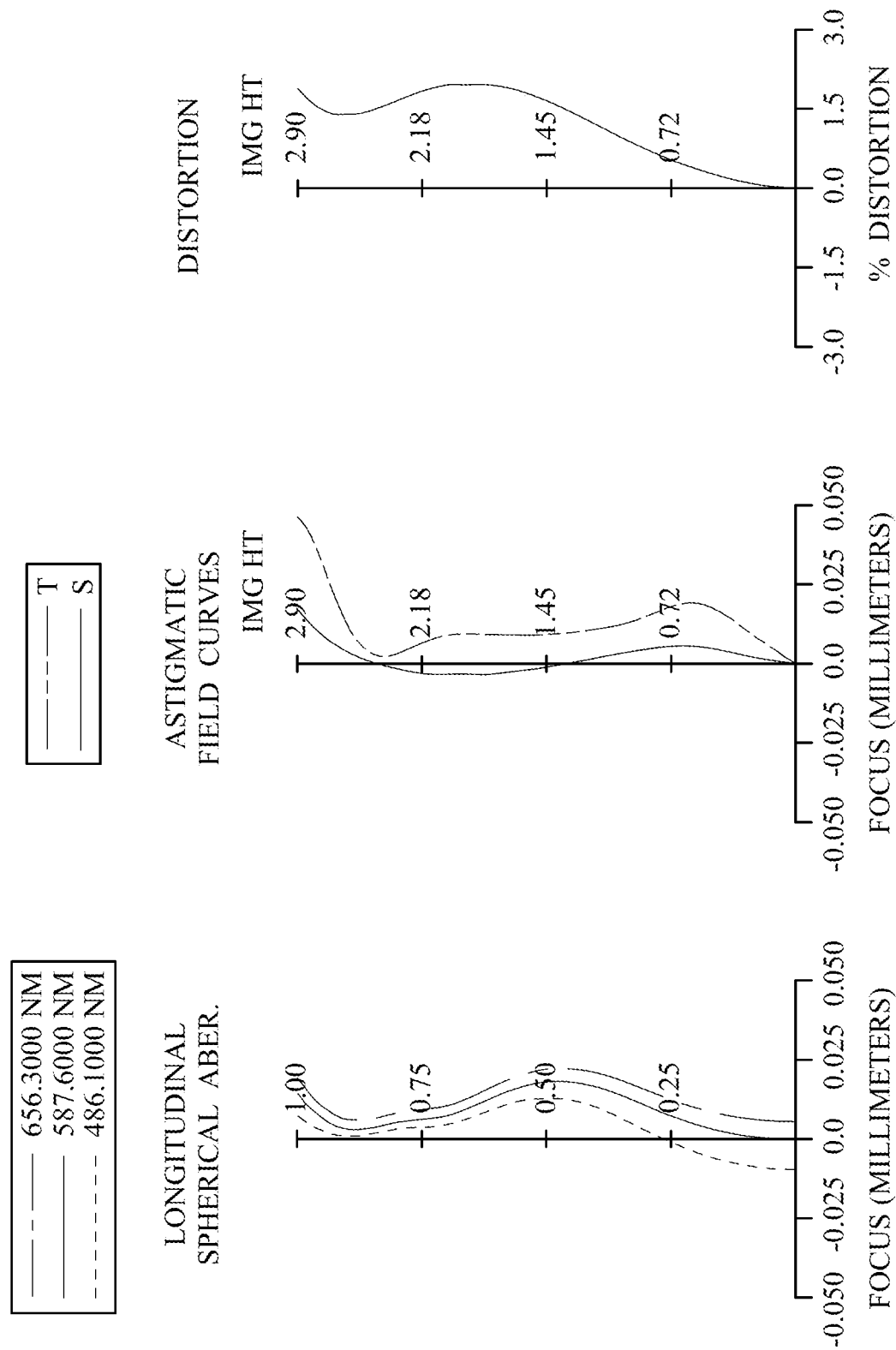
FIG. 26 shows spherical aberration curves, astigmatic field curves and a distortion curve of the image capturing optical lens assembly according to the 13th embodiment.

FIG. 25 is a schematic view of an image capturing optical lens assembly according to the 13th embodiment of the present disclosure. FIG. 26 shows spherical aberration curves, astigmatic field curves and a distortion curve of the image capturing optical lens assembly according to the 13th embodiment. In FIG. 25, the image capturing optical lens assembly includes, in order from an object side to an image side, an aperture stop 1300, a first lens element 1310, a second lens element 1320, a third lens element 1330, a fourth lens element 1340, a fifth lens element 1350, a sixth lens element 1360, an IR-cut filter 1380, an image plane 1370, and an image sensor 1390.

The first lens element 1310 with positive refractive power has a convex object-side surface 1311 and a convex image-side surface 1312. The first lens element 1310 is made of plastic material and has the object-side surface 1311 and the image-side surface 1312 being both aspheric.

The second lens element 1320 with negative refractive power has a concave object-side surface 1321 and a concave image-side surface 1322. The second lens element 1320 is made of plastic material and has the object-side surface 1321 and the image-side surface 1322 being both aspheric.

The third lens element 1330 with negative refractive power has a convex object-side surface 1331 and a concave image-side surface 1332. The third lens element 1330 is made of plastic material and has the object-side surface 1331 and the image-side surface 1332 being both aspheric.

The fourth lens element 1340 with positive refractive power has a concave object-side surface 1341 and a convex image-side surface 1342. The fourth lens element 1340 is made of plastic material and has the object-side surface 1341 and the image-side surface 1342 being both aspheric.

The fifth lens element 1350 with positive refractive power has a concave object-side surface 1351 and a convex image-side surface 1352. The fifth lens element 1350 is made of plastic material and has the object-side surface 1351 and the image-side surface 1352 being both aspheric.

The sixth lens element 1360 with negative refractive power has a concave object-side surface 1361 and a concave image-side surface 1362. The sixth lens element 1360 is made of plastic material and has the object-side surface 1361 and the image-side surface 1362 being both aspheric. Furthermore, the sixth lens element 1360 has inflection points on the image-side surface 1362 thereof.

The IR-cut filter 1380 made of glass material is located between the sixth lens element 1360 and the image plane 1370, and will not affect a focal length of the image capturing optical lens assembly.

The detailed optical data of the 13th embodiment are shown in Table 25, and the aspheric surface data are shown in Table 26 below.

TABLE 25

13th Embodiment
f = 3.65 mm, Fno = 2.20, HFOV = 37.9 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.240 | | | | |
| 2 | Lens 1 | 1.439 | (ASP) | 0.509 | Plastic | 1.544 | 55.9 | 2.63 |
| 3 | | −184.176 | (ASP) | 0.070 | | | | |
| 4 | Lens 2 | −5.787 | (ASP) | 0.250 | Plastic | 1.640 | 23.3 | −5.52 |
| 5 | | 9.232 | (ASP) | 0.265 | | | | |
| 6 | Lens 3 | 6.150 | (ASP) | 0.250 | Plastic | 1.640 | 23.3 | −40.67 |
| 7 | | 4.895 | (ASP) | 0.175 | | | | |
| 8 | Lens 4 | −4.806 | (ASP) | 0.413 | Plastic | 1.544 | 55.9 | 132.91 |
| 9 | | −4.643 | (ASP) | 0.050 | | | | |
| 10 | Lens 5 | −5.270 | (ASP) | 0.550 | Plastic | 1.544 | 55.9 | 2.78 |
| 11 | | −1.219 | (ASP) | 0.480 | | | | |
| 12 | Lens 6 | −7.143 | (ASP) | 0.395 | Plastic | 1.535 | 55.7 | −2.21 |
| 13 | | 1.441 | (ASP) | 0.500 | | | | |
| 14 | IR-cut filter | Plano | | 0.200 | Glass | 1.517 | 64.2 | — |
| 15 | | Plano | | 0.352 | | | | |
| 16 | Image | Plano | | — | | | | |

Note:
Reference wavelength (d-line) is 587.6 nm.

TABLE 26

Aspheric Coefficients

| Surface # | 2 | 3 | 4 | 5 |
|---|---|---|---|---|
| k = | −3.3743E+00 | −1.0000E+00 | −2.0000E+01 | −1.0000E+00 |
| A4 = | 1.4173E−01 | −5.5698E−02 | −1.3589E−02 | −3.5788E−02 |
| A6 = | −7.3483E−02 | 1.2438E−01 | 1.7346E−01 | 1.8486E−01 |
| A8 = | 2.2287E−01 | −8.4381E−02 | 2.0860E−01 | −1.5601E−01 |
| A10 = | −6.7861E−01 | −3.7733E−01 | −1.3172E+00 | −8.6518E−02 |
| A12 = | 9.2136E−01 | 6.4476E−01 | 1.8736E+00 | 1.8624E−01 |
| A14 = | −5.3258E−01 | −3.1200E−01 | −7.8550E−01 | −5.1121E−02 |

| Surface # | 6 | 7 | 8 | 9 |
|---|---|---|---|---|
| k = | 3.0000E+00 | 2.2943E+00 | 2.4595E+00 | −1.3632E+01 |
| A4 = | −4.0078E−01 | −2.5240E−01 | −1.1260E−02 | −2.3674E−02 |
| A6 = | 7.8091E−02 | −2.2886E−02 | 1.8525E−02 | −2.8692E−02 |
| A8 = | −3.6671E−01 | 8.1978E−02 | 8.9270E−03 | −7.0414E−03 |
| A10 = | 6.9039E−01 | 8.4299E−02 | −3.2943E−03 | 2.8289E−03 |
| A12 = | −3.7566E−01 | −1.7319E−02 | 3.1531E−03 | 3.6722E−03 |
| A14 = | −4.0814E−03 | 4.0598E−03 | −5.3819E−04 | 2.4826E−04 |

| Surface # | 10 | 11 | 12 | 13 |
|---|---|---|---|---|
| k = | 0.0000E+00 | −5.0630E+00 | 2.5017E+00 | −7.4884E+00 |
| A4 = | 1.1043E−01 | −3.4976E−02 | −5.4414E−02 | −7.3307E−02 |
| A6 = | −1.1658E−02 | 1.6194E−01 | −2.2776E−02 | 2.4826E−02 |
| A8 = | −1.3161E−01 | −1.1089E−01 | 2.5637E−02 | −7.2027E−03 |
| A10 = | 1.3420E−01 | 3.2485E−02 | −7.4561E−03 | 1.3626E−03 |
| A12 = | −6.3921E−02 | −4.5783E−03 | 9.3837E−04 | −1.6517E−04 |
| A14 = | 1.2116E−02 | 2.2262E−04 | −5.1170E−05 | 9.5239E−06 |

In the image capturing optical lens assembly according to the 13th embodiment, the definitions of these parameters shown in the following table are the same as those stated in the 1st embodiment with corresponding values for the 13th embodiment. Moreover, these parameters can be calculated from Table 25 and Table 26 as the following values and satisfy the following relationships:

| f (mm) | 3.65 | (C3 − C4)/(C3 + C4) | 4.36 |
|---|---|---|---|
| Fno | 2.20 | (C5 − C6)/(C5 + C6) | −0.11 |
| HFOV (deg.) | 37.9 | f2/f3 | 0.14 |
| (V2 + V3)/V1 | 0.83 | (|f/f2| + |f/f3| + |f/f4|)/(|f/f5| + |f/f6|) | 0.26 |
| (CT2 + CT3)/f | 0.14 | Dsc/TL | 0.76 |
| f2/R4 | −0.60 | ImgH/f | 0.88 |
| R12/R11 | −0.20 | | |

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image capturing optical lens assembly comprising six lens elements, the six lens elements being, in order from an object side to an image side:
   a first lens element, a second lens element, a third lens element, a fourth lens element, a fifth lens element and a sixth lens element;
   wherein each of the first lens element, the second lens element, the third lens element, the fourth lens element, the fifth lens element and the sixth lens element has an object-side surface facing the object side and an image-side surface facing the image side;
   wherein there is an air gap between optical effective regions of every adjacent lens elements of the six lens elements;
   wherein the second lens element has the image-side surface being convex in a paraxial region thereof; the third lens element with negative refractive power has the image-side surface being concave in a paraxial region thereof; the fifth lens element with positive refractive power has the image-side surface being convex in a paraxial region thereof; the sixth lens element with negative refractive power has the object-side surface being convex in a paraxial region thereof and the image-side surface being concave in a paraxial region thereof, and the image-side surface of the sixth lens element comprises at least one inflection point;
   wherein an absolute value of a curvature radius of the object-side surface of the third lens element is greater than an absolute value of a curvature radius of the image-side surface of the third lens element, and an absolute value of a curvature radius of the object-side surface of the fifth lens element is greater than an absolute value of a curvature radius of the image-side surface of the fifth lens element;

wherein a curvature of the object-side surface of the third lens element is C5, a curvature of the image-side surface of the third lens element is C6, and the following relationship is satisfied:

$-0.4<(C5-C6)/(C5+C6)<0.$

2. The image capturing optical lens assembly of claim 1, wherein the third lens element has the object-side surface being convex in a paraxial region thereof.

3. The image capturing optical lens assembly of claim 1, wherein a curvature radius of the object-side surface of the sixth lens element is R11, a curvature radius of the image-side surface of the sixth lens element is R12, and the following relationship is satisfied:

$0.03 \leq R12/R11<0.4.$

4. The image capturing optical lens assembly of claim 1, wherein a maximum image height of the image capturing optical lens assembly is ImgH, a focal length of the image capturing optical lens assembly is f, and the following relationship is satisfied:

$0.65<ImgH/f<0.95.$

5. The image capturing optical lens assembly of claim 1, wherein a maximum axial distance among axial distances between every adjacent lens elements of the six lens elements is an axial distance between the third lens element and the fourth lens element.

6. The image capturing optical lens assembly of claim 1, wherein an axial distance between the fifth lens element and the sixth lens element is greater than an axial distance between the fourth lens element and the fifth lens element.

7. The image capturing optical lens assembly of claim 1, wherein an absolute value of a focal length of the fourth lens element is greater than an absolute value of a focal length of each of the second lens element, the fifth lens element and the sixth lens element.

8. The image capturing optical lens assembly of claim 1, wherein an absolute value of a focal length of the third lens element is greater than an absolute value of a focal length of the second lens element.

9. An image capturing optical lens assembly comprising six lens elements and an aperture stop, the six lens elements being, in order from an object side to an image side:
a first lens element, a second lens element, a third lens element, a fourth lens element, a fifth lens element and a sixth lens element;
wherein the aperture stop is located between the second lens element and an imaged object;
wherein each of the first lens element, the second lens element, the third lens element, the fourth lens element, the fifth lens element and the sixth lens element has an object-side surface facing the object side and an image-side surface facing the image side;
wherein the second lens element has the image-side surface being convex in a paraxial region thereof; the third lens element with negative refractive power has the image-side surface being concave in a paraxial region thereof; the fifth lens element with positive refractive power has the image-side surface being convex in a paraxial region thereof; the sixth lens element with negative refractive power has the image-side surface being concave in a paraxial region thereof, and the image-side surface of the sixth lens element comprises at least one inflection point;
wherein an absolute value of a curvature radius of the object-side surface of the third lens element is greater than an absolute value of a curvature radius of the image-side surface of the third lens element, an axial distance between the fifth lens element and the sixth lens element is greater than an axial distance between the fourth lens element and the fifth lens element, and a central thickness of the sixth lens element is greater than a central thickness of the fourth lens element.

10. The image capturing optical lens assembly of claim 9, wherein the third lens element has the object-side surface being convex in a paraxial region thereof.

11. The image capturing optical lens assembly of claim 9, wherein the first lens element has the image-side surface being convex in a paraxial region thereof.

12. The image capturing optical lens assembly of claim 9, wherein a curvature radius of the object-side surface of the sixth lens element is R11, a curvature radius of the image-side surface of the sixth lens element is R12, and the following relationship is satisfied:

$-0.85<R12/R11<0.4.$

13. The image capturing optical lens assembly of claim 9, wherein the object-side surface and the image-side surface of each of the first through fifth lens elements are aspheric, a maximum image height of the image capturing optical lens assembly is ImgH, a focal length of the image capturing optical lens assembly is f, and the following relationship is satisfied:

$0.65<ImgH/f<0.95.$

14. The image capturing optical lens assembly of claim 9, wherein a maximum axial distance among axial distances between every adjacent lens elements of the six lens elements is an axial distance between the third lens element and the fourth lens element.

* * * * *